(12) United States Patent
Miyakawa et al.

(10) Patent No.: US 9,235,084 B2
(45) Date of Patent: Jan. 12, 2016

(54) LIQUID CRYSTAL DISPLAY DEVICE AND MANUFACTURING METHOD THEREOF

(75) Inventors: Masashi Miyakawa, Kanagawa (JP); Shunichi Suwa, Kanagawa (JP); Masahiko Nakamura, Kanagawa (JP); Tadaaki Isozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 710 days.

(21) Appl. No.: 13/372,722

(22) Filed: Feb. 14, 2012

(65) Prior Publication Data

US 2012/0212691 A1    Aug. 23, 2012

(30) Foreign Application Priority Data

Feb. 23, 2011   (JP) .................................. 2011-036831

(51) Int. Cl.
*G02F 1/1337*    (2006.01)

(52) U.S. Cl.
CPC .... *G02F 1/133788* (2013.01); *G02F 1/133707* (2013.01); *G02F 2001/133715* (2013.01); *G02F 2001/133742* (2013.01); *G02F 2001/133757* (2013.01); *G02F 2001/133773* (2013.01)

(58) Field of Classification Search
CPC ........ G02F 2001/133715; G02F 2001/133742; G02F 2001/133757; G02F 2001/133773; G02F 1/133788; G02F 1/133707
USPC ................................................ 349/123–129
See application file for complete search history.

(56) References Cited

U.S. PATENT DOCUMENTS

| | | | | |
|---|---|---|---|---|
| 5,774,198 A | * | 6/1998 | Fukumoto et al. | 349/128 |
| 6,696,114 B1 | * | 2/2004 | Kawatsuki et al. | 428/1.2 |
| 2005/0168676 A1 | | 8/2005 | Kishida et al. | |
| 2007/0098921 A1 | | 5/2007 | Liang et al. | |
| 2008/0218676 A1 | | 9/2008 | Rho et al. | |
| 2008/0309862 A1 | * | 12/2008 | Yoshida et al. | 349/124 |
| 2011/0128487 A1 | * | 6/2011 | Kim | 349/123 |
| 2011/0261295 A1 | * | 10/2011 | Kim | 349/96 |
| 2012/0212697 A1 | | 8/2012 | Miyakawa et al. | |

FOREIGN PATENT DOCUMENTS

| | | |
|---|---|---|
| JP | 2002-357830 A | 12/2002 |
| JP | 2006-512422 A | 4/2006 |
| JP | 2009-092815 A | 4/2009 |
| JP | 2010-107536 A | 5/2010 |
| JP | 2012-163677 A | 8/2012 |
| WO | WO 2010/087280 A1 | 8/2010 |

* cited by examiner

*Primary Examiner* — Charles Chang
(74) *Attorney, Agent, or Firm* — Harzuki International, LLC

(57) ABSTRACT

A liquid crystal display device including a liquid crystal display device that includes a first alignment film and a second alignment film that are provided on opposing face sides of a pair of substrates and a liquid crystal layer provided between the first alignment film and the second alignment film and that includes liquid crystal molecules with negative dielectric constant anisotropy, wherein the first alignment film includes a compound in which a first polymer compound that includes a cross-linked functional group or a polymerized functional group as a side chain is cross-linked or polymerized, the second alignment film includes a compound in which a second polymer compound is cross-linked or polymerized, and a pretilt is conferred on the liquid crystal molecules by cross-linking or polymerizing the first polymer compound by the first alignment film and vertically aligning the liquid crystal molecules by the second alignment film.

8 Claims, 21 Drawing Sheets

MARGIN PORTION OF
FIRST ELECTRODE

MARGIN PORTION OF
FIRST ELECTRODE

MARGIN PORTION OF
FIRST ELECTRODE
(PIXEL ELECTRODE)

MARGIN PORTION OF
SECOND ELECTRODE
(OPPOSING ELECTRODE)

MARGIN PORTION OF
FIRST ELECTRODE
(PIXEL ELECTRODE)

MARGIN PORTION OF
SECOND ELECTRODE
(OPPOSING ELECTRODE)

MARGIN PORTION OF
FIRST ELECTRODE
(PIXEL ELECTRODE)

MARGIN PORTION OF
SECOND ELECTRODE
(OPPOSING ELECTRODE)

LIQUID CRYSTAL DISPLAY DEVICE AND MANUFACTURING METHOD THEREOF

CROSS REFERENCE TO RELATED APPLICATION

This application claims the priority benefit of Japanese Patent Application JP 2011-036831 filed in the Japanese Patent Office on Feb. 23, 2011, the entire content of which is hereby incorporated by reference.

BACKGROUND

The present disclosure relates to a liquid crystal display device that includes a liquid crystal display element in which a liquid crystal layer is sealed between a pair of substrates with alignment films on opposing faces and a manufacturing method of the liquid crystal display device.

In recent years, liquid crystal displays (LCD) have often been used as the display monitor for liquid crystal television sets, notebook personal computers, car navigation devices, and the like. Such liquid crystal displays are categorized into various display modes (systems) according to the molecular arrangement (alignment) of the liquid crystal molecules that are contained in the liquid crystal layer that is interposed between the substrates. As the display mode, for example, a TN (Twisted Nematic) mode in which the liquid crystal molecules are twisted and aligned in a state in which a voltage is not applied is commonly used. With the TN mode, the liquid crystal molecules have a property in which the positive dielectric constant anisotropy, that is, the dielectric constant of the liquid crystal molecules in the long axis direction is large compared to the short axis direction. The liquid crystal molecules therefore have a structure in which the alignment positions of the liquid crystal molecules are sequentially rotated within a plane that is parallel to the substrate faces, while being aligned in a direction that is vertical to the substrate faces.

On the other hand, there has been growing attention on a VA (Vertical Alignment) mode in which the liquid crystal molecules are aligned vertically to the substrate faces in a state in which a voltage is not applied. With the VA mode, the liquid crystal molecules have a property in which the negative dielectric constant anisotropy, that is, the dielectric constant of the liquid crystal molecules in the long axis direction is small compared to the short axis direction, and a wider viewing angle is able to be realized compared to the TN mode.

Such a VA mode liquid crystal display has a structure in which light is transmitted by the liquid crystal molecules that are aligned in a direction that is vertical to the substrates reacting to a voltage being applied by falling to a direction that is parallel to the substrates due to the negative dielectric constant anisotropy. However, since the direction in which the liquid crystal molecules that are aligned in the vertical direction with respect to the substrates fall is arbitrary, the response characteristics with respect to the voltage may be deteriorated by the alignment of the liquid crystal molecules becoming disturbed by the application of the voltage.

Accordingly, as an approach to regulating the direction in which the liquid crystal molecules fall in response to the application of the voltage, a technique of aligning the liquid crystal molecules from a direction that is vertical to the substrates toward a specified direction (known as conferring a pretilt) by forming a polymer layer with a predetermined structure on opposing faces of the substrates has been developed (for example, refer to Japanese Unexamined Patent Application Publication No. 2002-357830). With such a technique, it is possible for the direction in which the liquid crystal molecules fall when a voltage is applied to be determined in advance, and the response characteristics with respect to the application of the voltage are able to be improved.

SUMMARY

However, with the technique disclosed in the unexamined patent application publication, there is a problem that since the liquid crystal molecules are aligned slightly toward the substrate normal vector even in a state of not being driven (black display), while the response speed with respect to the application of a voltage is improved, a slight amount of light is transmitted during black display, lowering the contrast.

Further, with such a technique of conferring a pretilt, while it is possible to improve the startup speed of an image display on the liquid crystal display device, it is difficult to improve the response speed when the application of the voltage is interrupted. That is, it is difficult to improve the termination speed of an image display on the liquid crystal display device. On the other hand, in order to cope with the increase in the number of display frames in the liquid crystal display device, it is important not only that the startup speed of the image display be improved but also that the termination speed be improved.

It is desirable to provide a liquid crystal display device in which the contrast is able to be improved, and in addition, in which not only the startup speed of an image display but also the termination speed is able to be improved, and a manufacturing method thereof.

According to a first embodiment of the present disclosure, there is provided a liquid crystal display device including a liquid crystal display element that includes a first alignment film and a second alignment film that are provided on opposing face sides of a pair of substrates, and a liquid crystal layer that is provided between the first alignment film and the second alignment film and that includes liquid crystal molecules with negative dielectric constant anisotropy, wherein the first alignment film includes a compound in which a first polymer compound that includes a cross-linked functional group or a polymerized functional group as a side chain (for convenience, referred to as "first post-alignment process compound") and the second alignment film includes a compound in which a second polymer compound is polymerized (for convenience, referred to as "second post-alignment process compound), and a pretilt is conferred on the liquid crystal molecules by the first alignment film (that is, by the first post-alignment process compound) and the liquid crystal molecules are vertically aligned by the second alignment film (that is, by the second post-alignment process compound). Here, "cross-linked functional group" refers to a group that is able to form a cross-linked structure (bridged structure), and more specifically, refers to dimerization. Further, "polymerized functional group" refers to a functional group in which two or more functional groups perform successive polymerization.

According to a second embodiment of the present disclosure, there is provided a liquid crystal display device including a liquid crystal display element that includes a first alignment film and a second alignment film that are provided on opposing face sides of a pair of substrates, and a liquid crystal layer that is provided between the first alignment film and the second alignment film and that includes liquid crystal molecules with negative dielectric constant anisotropy, wherein the first alignment film includes a compound in which a first polymer compound that includes a cross-linked functional group or a polymerized functional group as a side chain (for convenience, referred to as "first post-alignment process compound") and the second alignment film includes a compound in which a second polymer compound is polymerized (for convenience, referred to as "second post-alignment process compound), and a pretilt is conferred on the liquid crystal molecules by the first alignment film (that is, by the first post-alignment process compound) and the liquid crystal molecules are vertically aligned by the second alignment film (that is, by the second post-alignment process compound).

A manufacturing method of the liquid crystal display device (or a manufacturing method of the liquid crystal display element) according to the first embodiment of the present disclosure includes: forming a first alignment film composed of a first polymer compound including a cross-linked functional group or a polymerized functional group as a side chain (referred to as "first pre-alignment process compound" for convenience) on one of a pair of substrates and forming a second alignment film composed of a second polymer compound (referred to as "second pre-alignment process compound" for convenience) on the other of the pair of substrates; arranging the pair of substrates so that the first alignment film and the second alignment film are opposing and sealing a liquid crystal layer that includes liquid crystal molecules with negative dielectric constant anisotropy between the first alignment film and the second alignment film; and conferring a pretilt on the liquid crystal molecules by the first alignment film (that is, a pretilt is conferred on the liquid crystal molecules by the post-alignment process compound) by cross-linking or polymerizing the first polymer compound and the second polymer compound (first pre-alignment process compound and second pre-alignment process compound) and vertically aligning the liquid crystal molecules by the second alignment film (that is, by the post-alignment process compound).

The manufacturing method of the liquid crystal display device (or a manufacturing method of the liquid crystal display element) according to the first embodiment has a form of cross-linking or polymerizing the first polymer compound (first pre-alignment process compound) by irradiating energy rays or heating while aligning the liquid crystal molecules by applying a predetermined electric field on the liquid crystal layer. Further, at the same time, the second polymer compound (second pre-alignment process compound) is able to be cross-linked or polymerized.

Furthermore, in such a case, it is preferable that energy rays be radiated while an electric field is applied to the liquid crystal layer so that the liquid crystal molecules are arranged in a diagonal direction with respect to the surface of one of the substrates of the pair of substrates, and further, the pair of substrates are configured by a substrate with pixel electrodes and a substrate with opposing electrodes, and it is more preferable that energy rays be irradiated from the side of the substrate with the pixel electrodes. Generally, a color filter is formed on the side of the substrate with the opposing electrodes, and since the energy rays are absorbed by the color filter and there is a possibility that the cross-linked functional group or the polymerized functional group of the alignment film material does not react easily, as described above, it is more preferable that the energy rays be irradiated from the side of the substrate with the pixel electrodes on which the color filter is not formed. It is preferable that in a case when a color filter is formed on the side of the substrate that includes the pixel electrodes, energy rays be irradiated on the side of the substrate that includes the opposing electrodes. Here, in essence, the azimuth angle (angle of deviation) of the liquid crystal molecules when a pretilt is conferred is regulated by the strength and the direction of the electric field and the molecular structure of the alignment film material, and the polar angle (zenith angle) is regulated by the strength of the electric field and the molecular structure of the alignment film material. The same is also true of manufacturing methods of the liquid crystal display devices according to the second and third embodiment of the present disclosure described later.

A manufacturing method of the liquid crystal display device (or a manufacturing method of the liquid crystal display element) according to the second embodiment of the present disclosure includes: forming a first alignment film composed of a first polymer compound including a photosensitive functional group as a side chain (referred to as "first pre-alignment process compound" for convenience) on one of a pair of substrates and forming a second alignment film composed of a second polymer compound (referred to as "second pre-alignment process compound" for convenience) on the other of the pair of substrates; arranging the pair of substrates so that the first alignment film and the second alignment film are opposing and sealing a liquid crystal layer that includes liquid crystal molecules with negative dielectric constant anisotropy between the first alignment film and the second alignment film; and conferring a pretilt on the liquid crystal molecules by the first alignment film (that is, by the post-alignment process compound) by cross-linking or polymerizing the first polymer compound and the second polymer compound (first pre-alignment process compound and second pre-alignment process compound) and vertically aligning the liquid crystal molecules by the second alignment film (that is, by the post-alignment process compound).

The manufacturing method of the liquid crystal display device (or a manufacturing method of the liquid crystal display element) according to the second embodiment of the present disclosure has a form of deforming the first polymer compound (first pre-alignment process compound) by irradiating energy rays while aligning the liquid crystal molecules by applying a predetermined electric field on the liquid crystal layer. Further, at the same time, the second polymer compound (second pre-alignment process compound) is able to be cross-linked or polymerized.

A manufacturing method of the liquid crystal display device (or a manufacturing method of the liquid crystal display element) according to the third embodiment of the present disclosure includes: forming a first alignment film composed of a first polymer compound including a cross-linked functional group or a photosensitive functional group as a side chain (referred to as "first pre-alignment process compound" for convenience) on one of a pair of substrates and forming a second alignment film composed of a second polymer compound (referred to as "second pre-alignment process compound" for convenience) on the other of the pair of substrates; arranging the pair of substrates so that the first alignment film and the second alignment film are opposing and sealing a liquid crystal layer that includes liquid crystal molecules with negative dielectric constant anisotropy between the first alignment film and the second alignment film; and conferring a pretilt on the liquid crystal molecules by the first alignment film (that is, by the post-alignment process compound) by irradiating the first polymer compound and the second polymer compound (first pre-alignment process compound and second pre-alignment process compound) with energy rays and cross-linking, polymerizing, or deforming the first polymer compound (first pre-alignment process compound) and the liquid crystal molecules are vertically aligned by the second alignment film (that is, by the post-alignment process compound) by cross-linking or polymerizing the second polymer compound (second pre-alignment process compound).

The manufacturing method of the liquid crystal display device (or a manufacturing method of the liquid crystal display element) according to the third embodiment of the present disclosure has a form of irradiating the first polymer compound and the second polymer compound with ultraviolet radiation as energy rays while aligning the liquid crystal molecules by applying a predetermined electric field on the liquid crystal layer.

Hereinafter, the liquid crystal display device according to the first embodiment of the present disclosure or the manufacturing method of the liquid crystal display device according to the first embodiment of the present disclosure including the preferable forms and configurations described above may be collectively referred to as simply "the first embodiment of the present disclosure", the liquid crystal display device according to the second embodiment of the present disclosure or the manufacturing method of the liquid crystal display device according to the second embodiment of the present disclosure including the preferable forms and configurations described above may be collectively referred to as simply "the second embodiment of the present disclosure", and the manufacturing method of the liquid crystal display device according to the third embodiment of the present disclosure including the preferable forms and configurations described above may be collectively referred to as simply "the third embodiment of the present disclosure". Further, the liquid crystal display devices according to the first and second embodiments of the present disclosure may be collectively referred to as simply "the liquid crystal display device of the embodiments of the present disclosure", the manufacturing methods of the liquid crystal display devices according to the first to third embodiments of the present disclosure including the preferable forms described above may be collectively referred to as simply "the manufacturing method of the liquid crystal display device of the present disclosure", and the liquid crystal display devices of the present disclosure and the manufacturing methods of the liquid crystal display devices of the present disclosure may be collectively referred to as simply "the present disclosure".

Although a pretilt is conferred on the liquid crystal molecules by the first alignment film (that is, by the first post-alignment process compound) in the embodiments of the present disclosure, here, when an angle (pretilt angle: unit in degrees) between the normal vector of the substrate on which the first alignment film is formed (first substrate) and the liquid crystal molecules is $\theta_1$ (degrees) and an angle (vertical alignment angle: unit in degrees) between the normal vector of the substrate on which the second alignment film is formed (second substrate) and the liquid crystal molecules is $\theta_2$ (degrees), it is desirable that $0 \leq \theta_2 \leq 0.5\theta_1$, $\theta_1 - \theta_2 \geq 1.0$ and preferably $\theta_1\theta_2 \geq 2.0$ be satisfied, and in so doing, both an improvement in the response speed and contrast are able to be realized.

According to the first embodiment, the second embodiment, or the third embodiment of the present disclosure, the first polymer compound (first pre-alignment process compound) or the compound that configures the first alignment film (first post-alignment process compound) is able to be further configured by a compound including a group represented by Formula 1 as the side chain. Here, for convenience, such a configuration will be referred to as "the 1A configuration of the present disclosure, the 2A configuration of the present disclosure, and the 3A configuration of the present disclosure".

$$—R1-R2-R3 \quad (1)$$

Here, R1 is a straight-chained or branched divalent organic group of one or more carbon atoms which may include an ether group or an ester group and which is bonded to the main chain of the first polymerized compound or the cross-linked compound (first pre-alignment process compound or first post-alignment process compound), or alternatively, R1 is a bonded group of at least one type selected from a group composed of an ether, an ester, an ether ester, an acetal, a ketal, a hemiacetal, and a hemiketal which is bonded to the main chain of the first polymerized compound or the cross-linked compound (first pre-alignment process compound or first post-alignment process compound), R2 is a divalent organic group including a plurality of ring structures in which one of the atoms that configure the ring structures is bonded to R1, and R3 is a monovalent group including a hydrogen atom, a halogen atom, an alkyl group, an alkoxy group, and a carbonate group, or a derivative thereof.

Alternatively, according to the first embodiment, the second embodiment, or the third embodiment of the present disclosure, the polymer compound (first pre-alignment process compound) or the compound that configures the first aligned film (first post-alignment process compound) is able to be configured by a compound that includes the group represented by Formula 2 as the side chain. Here, for convenience, such a configuration is referred to as "the 1B configuration of the present disclosure, the 2B configuration of the present disclosure, and the 3B configuration of the present disclosure". Here, the polymer compound (first pre-alignment process compound) or the compound that configures the first aligned film (first post-alignment process compound) may be configured not only by the group represented by Formula 2 but also by a compound that includes the group represented by Formula 1 or the group represented by Formula 2 as the side chain.

$$—R11-R12-R13-R14 \quad (2)$$

Here, R11 is a straight-chained or branched divalent organic group of one to twenty carbon atoms, preferably three to twelve carbon atoms which may include an ether group or, an ester group and which is bonded to the main chain of the polymerized compound or the cross-linked compound (first pre-alignment process compound or first post-alignment process compound), or alternatively, R11 is a bonded group of at least one type selected from a group composed of an ether, an ester, an ether ester, an acetal, a ketal, a hemiacetal, and a hemiketal which is bonded to the main chain of the polymerized compound or the cross-linked compound (first pre-alignment process compound or first post-alignment process compound), R12 is a divalent group including, for example, one of chalcone, cinnamate, cinnamoyl, coumarin, maleimide, benzophenone, norbornene, oryzanol, chitosan, acryloyl, methacryloyl, vinyl, epoxy, and oxetane, or an ethynylene group, R13 is a divalent organic group including a plurality of ring structures, and R14 is a monovalent group including a hydrogen atom, a halogen atom, an alkyl group, an alkoxy group, and a carbonate group, or a derivative thereof. In some cases, Formula 2 may be modified by Formula 2' below. That is, Formula 2 includes Formula 2'.

$$—R11-R12-R14 \quad (2')$$

Alternatively, according to the first embodiment of the present disclosure, the compound (first post-alignment process compound) obtained by cross-linking the polymer compound (first pre-alignment process compound) is configured by a side chain and a main chain that supports the side chain with respect to the first substrate, the side chain is bonded to the main chain and is configured by a cross-linked portion in which a portion of the side chain is cross-linked and a terminal structure portion that is bonded to the cross-linked portion, and the liquid crystal molecules are able to be configured to have a pretilt conferred thereon by being along the terminal structure portion or by being interposed by the terminal structure portion. Alternatively, according to the second embodiment of the present disclosure, the compound (first post-alignment process compound) obtained by deforming the first polymer compound (first pre-alignment process compound) is configured by a side chain and a main chain that supports the side chain with respect to the first substrate, the side chain is bonded to the main chain and is configured by a deformed portion in which a portion of the side chain is deformed and a terminal structure portion that is bonded to the deformed portion, and the liquid crystal molecules are able to be configured to have a pretilt conferred thereon by being along the terminal structure portion or by being interposed by the terminal structure portion. Alternatively, according to the third embodiment of the present disclosure, the compound obtained by irradiating the polymer compound with energy rays is configured by a side chain and a main chain that supports the side chain with respect to the first substrate, the side chain is bonded to the main chain and is configured by a cross-linked or deformed portion in which a portion of the side chain is cross-linked or deformed and a terminal structure portion that is bonded to the cross-linked or deformed portion, and the liquid crystal molecules are able to be configured to have a pretilt conferred thereon by being along the terminal structure portion or by being interposed by the terminal structure portion. Here, for convenience, such a configuration will be referred to as "the 1C configuration of the present disclosure, the 2C configuration of the present disclosure, and the 3C configuration of the present disclosure". According to the 1C configuration of the present disclosure, the 2C configuration of the present disclosure, and the 3C configuration of the present disclosure, the terminal structure portion may have the form of including a mesogenic group. Here, in Formula 1 described above, "R2+R3" equates to the terminal structure portion, and in Formula 2 described above, "R13+R14" equates to the terminal structure portion.

Alternatively, according to the first embodiment of the present disclosure, the compound (first post-alignment process compound) obtained by cross-linking the polymer compound (first pre-alignment process compound) is configured by a side chain and a main chain that supports the side chain with respect to the first substrate, and the side chain is bonded to the main chain and is configured by a cross-linked portion in which a portion of the side chain is cross-linked and a terminal structure portion that is bonded to the cross-linked portion and that includes a mesogenic group. Here, for convenience, such a configuration will be referred to as "the 1D configuration of the present disclosure". Furthermore, the 1D configuration of the present disclosure has a form in which the main chain and the cross-linked portion are bonded by covalent bonding and the cross-linked portion and the terminal structure portion are bonded by covalent bonding. Alternatively, according to the second embodiment of the present disclosure, the compound (first post-alignment process compound) obtained by deforming the first polymer compound (first pre-alignment process compound) is configured by a side chain and a main chain that supports the side chain with respect to the first substrate, the side chain is bonded to the main chain and is configured by a deformed portion in which a portion of the side chain is deformed and a terminal structure portion that is bonded to the deformed portion and that includes a mesogenic group. Here, for convenience, such a configuration will be referred to as "the 2D configuration of the present disclosure". Alternatively, according to the third embodiment of the present disclosure, the compound (first post-alignment process compound) obtained by irradiating the polymer compound (first pre-alignment process compound) with energy rays is configured by a side chain and a main chain that supports the side chain with respect to the first substrate, the side chain is bonded to the main chain and is configured by a cross-linked or deformed portion in which a portion of the side chain is cross-linked or deformed and a terminal structure portion that is bonded to the cross-linked or deformed portion and that includes a mesogenic group. Here, for convenience, such a configuration will be referred to as "the 3D configuration of the present disclosure".

According to the first embodiment of the present disclosure that includes the 1A to 1D configurations of the present disclosure, the side chain (more specifically, the cross-linked portion) takes the form of including a photodimerized photosensitive group.

Furthermore, according to the embodiments of the present disclosure which include the favorable configurations and forms described above, a configuration is possible in which the surface roughness Ra of the first alignment film of equal to or less than 1 nm is possible. Here, the surface roughness Ra is regulated by JIS B 0601:2001.

Furthermore, according to the embodiments of the present disclosure which include the favorable configurations and forms described above, a configuration is possible in which the liquid crystal display device further includes: first electrodes that are formed on the opposing face of the first substrate that opposes the second substrate; and a first alignment regulating portion that is provided on the first electrodes, wherein the first alignment film covers the first electrodes, the first alignment regulating portion and the opposing face of the first substrate, the first alignment regulating portion is composed of first slit portions that are formed on the first electrodes, the width of the first slit portions is equal to or greater than 2 μm and less than 10 μm, and the pitch of the first slit portions is 10 μm to 180 μm, preferably 30 μm to 180 μm, and more preferably 60 μm to 180 μm.

Alternatively, according to the embodiments of the present disclosure which include the favorable configurations and forms described above, a configuration is possible in which the liquid crystal display device further includes: the first electrodes that are formed on the opposing face of the first substrate that opposes the second substrate; and the second alignment regulating portion that is provided on the second electrodes, wherein the first alignment film covers the first electrodes, the first alignment regulating portion, and the opposing face of the first substrate, and the first alignment regulating portion is composed of protrusions that are provided on the substrates.

According to the embodiments of the present disclosure which include the favorable configurations and forms described above, a configuration is possible in which the main chain includes imide bonds within recurring units is possible. Further, the pair of substrates may take the form of being configured by a substrate with pixel electrodes and a substrate with opposing electrodes, that is, a form in which the first substrate is the substrate with the pixel electrodes and the second substrate is the substrate with the opposing electrodes, or alternatively, a form in which the second substrate is the substrate with the pixel electrodes and the first substrate is the substrate with the opposing electrodes.

The second polymer compound (second pre-alignment process compound) according to the embodiments of the present disclosure will be described later.

According to the liquid crystal display device according to the first embodiment of the present disclosure, the first alignment film includes a compound in which a polymer compound that includes a cross-linked functional group or a polymerized functional group is cross-linked or polymerized as the side chain, and a pretilt is conferred on the liquid crystal molecules by the cross-linked or polymerized compound. Therefore, if an electric field is applied between the pixel electrodes and the opposing electrodes, the long axis direction of the liquid crystal molecules responds in a predetermined direction with respect to the substrate faces, securing favorable display characteristics. Moreover, since a pretilt is conferred on the liquid crystal molecules by the cross-linked or polymerized compound, the response speed (startup speed of the image display) to the electric field between the electrodes becomes quicker compared to a case when a pretilt is not conferred on the liquid crystal molecules, making favorable display characteristics easier to maintain compared to a case when a pretilt is conferred without using the cross-linked or polymerized compound.

According to the manufacturing method of the liquid crystal display device according to the first embodiment of the present disclosure, the liquid crystal layer is sealed between the first alignment film and the second alignment film after forming the first alignment film that includes a polymer compound that includes a cross-linked functional group or a polymerized functional group as the side chain. Here, as a whole, the liquid crystal molecules within the liquid crystal layer are in a state of being arranged in a predetermined direction (for example, horizontal direction, vertical direction, or diagonal direction) with respect to the first alignment film and the second alignment film by the first alignment film and the second alignment film. Next, the polymer compound is cross-linked or polymerized by reacting a cross-linked functional group or a polymerized functional group while applying an electric field. A pretilt is thereby conferred on the liquid crystal molecules in the vicinity of the cross-linked or polymerized compound. Accordingly, compared to a case when a pretilt is not conferred on the liquid crystal molecules, the response speed (startup speed of the image display) is improved. Moreover, by cross-linking or polymerizing the polymer compound in a state in which the liquid crystal molecules are arranged, a pretilt is conferred on the liquid crystal molecules even if linearly polarized light or diagonal light is not irradiated on the alignment films before the liquid crystal layer is sealed or an extensive device is not used.

According to the liquid crystal display device according to the second embodiment of the present disclosure, the first alignment film includes a compound in which a polymer compound that includes a photosensitive functional group is deformed as the side chain, and a pretilt is conferred on the liquid crystal molecules by the deformed compound. Therefore, if an electric field is applied between the pixel electrodes and the opposing electrodes, the long axis direction of the liquid crystal molecules responds in a predetermined direction with respect to the substrate faces to secure favorable display characteristics, and the response speed (startup speed of the image display) to the electric field between the electrodes becomes quicker compared to a case when a pretilt is not conferred on the liquid crystal molecules, making favorable display characteristics easier to maintain compared to a case when a pretilt is conferred without using the deformed compound.

According to the manufacturing method of the liquid crystal display device according to the second embodiment of the present disclosure, the liquid crystal layer is sealed between the first alignment film and the second alignment film after forming the first alignment film that includes a polymer compound that includes a photosensitive functional group as the side chain. Here, as a whole, the liquid crystal molecules within the liquid crystal layer are in a state of being arranged in a predetermined direction (for example, horizontal direction, vertical direction, or diagonal direction) with respect to the first alignment film and the second alignment film by the first alignment film and the second alignment film. Next, the polymer compound is deformed while applying an electric field. A pretilt is thereby able to be conferred on the liquid crystal molecules in the vicinity of the deformed compound. Accordingly, compared to a case when a pretilt is not conferred on the liquid crystal molecules, the response speed (startup speed of the image display) is improved. Moreover, by deforming the polymer compound in a state in which the liquid crystal molecules are arranged, a pretilt is conferred on the liquid crystal molecules even if linearly polarized light or diagonal light is not irradiated on the alignment films before the liquid crystal layer is sealed or an extensive device is not used.

According to the manufacturing method of the liquid crystal display device according to the third embodiment of the present disclosure, a pretilt is conferred on the liquid crystal molecules by irradiating the polymer compound (first pre-alignment process compound) with energy rays. That is, by cross-linking, polymerizing, or deforming the side chain of the polymer compound in a state in which the liquid crystal molecules are arranged, the response speed (startup speed of the image display) is improved compared to a case when a pretilt is not conferred on the liquid crystal molecules. Moreover, a pretilt is conferred on the liquid crystal molecules even if linearly polarized light or diagonal light is not irradiated on the alignment films before the liquid crystal layer is sealed or an extensive device is not used.

Moreover, according to the embodiments of the present disclosure, although the liquid crystal molecules are vertically aligned by the second alignment film, the second alignment film is composed of a compound in which the second polymer compound is cross-linked or polymerized. Furthermore, compared to a second alignment film configured by a polymer compound in which there is no cross-linking or polymerization, it is considered that a compound in which the second polymer compound is cross-linked or polymerized takes in or adsorbs more of the liquid crystal molecules that are positioned in the vicinity thereof. As a result, when the application of a voltage is interrupted, out of the liquid crystal molecules that had responded by falling in the horizontal direction to the substrates by a voltage being applied, the liquid crystal molecules that are positioned in the vicinity of the second alignment film are able to be aligned vertically with respect to the substrates more quickly. It is therefore possible to improve the termination speed of the image display. Further, since the liquid crystal molecules are vertically aligned by the second alignment film, the amount of light transmission during black display is able to be reduced, and the contrast is able to be improved further.

DETAILED DESCRIPTION OF EMBODIMENTS

Although the present disclosure will be described below based on the embodiments and examples of the present disclosure with reference to the drawings, the present disclosure is not limited to the embodiments and examples of the present disclosure, and the various numerical values and materials in the embodiments and examples of the present disclosure are examples. Here, description will be given in the flowing order.

1. Descriptions Relating to Common Configurations and Structures in Liquid Crystal Display Devices According to Embodiments of Present Disclosure 2. Descriptions of Liquid Crystal Display Devices and Manufacturing Methods Thereof of Embodiments of Present Disclosure Based on Embodiments of Present Disclosure 3. Descriptions of Liquid Crystal Display Devices and Manufacturing Methods Thereof of Embodiments of Present Disclosure Based on Examples, and the like

[Descriptions Relating to Common Configurations and Structures in Liquid Crystal Display Devices (Liquid crystal display element) According to Embodiments of Present Disclosure]

Figure 1:
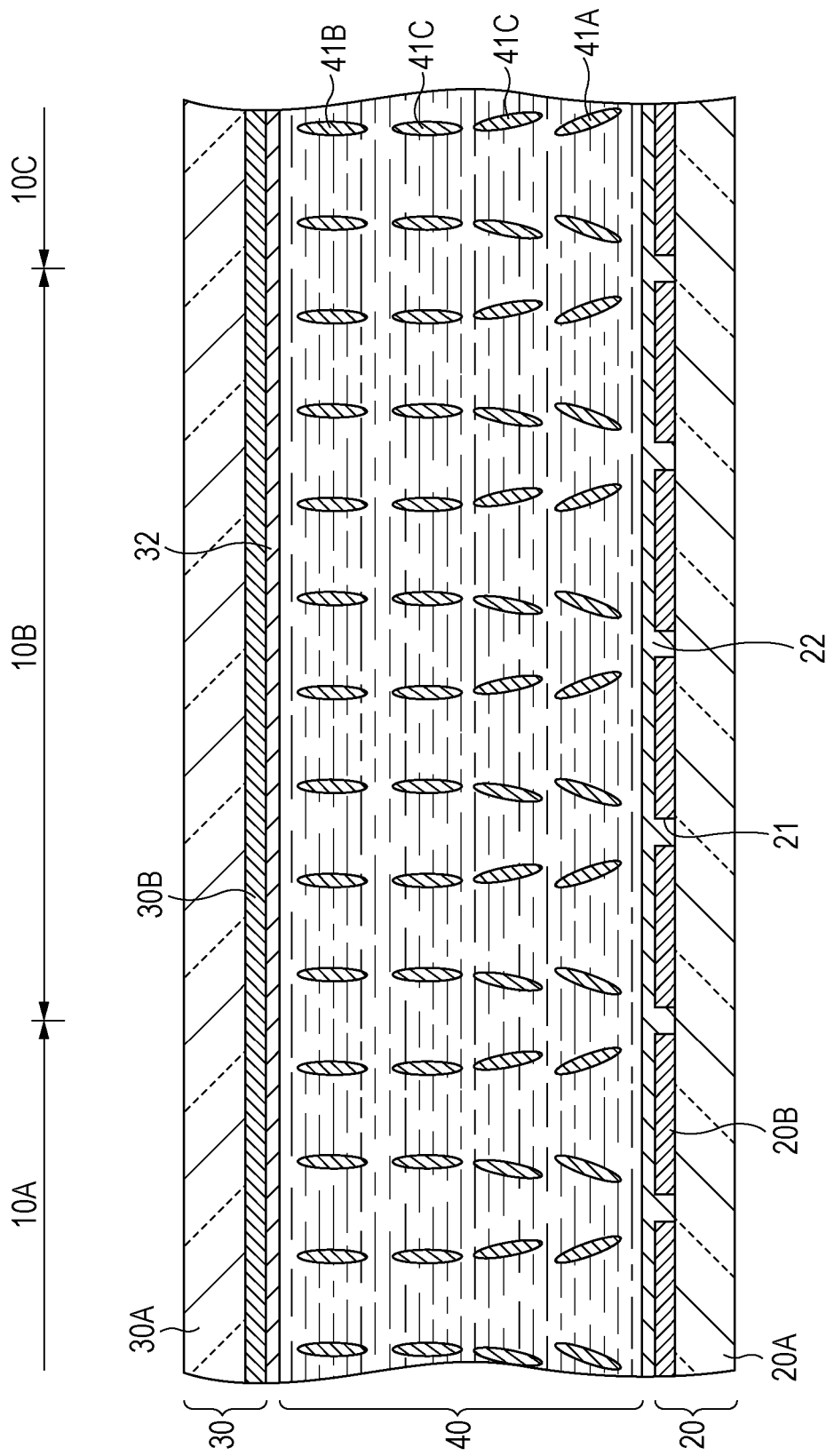
FIG. 1 is a schematic partial cross-sectional diagram of a liquid crystal display device according to an embodiment of the present disclosure.

A schematic partial cross-sectional diagram of a liquid crystal display device (or liquid crystal display element) according to an embodiment of the present disclosure is illustrated in FIG. 1. The liquid crystal display device includes a plurality of pixels 10 (10A, 10B, 10C . . . ). Furthermore, according to the liquid crystal display device (liquid crystal display element), a liquid crystal layer 40 that includes liquid crystal molecules 41 via alignment films 22 and 32 is provided between a TFT (Thin Film Transistor) substrate 20 and a CF (Color Filter) substrate 30. Such a liquid crystal display device (liquid crystal display element) is a so-called transmission type, and the display mode thereof is the vertical alignment (VA) mode. In FIG. 1, a non-driven state in which a driving voltage is not applied is represented. Here, in reality, the pixels 10 are configured by subpixels that display red images, subpixels that display green images, subpixels that display blue images, and the like.

Here, the TFT substrate 20 equates to the first substrate, and the CF substrate 30 equates to the second substrate. Further, pixel electrodes 20B that are provided on the first substrate (TFT substrate) 20 equate to the first electrodes, and opposing electrodes 30B that are provided on the second substrate (CF substrate) 30 equate to the second electrodes.

That is, the liquid crystal display device includes liquid crystal display element with the first alignment film 22 and the second alignment film 32 that are provided on opposing face sides of the pair of substrates 20 and 30, and the liquid crystal layer 40 that is provided between the first alignment film 22 and the second alignment film 32 and that includes the liquid crystal molecules 41 with negative dielectric constant anisotropy.

Furthermore, the first alignment film 22 includes a compound in which the first polymer compound that includes a cross-linked functional group or a polymerized functional group as a side chain is cross-linked or polymerized (first post-alignment process compound). Further, the second alignment film 32 includes a compound in which the second polymer compound is cross-linked or polymerized (second post-alignment process compound). Furthermore, a pretilt is conferred on the liquid crystal molecules by the first alignment film 22 (by the first post-alignment process compound), and the liquid crystal molecules are vertically aligned by the second alignment film 32 (by the second post-alignment process compound).

Here, the alignment regulating capabilities of the second alignment film 32 are greater than the alignment regulating capabilities of the first alignment film 22. Incidentally, once the application of a voltage is interrupted, liquid crystal molecules that had responded by falling in the horizontal direction to the substrates by the application of the voltage return to the original state. That is, the liquid crystal molecules positioned in the vicinity of the first alignment film 22 return to a state in which a pretilt is conferred, and the liquid crystal molecules positioned in the vicinity of the second alignment film 32 return to a vertically aligned state. Furthermore, "the alignment regulating capabilities of the second alignment film 32 are greater than the alignment regulating capabilities of the first alignment film 22" means that the time taken for the liquid crystal molecules positioned in the vicinity of the second alignment film 32 to return to the vertically aligned state is shorter than the time taken for the liquid crystal molecules positioned in the vicinity of the first alignment film 22 to return to the state in which a pretilt is conferred. Such a state is able to be realized by configuring the second alignment film from a compound in which the second polymer compound is cross-linked polymerized.

More specifically, the liquid crystal display device is composed of an arrangement of a plurality of pixels 10 that include the first substrate (TFT substrate) 20 and the second substrate (CF substrate) 30, the first electrodes (pixel electrodes) 20B that are formed on the opposing face of the first substrate 20 that opposes the second substrate 30, the first alignment regulating portion 21 that is provided on the first electrodes (pixel electrodes) 20B, the first alignment film 22 that covers the first electrodes (pixel electrodes) 20B, the first alignment regulating portion 21, and the opposing face of the first substrate (TFT substrate) 20, the second electrodes (opposing electrodes) 30B that are formed on the opposing face of the second substrate (CF substrate) 30 that opposes the first substrate (TFT substrate) 20, the second alignment film 32 that covers the second electrodes (opposing electrodes) 30B and the opposing face of the second substrate (CF substrate) 30, and the liquid crystal layer 40 that is provided between the first alignment film 22 and the second alignment film 32 and that includes the liquid crystal molecules 41.

Figure 3A:
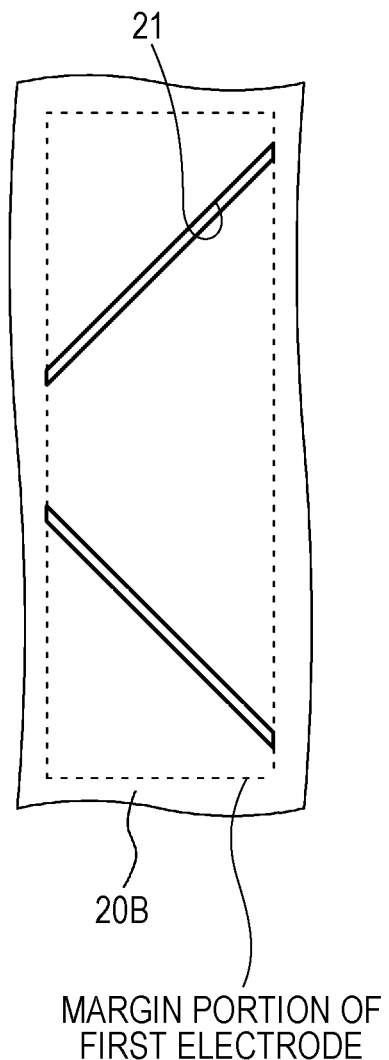
FIGS. 3A and 3B are schematic diagrams of first electrodes and first slit portions when a pixel is viewed from above.
Figure 3B:
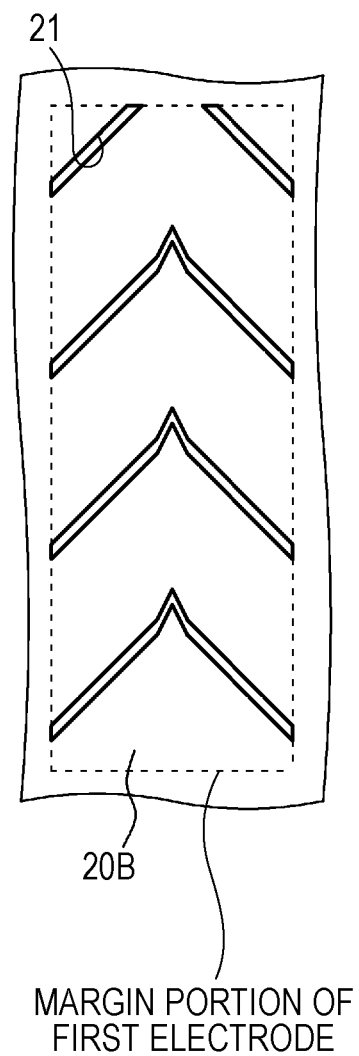

The TFT substrate 20 composed of a glass substrate has a plurality of pixel electrodes 20B that are arranged on the surface of the side that opposes the CF substrate 30 composed of a glass substrate in a matrix shape, for example. Furthermore, TFT switching elements that include gate source drains and the like that respectively drive the plurality of pixel electrodes 20B, gate lines and source lines that are connected to such TFT switching elements, and the like (not shown) are provided. A pixel electrode 20B is provided for every pixel that is electrically separated by a pixel separation portion, and is configured by a material with transparency such as, for example, ITO (indium tin oxide). Within each pixel of the pixel electrodes 20B, first slit portions 21 (portions where electrodes are not formed) with a striped pattern or a V pattern, for example, is provided. Here, an arrangement diagram of the first electrodes (pixel electrodes) 20B and the first slit portions 21 when a pixel (subpixel) is viewed from above is illustrated in FIG. 3A or FIG. 3B. In so doing, when a driving voltage is applied, since an electric field that is diagonal with respect to the long axis direction of the liquid crystal molecules 41 is conferred and regions with a different alignment direction are formed within the pixels (alignment demarcation), the viewing angle characteristics are improved. That is, the slit portions 21 are the first alignment regulating portion for regulating the entirety of the liquid crystal molecules 41 within the liquid crystal layer 40 for securing favorable display characteristics, and here, the alignment direction of the liquid crystal molecules 41 when a driving voltage is applied is regulated by the first slit portions 21. As described above, in essence, the azimuth angle of the liquid crystal molecules when a pretilt is conferred is regulated by the strength and direction of the electric field and the molecular structure of the alignment film material, and the direction of the electric field is determined by the alignment regulating portion.

On the CF substrate 30, color filters (not shown) that are configured, for example, by red (R), green (G), and blue (B) striped filters and the opposing electrodes 30B are arranged on approximately the entirety of the effective display region on the opposing face with the TFT substrate 20. Similarly to the pixel electrodes 20B, the opposing electrodes 30B are configured by a material with transparency such as, for example, ITO. The opposing electrodes 30B are so-called solid electrodes that have not been patterned.

The first alignment film 22 is provided on the surface of the liquid crystal layer 40 side of the TFT substrate 20 to cover the pixel electrodes 20B and the first slit portions 21. The second alignment film 32 is provided on the surface of the liquid crystal layer 40 side of the CF substrate 30 to cover the opposing electrodes 30B. The first alignment film 22 and the second alignment film 32 regulate the alignment of the liquid crystal molecules 41, and here, have a function of conferring a pretilt to the liquid crystal molecules 41 (41A) in the vicinity of the first substrate by the first alignment film 22 with respect to the substrate face of the first substrate 20 while aligning the liquid crystal molecules 41 (41B) that are positioned in the vicinity of the second substrate 30 by the second alignment film 32 in the vertical direction with respect to the substrate face of the second substrate 30.

Figure 11:
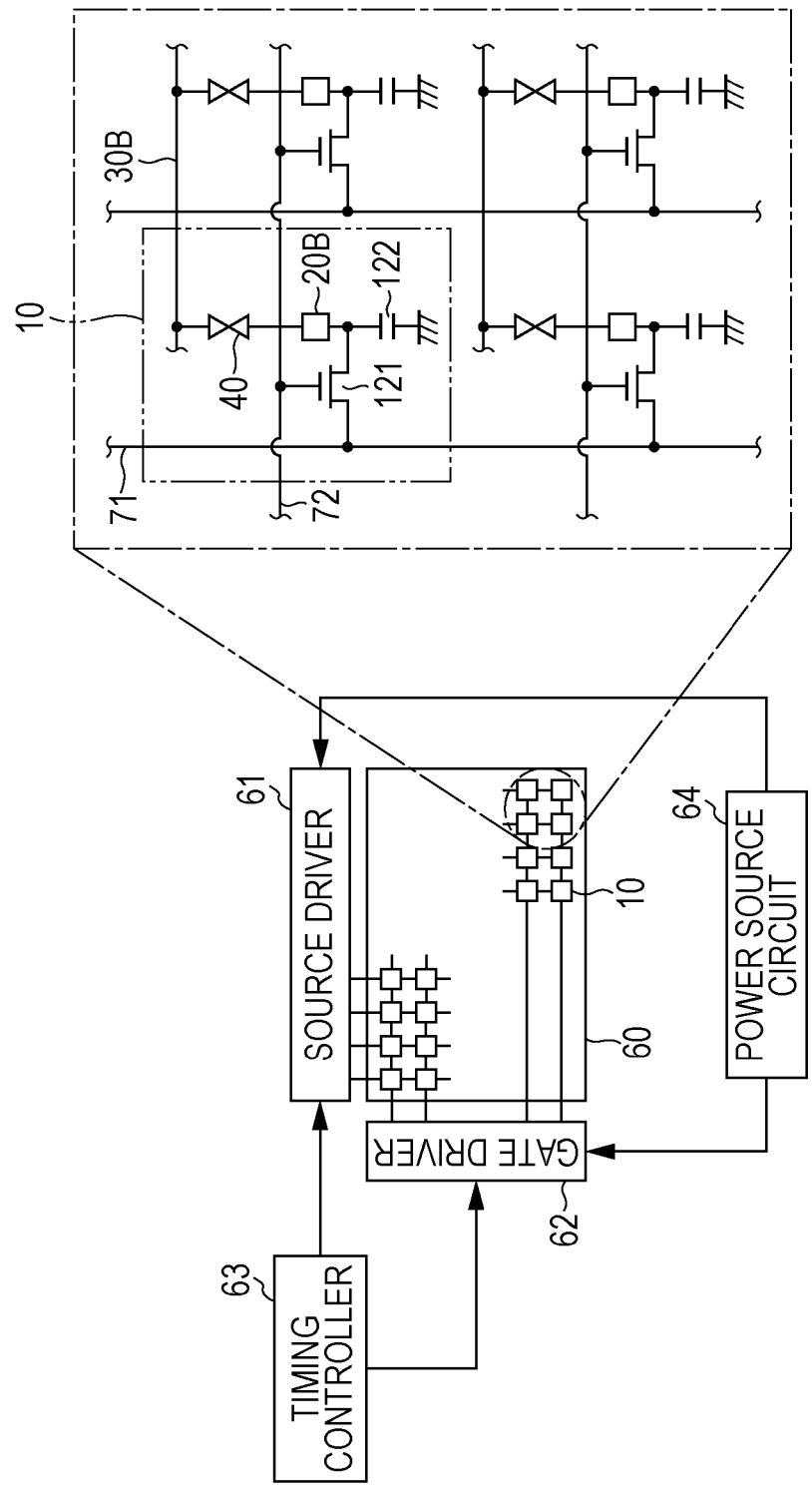
FIG. 11 is a circuit configuration diagram of the liquid crystal display device illustrated in FIG. 1.

FIG. 11 represents a circuit configuration of the liquid crystal display device illustrated in FIG. 1.

As illustrated in FIG. 11, the liquid crystal display device is configured to include a liquid crystal display element that includes a plurality of pixels 10 provided within a display region 60. With such a liquid crystal display device, a source driver 61 and a gate driver 62, timing controller 63 that controls the source driver 61 and the gate driver 62, and a power source circuit 64 that supply power to the source driver 61 and the gate driver 62 are provided in the surroundings of the display region 60.

The display region 60 is a region in which an image is displayed, and is a region that is configured to be able to display an image by a plurality of pixels 10 being arranged in a matrix shape. Here, in FIG. 11, other than the display region 60 including the plurality of pixels 10 being illustrated, a region corresponding to four pixels 10 is illustrated separately enlarged.

In the display region 60, in addition to a plurality of source lines 71 being arranged in the line direction, a plurality of gate lines 72 are arranged in the column direction, and the pixels 10 are respectively arranged at positions in which the source lines 71 and the gate lines 72 intersect one another. Each pixel 10 is configured to include a transistor 121 and a capacitor 122 along with the pixels electrodes 20B and the liquid crystal layer 40. In each transistor 121, a source electrode is connected to a source line 71, a gate electrode is connected to a gate line 72, and a drain electrode is connected to a capacitor 122 and a pixel electrode 20B. Each source line 71 is connected to a source driver 61, and image signals are supplied from the source driver 61. Each gate line 72 is connected to a gate driver 62, and scan signals are sequentially supplied from the gate driver 62.

The source driver 61 and the gate driver 62 select a specific pixel 10 from the plurality of pixels 10.

The timing controller 63 outputs image signals (for example, each of the image signals RGB that correspond to red, green, and blue) and source driver control signals for controlling the actions of the source driver 61, for example, to the source driver 61. Further, the timing controller 63 outputs gate driver control signals for controlling the actions of the gate driver 62, for example, to the gate driver 62. Source driver signals include, for example, horizontally synchronized signals, start pulse signals, source driver clock signals, and the like. Gate driver control signals include, for example, vertically synchronized signals, gate driver clock signals, and the like.

With such a liquid crystal display device, an image is displayed by applying a driving voltage between the first electrodes (pixel electrodes) 20B and the second electrodes (opposing electrodes) 30B in the manner below. Specifically, the source driver 61 supplies individual image signals to a predetermined source line 71 based on an image signal that is similarly input from the timing controller 63 by an input of a source driver control signal from the timing controller 63. In addition, the gate driver 62 sequentially supplies scan signals to the gate lines 72 at predetermined timings by the input of a gate driver control signal from the timing controller 63. In so doing, the pixel 10 positioned at the intersecting portion between the source line 71 to which the image signal is supplied and the gate line 72 to which the scan signal is supplied is selected, and a driving voltage is supplied to the pixel 10.

The present disclosure will be described below based on the embodiments of the present disclosure (abbreviated to "embodiments") and examples.

Embodiment 1

Embodiment 1 relates to the VA mode liquid crystal display device (or liquid crystal display element) according to the first embodiment of the present disclosure and to the manufacturing methods of the liquid crystal display device (or liquid crystal display element) according to the first embodiment or the third embodiment of the present disclosure. In Embodiment 1, the first alignment film 22 is configured to include one or two or more types of a polymer compound including a cross-linked structure as a side chain (first post-alignment process compound). A pretilt is then conferred on the liquid crystal molecules by a cross-linked or polymerized compound. Here, the first post-alignment process compound is generated by providing, after forming the first alignment film 22 in a state of including one or two or more types of the first polymer compound (first pre-alignment process compound) including a main chain or a side chain, the liquid crystal layer 40 and cross-linking or polymerizing the first polymer compound or irradiating the first polymer compound with energy rays, and more specifically, by reacting the cross-linked functional group or the polymerized functional group included in the side chain while an electric field or a magnetic field is applied. Furthermore, the first post-alignment process compound includes a structure of arranging in a predetermined direction (specifically, diagonal direction) with respect to the TFT substrate 20. In so doing, by cross-linking or polymerizing the first polymer compound or irradiating the first polymer compound with energy rays, since a pretilt is conferred on the liquid crystal molecules 41A in the vicinity of the first alignment film 22 by the first post-alignment process compound being included within the first alignment film 22, particularly the startup speed of the image display becomes faster and the image characteristics improve.

On the other hand, the second alignment film 32 is composed of a compound in which the second polymer compound is cross-linked or polymerized. Therefore, compared to a second alignment film configured by a polymer compound in which there is no cross-linking or polymerization, as a result of the second alignment film 32 composed of a compound in which the second polymer compound is cross-linked or polymerized taking in more or adsorbing more of the liquid crystal molecules 41B positioned in the vicinity thereof, when the application of a voltage is interrupted, it is possible to be more quickly aligned in the vertical direction to the second substrate 30. It is therefore possible to improve the termination speed of the image display.

It is preferable that the first pre-alignment process compound include a structure with high heat resistance as the main chain. In so doing, even if the liquid crystal display device (liquid crystal display element) is exposed to a high heat environment, since the first post-alignment process compound within the first alignment film 22 maintains alignment regulating capabilities with respect to the liquid crystal molecules 41, display characteristics such as the contrast are favorably maintained along with the response characteristics, and reliability is secured. Here, it is preferable that the main chain include imide bonds within recurring units. The polymer compound including the polyimide structure represented by Formula 3, for example, is exemplified as a first pre-alignment process compound that includes imide bonds in the main chain. The polymer compound including the polyimide structure illustrated in Formula 3 may be configured by one of the types of the polyimide structures illustrated in Formula 3, a plurality of types may be included by being randomly bonded, or another structure other than the structure illustrated in Formula 3 may be included.

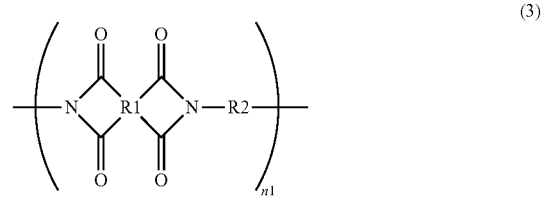

(3)

Here, R1 is a tetravalent organic group, R2 is a divalent organic group, and n1 is an integer of equal to or greater than 1.

Although R1 and R2 in Formula 3 are arbitrary as long as R1 and R2 are tetravalent or divalent groups configured to include carbon atoms, it is preferable that a cross-linked functional group or a polymerized functional group be included in one of R1 and R2 as the side chain. The reason is that it is then easy to obtain sufficient alignment regulating capabilities with the first post-alignment process compound.

Further, with the first pre-alignment process compound, it is sufficient if the side chains have a plurality of bonds with the main chain, and at least one of the plurality of side chains includes a cross-linked functional group or a polymerized functional group. That is, the first pre-alignment process compound may include side chains that are not cross-linked other than side chains that are cross-linked. The side chains that include cross-linked functional groups or polymerized functional groups may be one type or a plurality of types. Although a cross-linked functional group or a polymerized functional group is arbitrary as long as the cross-linked functional group or the polymerized functional group are functional groups that are able to react by cross-linking after the liquid crystal layer 40 is formed, and may be a group that forms a cross-linked structure by an optical reaction or a group that forms a cross-linked structure by a heat reaction, a photoreactive cross-linked functional group or polymerized functional group (photosensitive group with photosensitivity) that forms a cross-linked structure by an optical reaction is preferable. The reason is that it is then easy to regulate the alignment of the liquid crystal molecules 41 in a predetermined direction, enabling the manufacture of a liquid crystal display device (liquid crystal display element) with improved response characteristics as well as favorable display characteristics.

Examples of a photoreactive cross-linked functional group (photosensitive group with photosensitivity, for example, photodimerized photosensitive group) include the structure of one of chalcone, cinnamate, cinnamoyl, coumarin, maleimide, benzophenone, norbornene, oryzanol, and chitosan. Out of the above, the group represented by Formula 41 is an example of a group that includes the structure of chalcone, cinnamate, or cinnamoyl. If a first pre-alignment process compound including a side chain that includes the group illustrated in Formula 41 is cross-linked, the structure illustrated in Formula 42 is formed, for example. That is, the first post-alignment process compound generated from the polymer compound that includes the group illustrated in Formula 41 includes the structure illustrated in Formula 42 with a cyclobutane skeleton. Here, for example, photoreactive cross-linked functional group such as maleimide may in some cases exhibit not only a photodimerization reaction but also a polymerization reaction. Therefore, a polymer compound that includes a cross-linked functional group or a polymerized functional group is expressed as a cross-linked or polymerized compound.

Here, R3 is a divalent group including an aromatic ring, R4 or R1 is a monovalent group including one or two or more ring structures, and R5 is a hydrogen atom, an alkyl group, or a derivative thereof.

R3 in Formula 41 is arbitrary as long as R3 is a divalent group including an aromatic ring such as a benzene ring, and other than an aromatic ring, a carbonyl group, ether bonds, ester bonds, or a hydrocarbon group may be included. Further, R4 in Formula 41 is arbitrary as long as R4 is a monovalent group including one or two or more ring structures, and other than the ring structures, a carbonyl group, ether bonds, an ester group, a hydrocarbon group, a halogen atom, and the like may be included. The ring structure of R4 is arbitrary as long as the ring structure is a ring that includes carbon as the element that configures the skeleton, and for example, an aromatic ring, a heterocyclic ring, an aliphatic ring, a ring structure in which the aromatic ring, the heterocyclic ring, or the aliphatic ring are coupled or condensed, and the like are exemplified as such a ring structure. R5 in Formula 41 is arbitrary as long as R5 is a hydrogen atom, an alkyl group, or a derivative thereof. Here, "derivative" refers to a group in which a portion or all of the hydrogen atoms that the alkyl group has are substituted by a substituent such as halogen atoms. Further, the number of carbon atoms in the alkyl group that is introduced as R5 is arbitrary. Hydrogen atoms or a methyl group is favorable as R5. The reason is that favorable cross-link reactivity is then obtained.

Each R3 in Formula 42 may be the same as or different from one another. The same is also true of each R4 and each R5 in Formula 41. R3, R4, and R5 in Formula 42 include, for example, those that are the same as R3, R4, and R5 in Formula 41.

Examples of the group illustrated in Formula 41 include, for example, the groups represented in Formulae 41-1 to 41-33. However, as long as the group has the structure illustrated in Formula 41, the group is not limited to the groups illustrated in Formulae 41-1 to 41-33.

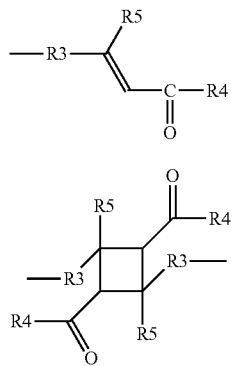

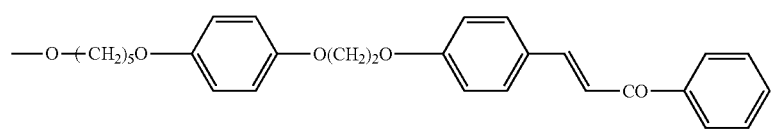

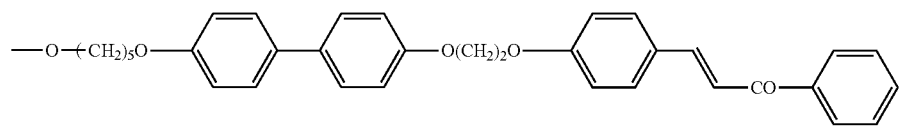

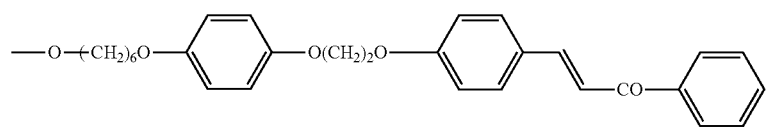

-continued
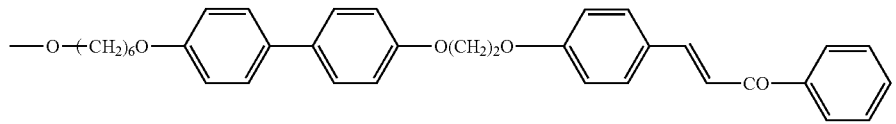
(41-4)
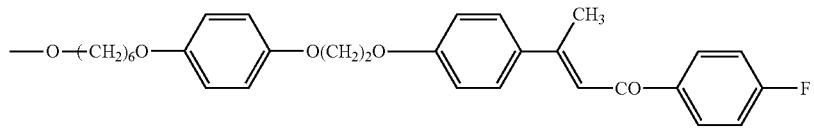
(41-5)
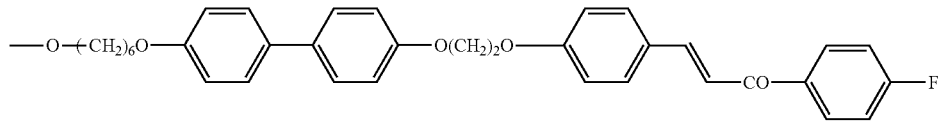
(41-6)
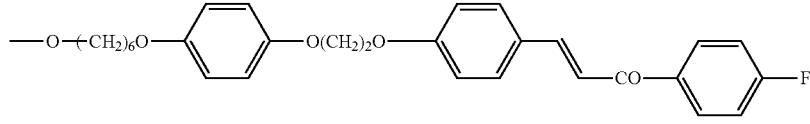
(41-7)
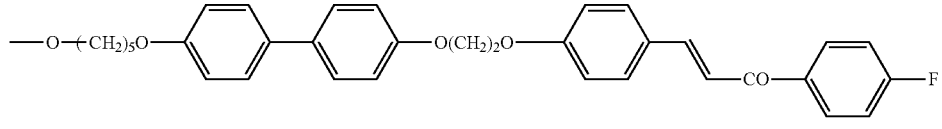
(41-8)
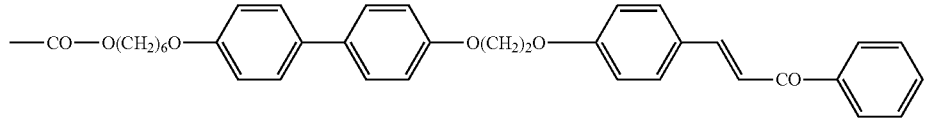
(41-9)
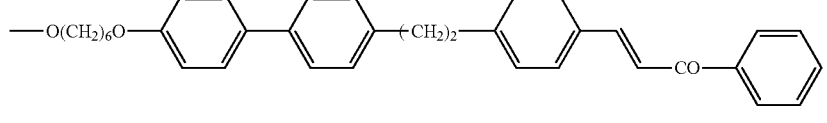
(41-10)
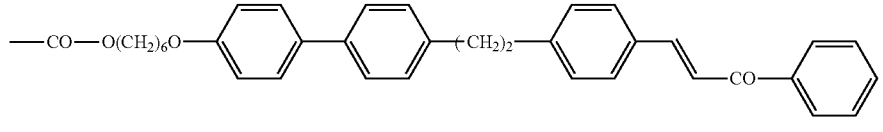
(41-11)
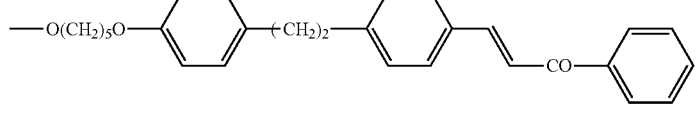
(41-12)
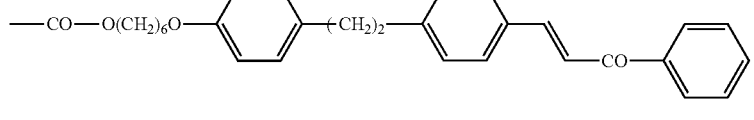
(41-13)
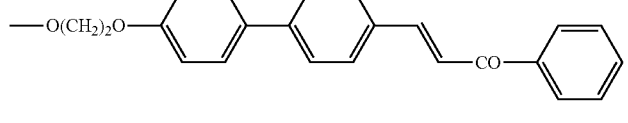
(41-14)
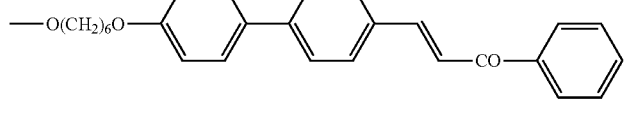
(41-15)

-continued
(41-16)
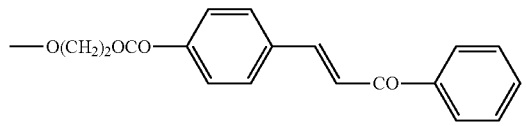
(41-17)
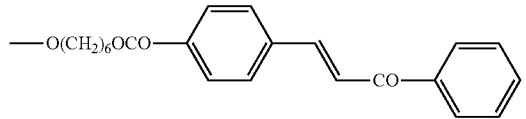
(41-18)
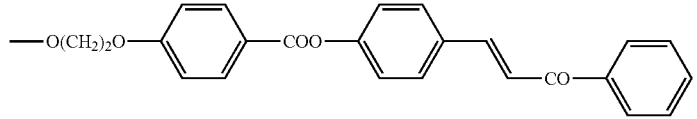
(41-19)
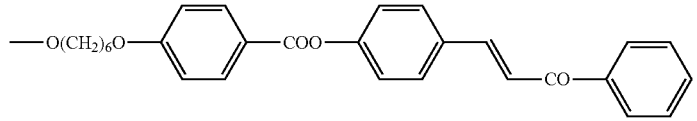
(41-20)
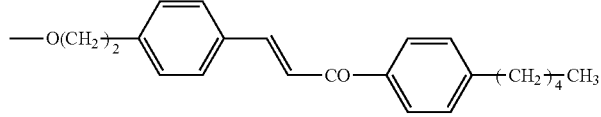
(41-21)
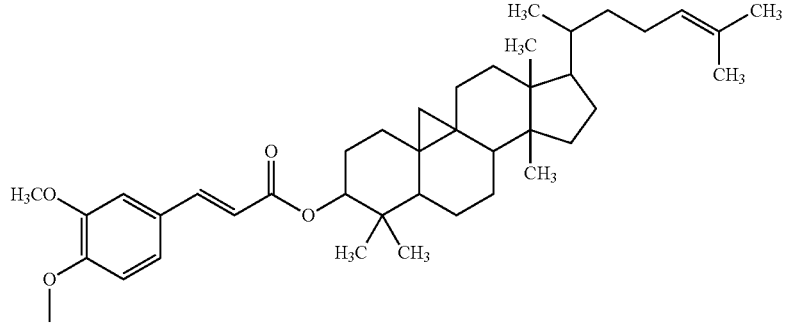
(41-22)
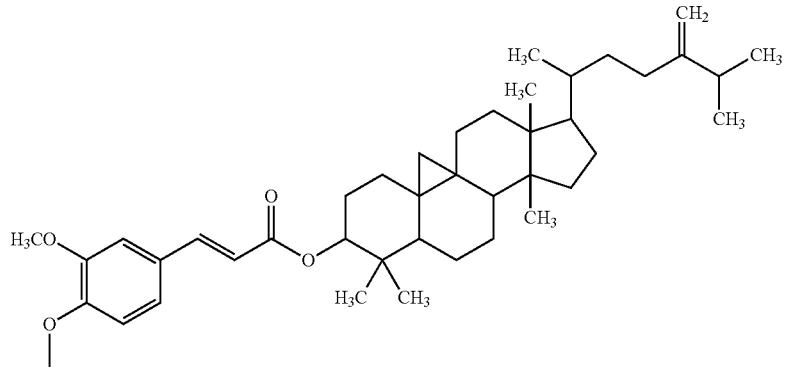

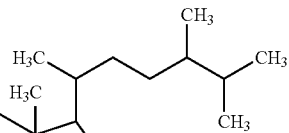(41-23)
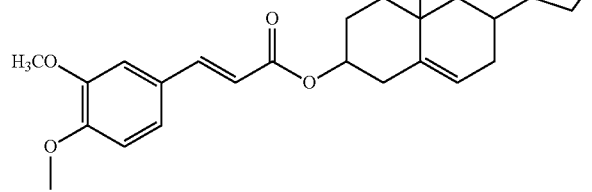
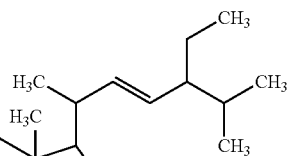(41-24)
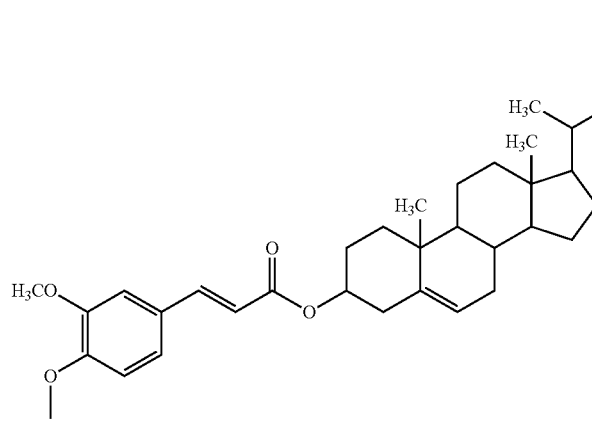
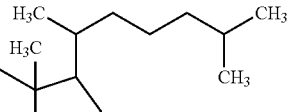(41-25)
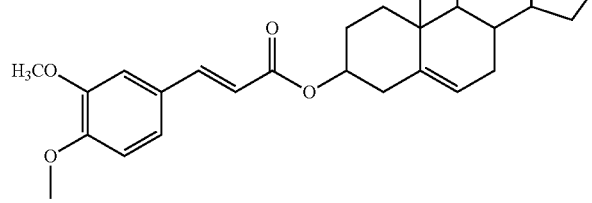
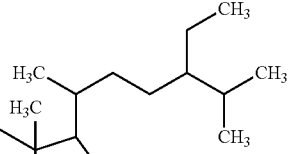(41-26)
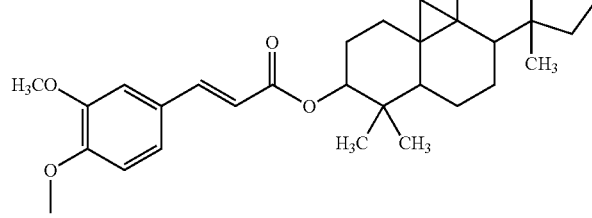
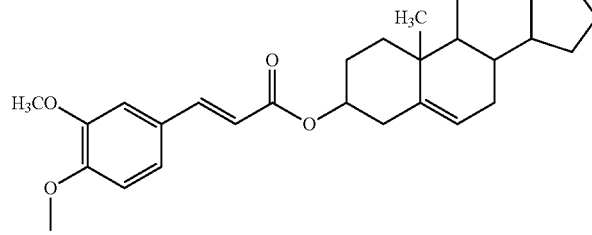

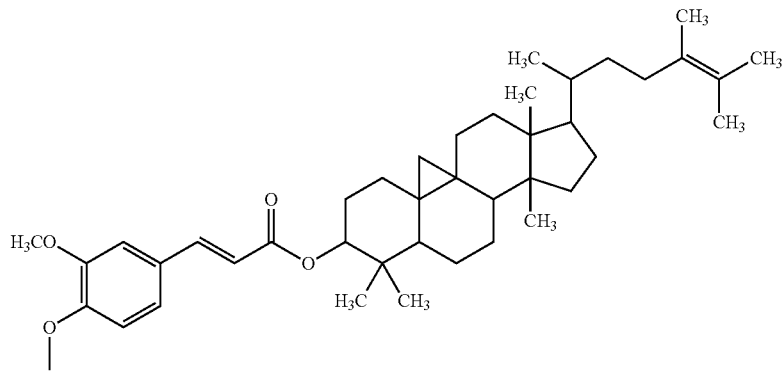
(41-27)

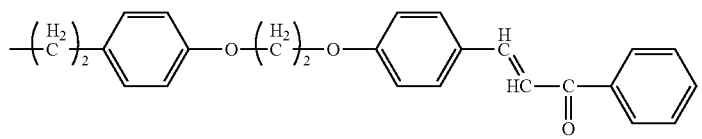
(41-28)

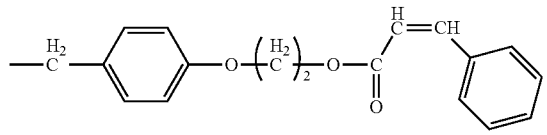
(41-29)

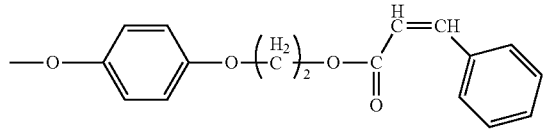
(41-30)

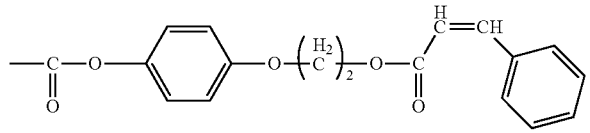
(41-31)

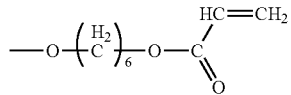
(41-32)

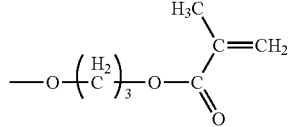
(41-33)

It is preferable that the first pre-alignment process compound include a structure for aligning the liquid crystal molecules 41 in the vertical direction with respect to the substrate faces (hereinafter referred to as "vertical alignment inducing structure portion"). The reason is that even if the first alignment film 22 does not include a compound that includes a vertical alignment inducing structure mechanism portion (so-called normal vertical alignment agent) separately from the first post-alignment process compound, the alignment regulation of the entirety of the liquid crystal molecules 41 becomes possible. Another reason is that a first alignment film 22 that is able to exhibit alignment regulation functions with respect to the liquid crystal layer 40 more evenly are more easily formed than in a case when the compound that includes the vertical alignment inducing structure portion is included. In the first pre-alignment process compound, the vertical alignment inducing structure portion may be included in the main chain, may be included in the side chain, or may be included in both. Further, in a case when the first pre-alignment process compound includes the polyimide structure illustrated in Formula 3, it is preferable that the two types of structures of a structure that includes a vertical alignment inducing structure portion as R2 (recurring units) and a structure that includes a cross-linked functional group or a polymerized functional group as R2 (recurring units) be included, since the two types of structures are easily obtainable. Here, if the vertical alignment inducing structure portion is included in the first pre-alignment process compound, the vertical alignment inducing structure portion is also included in the first post-alignment process compound.

Examples of the vertical alignment inducing structure portion include an alkyl group with ten or more carbon atoms, an alkyl halide group with ten or more carbon atoms, an alkoxy group with ten or more carbon atoms, an alkoxy halide group with ten or more (carbon atoms, an organic group including a ring structure, or the like. Specifically, the structure represented by Formulae 5-1 to 5-6 and the like, for example, are exemplified as structures that include a vertical alignment inducing structure portion.

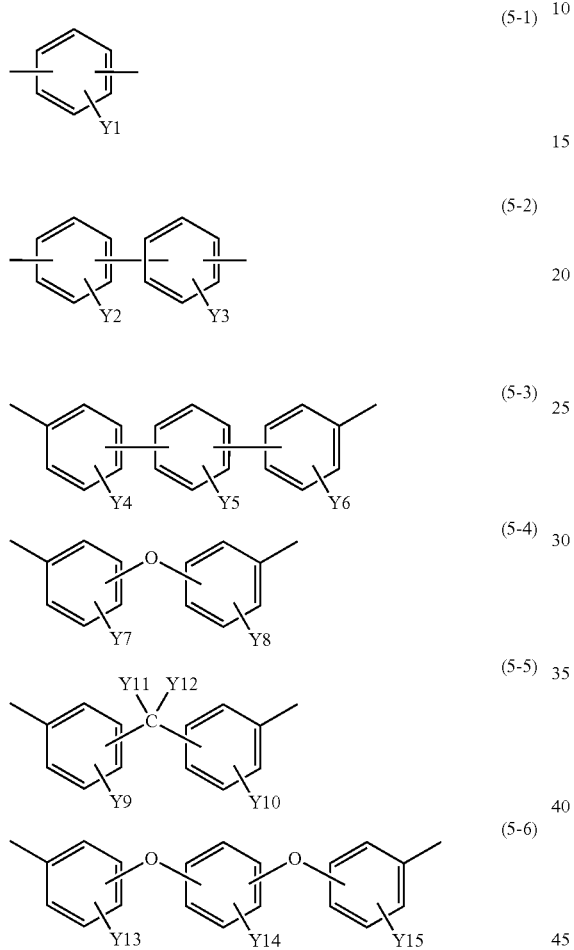

Here, Y1 is an alkyl group with ten or more carbon atoms, an alkoxy group with ten or more carbon atoms, or a monovalent group with a ring structure. Further, Y2 to Y15 are hydrogen atoms, alkyl groups with ten or more carbon atoms, alkoxy groups with ten or more carbon atoms, or monovalent organic groups including a ring structure, and at least one of Y2 and Y3, at least one of Y4 to Y6, at least one of Y7 and Y8, at least one of Y9 to Y12, and at least one of Y13 to Y15 is an alkyl group with ten or more carbon atoms, an alkoxy group with ten or more carbon atoms, or a monovalent group including a ring structure. However, Y11 and Y12 may form a ring structure by bonding.

Further, the groups represented by Formulae 6-1 to 6-23 and the like are exemplified as monovalent organic groups including a ring structure as the vertical alignment inducing structure portion. The groups represented by Formulae 7-1 to 7-7 and the like are exemplified as divalent organic groups including a ring structure as the vertical alignment inducing structure portion.

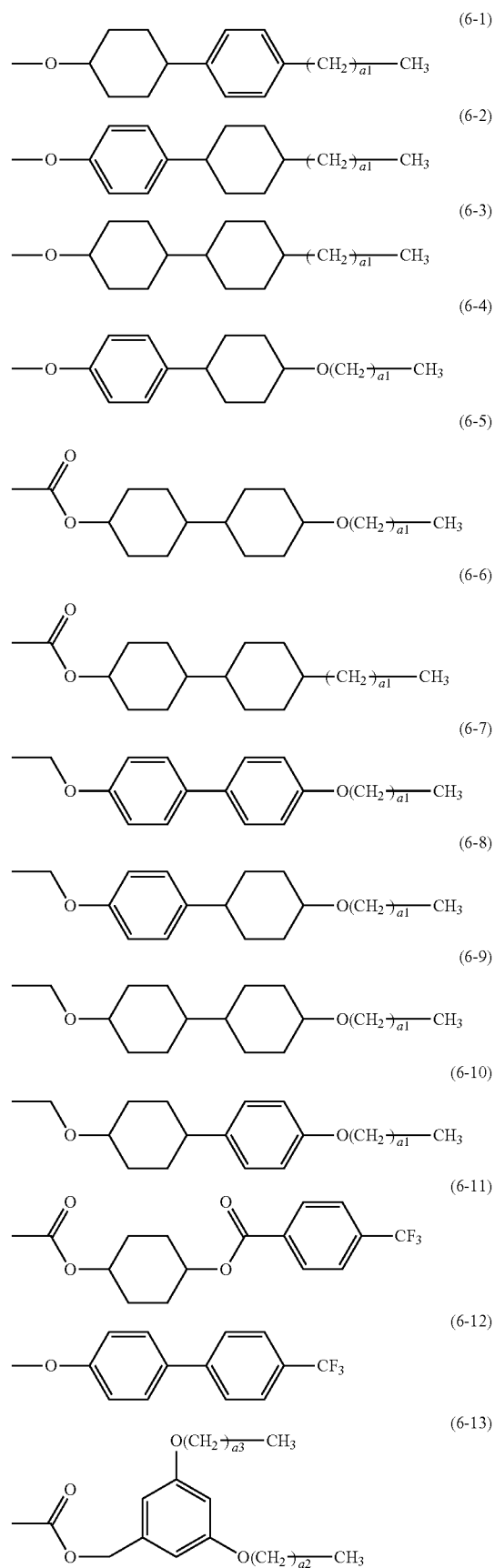

(6-14)
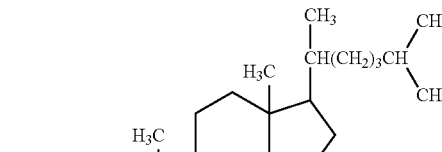
(6-15)
—O—CH₂—⟨benzene⟩—O(CH₂)ₐ₁—CH₃
(6-16)
—O—CH₂—⟨benzene with O(CH₂)ₐ₃—CH₃ and O(CH₂)ₐ₂—CH₃⟩
Here, a1 to a3 are integers equal to or greater than 0 and equal to or less than 21.
(6-17)
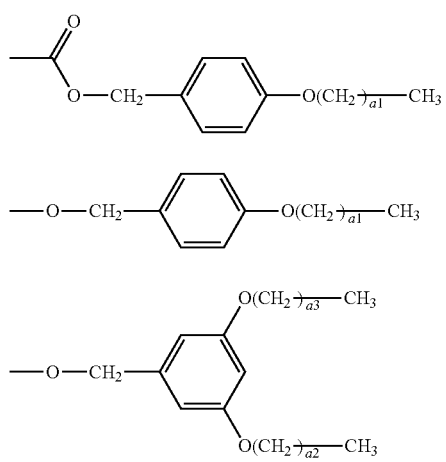
(6-18)
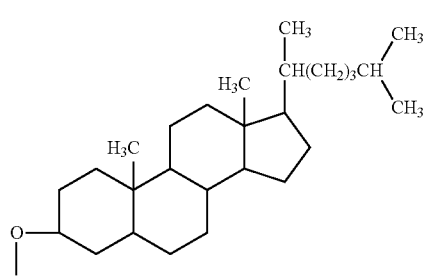
(6-19)
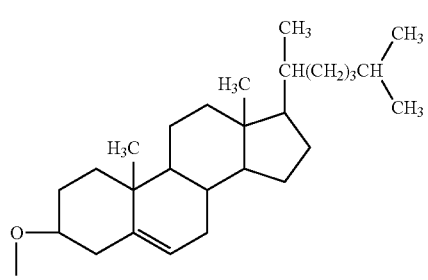
(6-20)
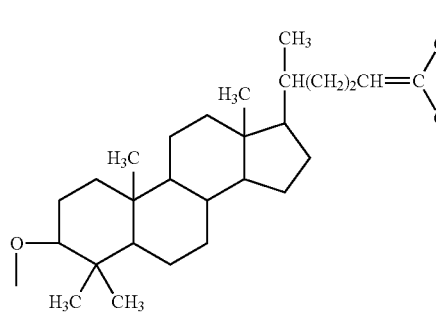
(6-21)
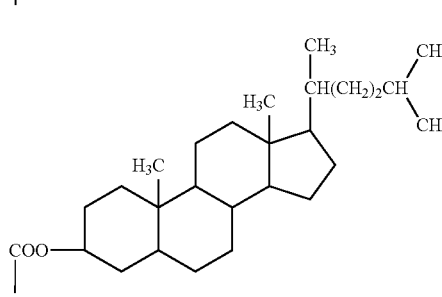
(6-22)
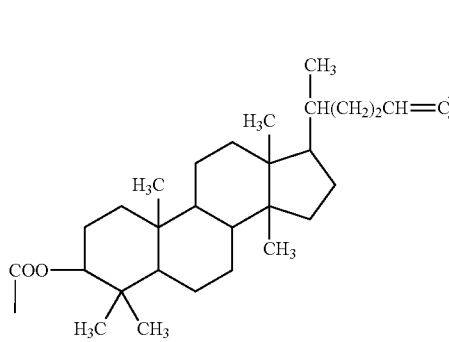
(6-23)
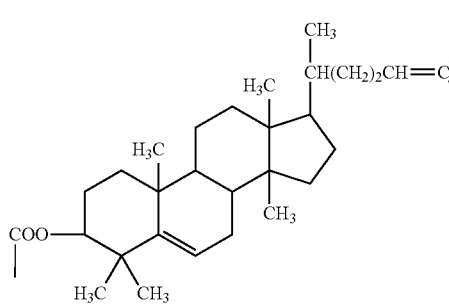
(7-1)
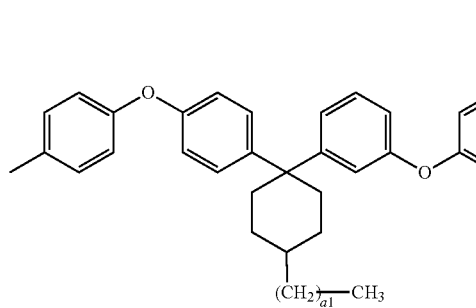

-continued (7-2)
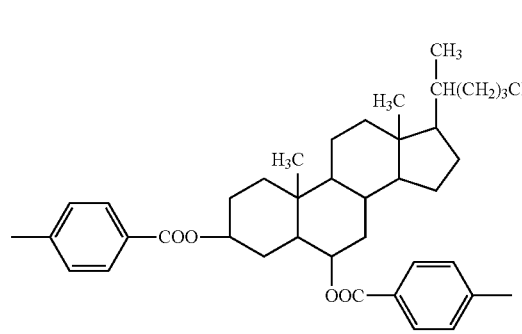

(7-6)
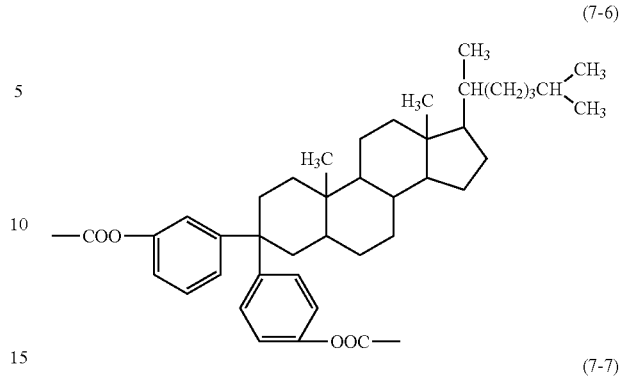

(7-3)
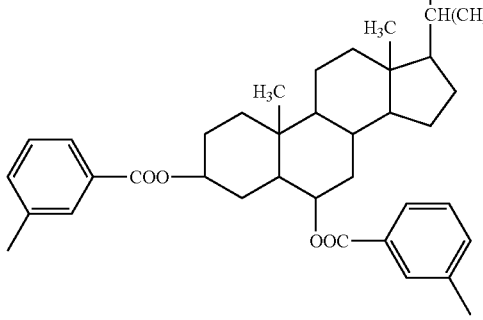

(7-7)
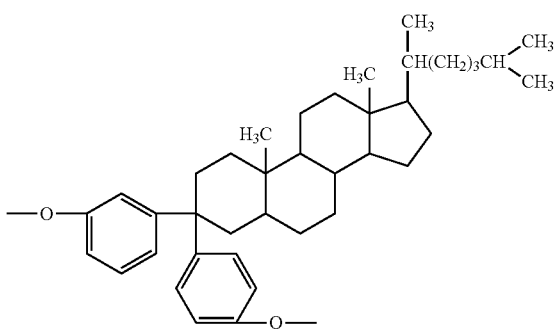

Here, the vertical alignment inducing structure portion is not limited to the group above as long as the vertical alignment inducing structure portion includes a structure that functions so that the liquid crystal molecules 41 are aligned in the vertical direction with respect to the substrate faces.

Further, if expressed according to the configuration of the 1A configuration, the 2A configuration (refer to Embodiment 2 below), or the 3A configuration of the present disclosure, the first polymer compound before cross-linking (first pre-alignment process compound) is composed, other than by a cross-linked functional group or a polymerized functional group, by a compound that includes the group represented by Formula 1 as the side chain. Since the group shown in Formula 1 is able to move along the liquid crystal molecules 41, when the first pre-alignment process compound is cross-linked, the group shown in Formula 1 is fixed along with the cross-linked functional group or the polymerized functional group in a state of being along the alignment direction of the liquid crystal molecules 41. Furthermore, since it becomes easier to regulate the alignment direction of the liquid crystal molecules 41 in a predetermined direction by the fixed group shown in Formula 1, it becomes easier to manufacture a liquid crystal display device with favorable display characteristics.

(7-4)
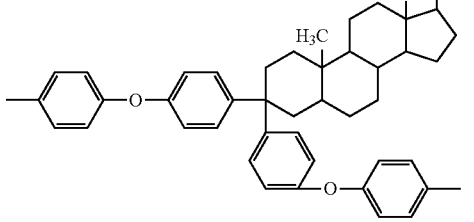

(7-5)
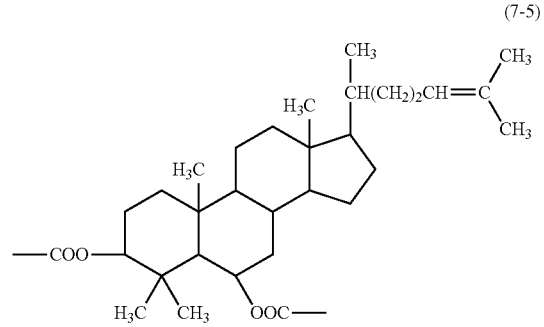

Here, a1 is an integer equal to or greater than 0 and equal to or less than 21.

$$—R1-R2-R3 \quad (1)$$

Here, R1 is a straight-chained or branched divalent organic group of one or more carbon atoms which may include an ether group or an ester group and which is bonded to the main chain of the polymerized compound or the cross-linked compound (first pre-alignment process compound or first post-alignment process compound), or alternatively, R1 is a bonded group of at least one type selected from a group composed of an ether, an ester, an ether ester, an acetal, a ketal, a hemiacetal, and a hemiketal which is bonded to the main chain of the polymerized compound or the cross-linked compound (first pre-alignment process compound or first post-alignment process compound). R2 is a divalent organic group including a plurality of ring structures in which one of the atoms that configure the ring structures is bonded to R1. R3 is a monovalent group including a hydrogen atom, a halogen atom, an alkyl group, an alkoxy group, and a carbonate group, or a derivative thereof.

R1 in Formula 1 is a part for functioning as a spacer portion for conferring, along with fixing R2 and R3 to the main chain, a large pretilt to the liquid crystal molecules if a long R1 is selected and for easily fixing the pretilt angle if a short R1 is selected, and for example, an alkylene group or the like is exemplified as R1. The alkylene group may include ether bonds between the carbon atoms in the middle, and there may be one or two or more locations in which such ether bonds exist. Further, R1 may include a carbonyl group or a carbonate group. It is preferable that the number of carbon atoms in R1 be six or more. The reason is that since the group shown in Formula 1 and the liquid crystal molecules 41 mutually act on each other, it is not easy for the group to be along the liquid crystal molecules 41. It is preferable that the number of carbon atoms be determined so that the length of R1 is similar to the length of the terminal chain of the liquid crystal molecules 41.

R2 in Formula 1 is a part that is along a ring structure (core part) included in general nematic liquid crystal molecules. The same group or skeleton as the ring structure included in the liquid crystal molecules such as, for example, a 1,4-phenelene group, a 1,4-cyclohexylene group, a pyrimidene-2,5-diyl group, a 1,6-naphthalene group, a divalent group with a steroidal skeleton, a derivative thereof, and the like are exemplified as R2. Here, a "derivative" is a group in which one or two or more substituents are introduced to the series of groups above.

R3 in Formula 1 is a portion along the terminal chain of the liquid crystal molecules, and for example, an alkyl group, an alkyl hydride group, and the like are exemplified as R3. However, with the alkyl hydride group, it is sufficient if the hydrogen atoms of at least one of the alkyl groups are substituted by halogen atoms, and the type of the halogen atoms is arbitrary. The alkyl group or the alkyl hydride group May include ether bonds between the carbon atoms in the middle, and there may be one or two or more locations in which such ether bonds exist. Further, R3 may include a carbonyl group or a carbonate group. For the same reasons as with R1, it is preferable that the number of carbon atoms in R3 be six or more.

Specifically, the monovalent groups represented by Formulae 1-1 to 1-12 and the like, for example, are exemplified as the group shown in Formula 1.

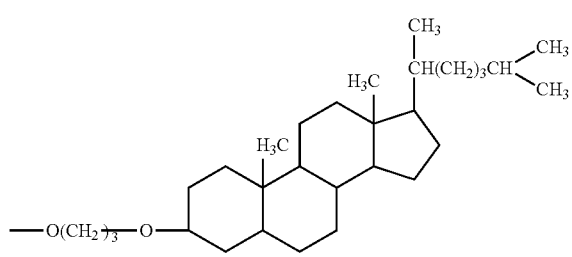
(1-1)

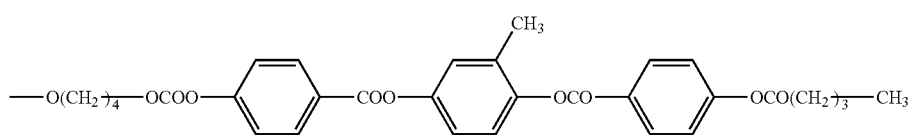
(1-2)

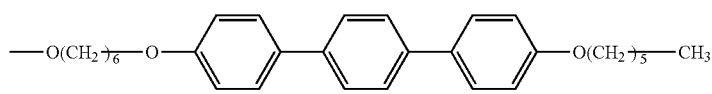
(1-3)

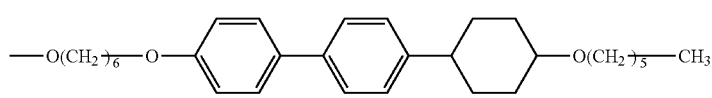
(1-4)

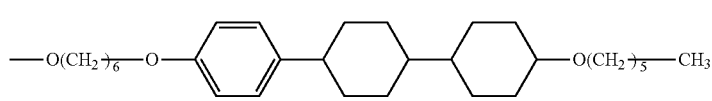
(1-5)

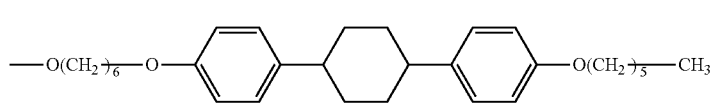
(1-6)

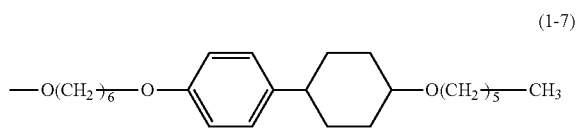
(1-7)

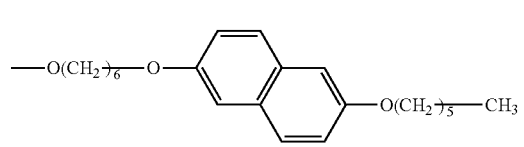
(1-8)

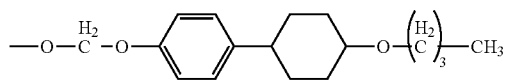 (1-9)

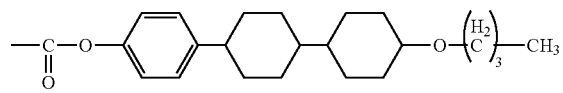 (1-10)

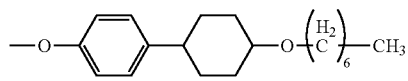 (1-11)

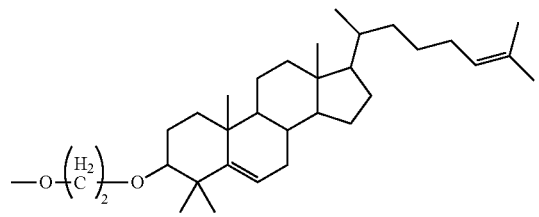 (1-12)

Here, the group illustrated in Formula 1 is not limited to the groups described above as long as the group is able to move along the liquid crystal molecules 41.

Alternatively, if expressed according to the configuration of the 1B configuration, the 2B configuration (refer to Embodiment 2 below), or the 3B configuration of the present disclosure, the first polymer compound before cross-linking (first pre-alignment process compound) is composed of a compound that includes the group represented by Formula 2 as the side chain. Since the polymer compound includes parts that are along the liquid crystal molecules 41 and parts in which the tilt angle is regulated in addition to parts to be cross-linked, it is possible to fix the side chain parts that are along the liquid crystal molecules 41 in a state of being along the liquid crystal molecules 41. In so doing, since it becomes easier to regulate the alignment of the liquid crystal molecules 41 in a predetermined direction, it becomes easier to manufacture a liquid crystal display device with favorable display characteristics.

$$—R11-R12-R13-R14 \quad (2)$$

Here, R11 is a straight-chained or branched divalent organic group of one to twenty carbon atoms, preferably three to twelve carbon atoms which may include an ether group or an ester group and which is bonded to the main chin of the polymerized compound or the cross-linked compound (first pre-alignment process compound or first post-alignment process compound), or alternatively, R11 is a bonded group of at least one type selected from a group composed of an ether, an ester, an ether ester, an acetal, a ketal, a hemiacetal, and a hemiketal which is bonded to the main chain of the polymerized compound or the cross-linked compound (first pre-alignment process compound or first post-alignment process compound). R12 is a divalent group including, for example, one of chalcone, cinnamate, cinnamoyl, coumarin, maleimide, benzophenone, norbornene, oryzanol, chitosan, acryloyl, methacryloyl, vinyl, epoxy, and oxetane, or an ethynylene group. R13 is a divalent organic group including a plurality of ring structures. R14 is a monovalent group including a hydrogen atom, a halogen atom, an alkyl group, an alkoxy group, and a carbonate group, or a derivative thereof.

R11 in Formula 2 is a part that regulates the tilt angle in the first pre-alignment process compound, and it is preferable that first the pre-alignment process compound be flexible. The group described with regard to R1 in Formula 1 is exemplified, for example, as R11. With the group shown in Formula 2, since R12 to R14 tend to move with R11 as the axis, R13 and R14 are easily able to be along the liquid crystal molecules 41. It is preferable that the number of carbon atoms in R11 be 6 to 10.

R12 in Formula 2 is a part that includes a cross-linked functional group or a polymerized functional group. As described above, such a cross-linked functional group or polymerized functional group may be a group that forms a cross-linked structure by an optical reaction or may be a group that forms a cross-linked structure by a heat reaction. Specifically, for example, a divalent group including the structure of at least one of chalcone, cinnamate, cinnamoyl, coumarin, maleimide, benzophenone, norbornene, oryzanol, chitosan, acryloyl, methacryloyl, vinyl, epoxy, and oxetane, an ethynylene group, and the like are exemplified as R12.

R13 in Formula 2 is a part that is able to be along the core part of the liquid crystal molecules 41, and the group described in relation to R2 in Formula 1 or the like, for example, is exemplified as R13.

R14 in Formula 2 is a part that is along the terminal chain of the liquid crystal molecules 41, and the group described in relation to R3 in Formula 1 or the like, for example, is exemplified as R14.

Specifically, the monovalent group represented by Formulae 2-1 to 2-11 or the like, for example, is exemplified as the group shown in Formula 2.

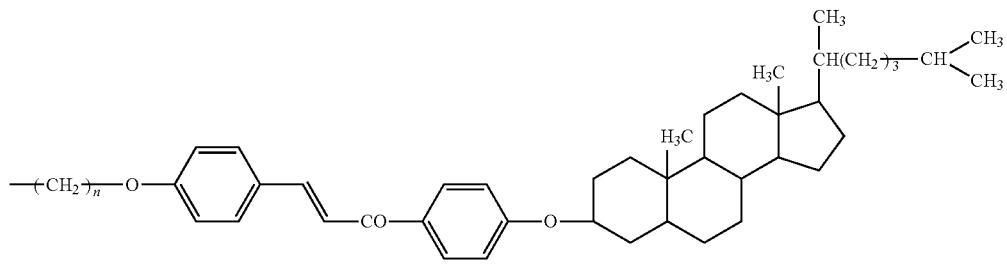
(2-1)
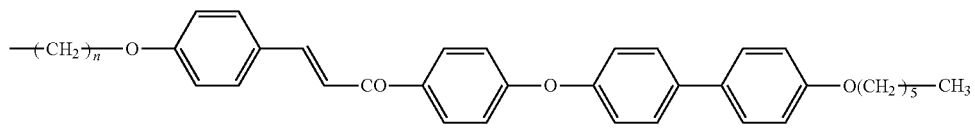
(2-2)
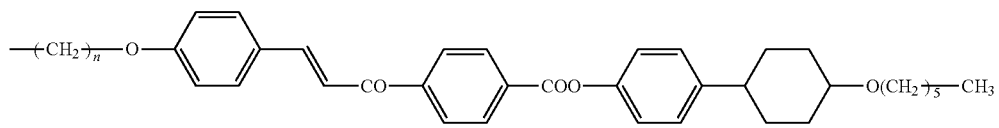
(2-3)
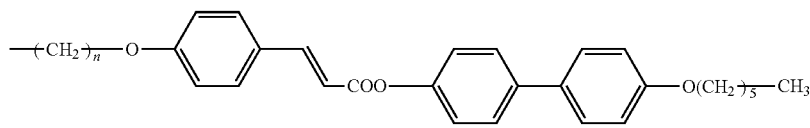
(2-4)
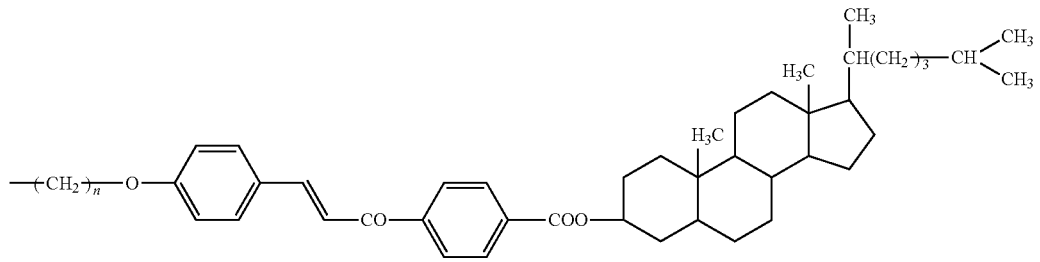
(2-5)
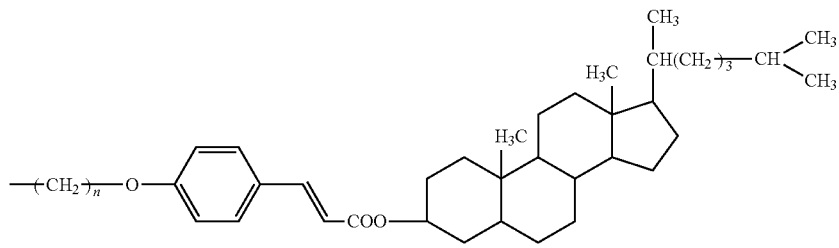
(2-6)
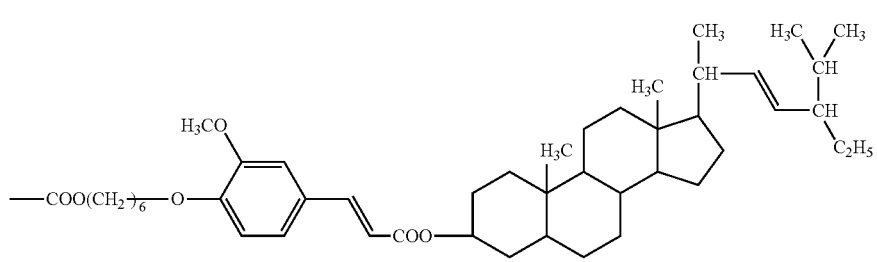
(2-7)
Here, n is an integer equal to or greater than 3 and equal to or less than 20.

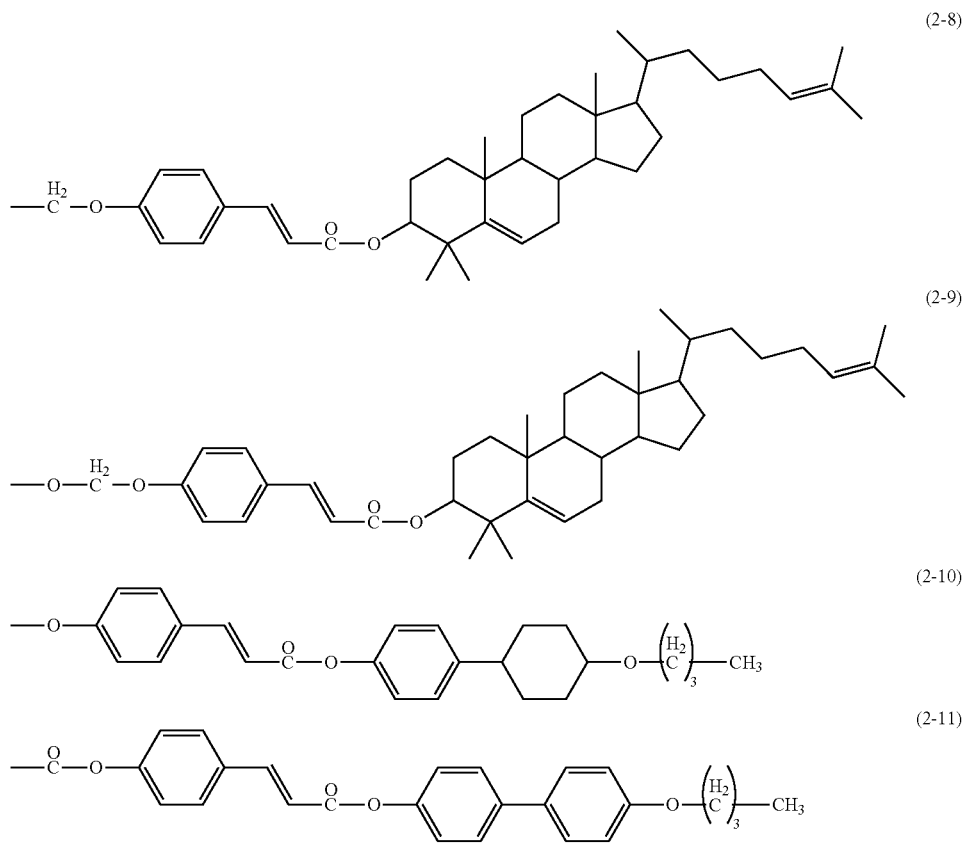

Here, the group shown in Formula 2 is not limited to the groups above as long as the group includes the four parts (R11 to R14) described above.

Alternatively, if expressed according to the 1C configuration of the present disclosure, a compound (first post-alignment process compound) obtained by cross-linking the first polymer compound (first pre-alignment process compound) is configured by a side chain and a main chain that supports the side chain with respect to the substrates, the side chain is configured by being bonded to the main chain, a cross-linked portion in which a portion of the side chain is cross-linked, and a terminal structure portion that is bonded to the cross-linked portion, and a pretilt is conferred by the liquid crystal molecules being along the terminal structure portion or being interposed by the terminal structure portion. Further, if expressed according to the 2C configuration of the present disclosure (refer to Embodiment 0.2 below), a compound (first post-alignment process compound) obtained by deforming the first polymer compound (first pre-alignment process compound) is configured by a side chain and a main chain that supports the side chain with respect to the substrates, the side chain is configured by being bonded to the main chain, a deformed portion in which a portion of the side chain is deformed, and a terminal structure portion that is bonded to the deformed portion, and a pretilt is conferred by the liquid crystal molecules being along the terminal structure portion or being interposed by the terminal structure portion. Further, if expressed according to the 3C configuration of the present disclosure, a compound obtained by irradiating the polymer compound with energy rays is configured by a side chain and a main chain that supports the side chain with respect to the substrates, the side chain is configured by being bonded to the main chain, a cross-linked or deformed portion in which a portion of the side chain is cross-linked or deformed, and a terminal structure portion that is bonded to the cross-linked or deformed portion, and a pretilt is conferred by the liquid crystal molecules being along the terminal structure portion or being interposed by the terminal structure portion.

Figure 13:
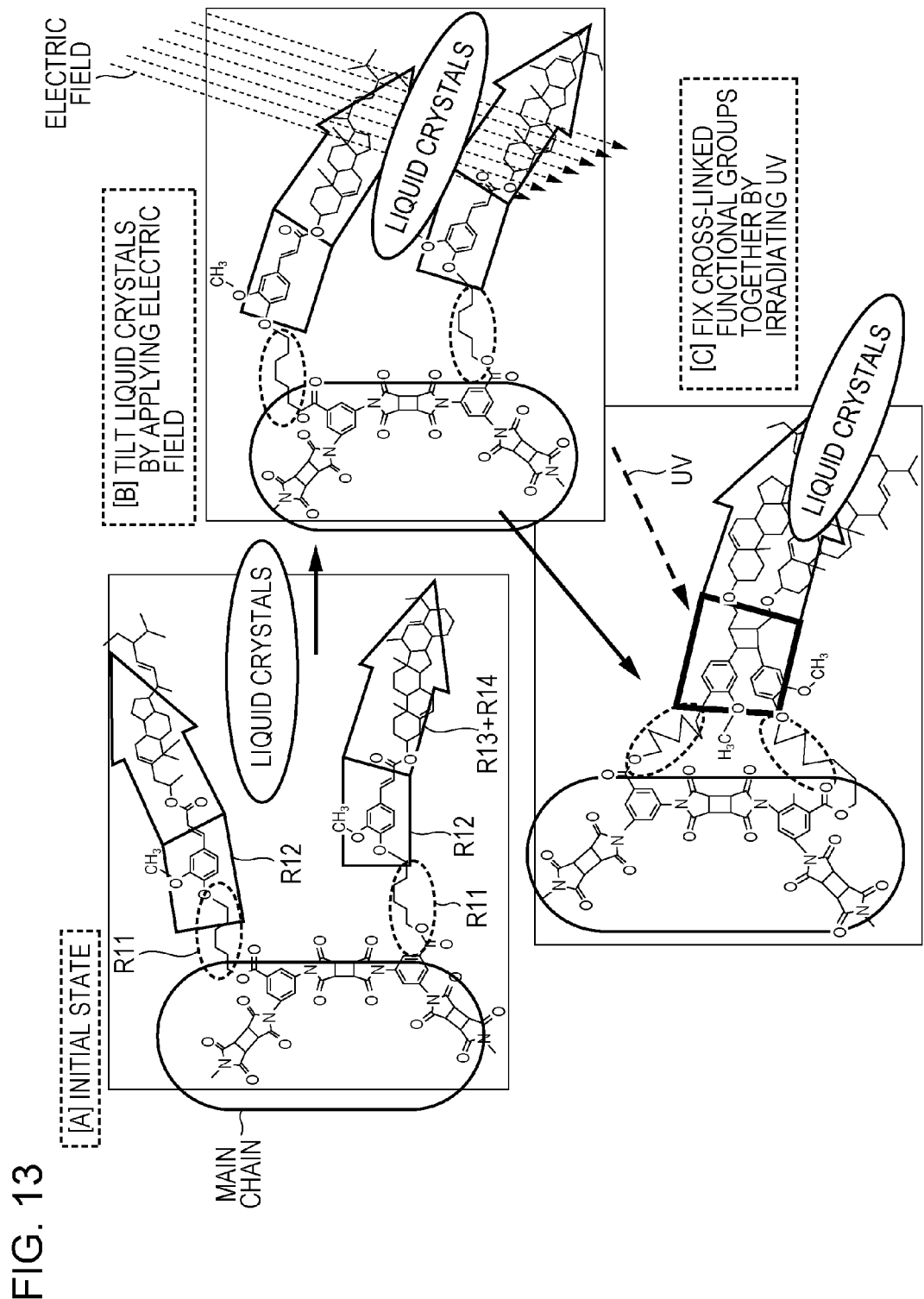
FIG. 13 is an outline diagram for describing the relationship between a cross-linked polymer compound and the liquid crystal molecules.

Here, according to the 1C configuration of the present disclosure, the cross-linked portion in which a portion of the side chain is cross-linked equates to R12 of Formula 2 (however, after cross-linking). Further, the terminal structure portion equates to R13 and R14 in Formula 2. Here, with the first post-alignment process compound, a pretilt is conferred on the liquid crystal molecules, for example, when the cross-linked portions of two side chains extending from the main chain are cross-linked to each other, by a portion of the liquid crystal portions being almost interposed between a terminal structure portion extending from one of the cross-linked portions and a terminal structure portion extending from the other cross-linked portion while the terminal structure portions are fixed in a state of holding a predetermined angle with respect to the substrates. Here, such a state is illustrated in the outline diagram of FIG. 13.

Alternatively, if expressed according to the 1D configuration of the present disclosure, a compound (first post-alignment process compound) obtained by cross-linking the first polymer compound (first pre-alignment process compound) is configured by a side chain and a main chain that supports the side chain with respect to the substrates, the side chain is configured by being bonded to the main chain, a cross-linked portion in which a portion of the side chain is cross-linked, and a terminal structure portion that is bonded to the cross-linked portion and that includes a mesogenic group. Here, the side chain takes the form of including a photodimerized photosensitive group. Further, the main chain and the cross-linked portion are bonded by covalent bonds and the cross-linked portion and the terminal structure portion are bonded by covalent bonds. Further, if expressed according to the 2D configuration of the present disclosure (refer to Embodiment 2 below), a compound (first post-alignment process compound) obtained by deforming the first polymer compound (first pre-alignment process compound) is configured by a side chain and a main chain that supports the side chain with respect to the substrates, the side chain is configured by being bonded to the main chain, a deformed portion in which a portion of the side chain is deformed, and a terminal structure portion that is bonded to the deformed portion and that includes a mesogenic group. Further, if expressed according to the 3D configuration of the present disclosure, a compound (first post-alignment process compound) obtained by irradiating the first polymer compound (first pre-alignment process compound) with energy rays is configured by a side chain and a main chain that supports the side chain with respect to the substrates, the side chain is configured by being bonded to the main chain, a cross-linked or deformed portion in which a portion of the side chain is cross-linked or deformed, and a terminal structure portion that is bonded to the cross-linked or deformed portion and that includes a mesogenic group.

Here, according to the 1D configuration of the present disclosure, as described above, a group that includes the structure of one of chalcone, cinnamate, cinnamoyl, coumarin, maleimide, benzophenone, norbornene, oryzanol, and chitosan, for example, is exemplified as the photodimerized photosensitive group that is a cross-linked functional group or a polymerized functional group (photosensitive functional group. A group that includes the structure of one of acryloyl, methacryloyl, vinyl, epoxy, and oxetane, for example, is exemplified as the polymerized functional group. A rigid mesogenic group that configures the terminal structure portion may exhibit liquid crystallinity or as a side chain or may not exhibit liquid crystallinity, and as a specific structure, a steroid derivative, a cholesterol derivative, biphenyl, triphenyl, naphthalene, and the like are exemplified. Further, R13 and R14 in Formula 2 are exemplified as the terminal structure portion.

Further, the alignment films 22 and 32 may include other vertical alignment agents other than the post-alignment process compound described above. Polyamide that includes a vertical alignment inducing structure portion, polysiloxane that includes a vertical alignment inducing structure portion, and the like are exemplified as other vertical alignment agents.

The liquid crystal layer 40 includes the liquid crystal molecules 41 with negative dielectric constant anisotropy. The liquid crystal molecules 41 have negative dielectric constant anisotropy by being rotationally symmetrical with the long axis and the short axis that intersect each other respectively as the center axis.

The liquid crystal molecules 41 are categorized into liquid crystal molecules 41A that are maintained by the first alignment film 22 in the vicinity of the interface with the first dielectric film 22, liquid crystal molecules 41B that are maintained by the second alignment film 32 in the vicinity of the interface with the second alignment film 32, and liquid crystal molecules 41C that are the remainder. The liquid crystal molecules 41C are positioned in an intermediate region in the thickness direction of the liquid crystal layer 40, and are arranged so that the long axis direction (director) of the liquid crystal molecules 41C is approximately vertical to the first substrate 20 and the second substrate 30 when the driving voltage is in an OFF state. Further, the liquid crystal molecules 41B are positioned in the vicinity of the second alignment film 32 and are arranged so that the long axis direction (director) of the liquid crystal molecules 41B is vertical with respect to the second substrate 30 when the driving voltage is in an OFF state. Furthermore, the liquid crystal molecules 41A are positioned in the vicinity of the first alignment film 22 and are arranged so that the long axis direction (director) of the liquid crystal molecules 41A is inclined with the first pretilt angle $\theta_1$ with respect to the first substrate 20 when the driving voltage is in an OFF state.

Figure 4:
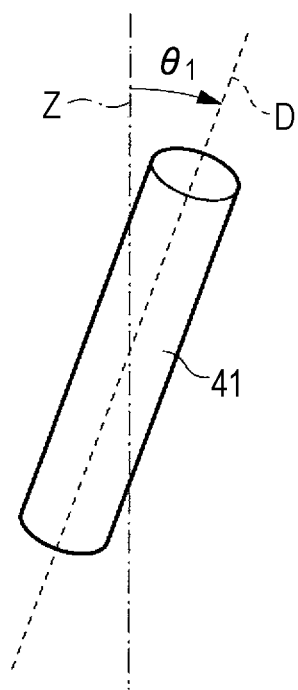
FIG. 4 is a cross-sectional diagram for describing the pretilt of liquid crystal molecules.

Here, when the driving voltage is turned ON, the directors of the liquid crystal molecules 41A are aligned tilted to be parallel to the first substrate 20 and the second substrate 30. Such behavior is due to the dielectric constant of the long axis being smaller than the short axis in the liquid crystal molecules 41A. Since the liquid crystal molecules 41B and 41C have the same property, the liquid crystal molecules 41B and 41C in essence exhibit the same behavior as the liquid crystal molecules 41A according to changes in the ON and OFF states of the driving voltage. Here, when the driving voltage is in an OFF state, the first pretilt angle $\theta_1$ is conferred on the liquid crystal molecules 41A by the first alignment film 22, and the director thereof have an inclined stance from the normal vector direction of the first substrate 20 and the second substrate 30. On the other hand, the liquid crystal molecules 41B are vertically aligned by the second alignment film 32 (angle $\theta_2$ with the normal vector of the second alignment film 32). Here, "maintained" refers to regulating the alignment of the liquid crystal molecules 41 without the alignment films 22 and 32 and the liquid crystal molecules 41A and 41B being fixed together. Further, as illustrated in FIG. 4, in a case when a direction that is vertical to the surface of the first substrate 20 (normal vector direction) is Z, "pretilt angle $\theta_1$" refers to the inclination angle of directors D of the liquid crystal molecules 41A with respect to the Z direction when the driving voltage is in an OFF state.

With the liquid crystal layer 40, $0 \text{ (degrees)} \leq \theta_2 \leq 0.5$ (degrees) and $\theta_1 - \theta_2 \leq 1.0$ (degrees) are satisfied. In so doing, the response speed (startup speed of the image display) to the application of the driving voltage improves. It is desirable that the pretilt angle $\theta_1$ be from 1° to 4°.

Figure 5:
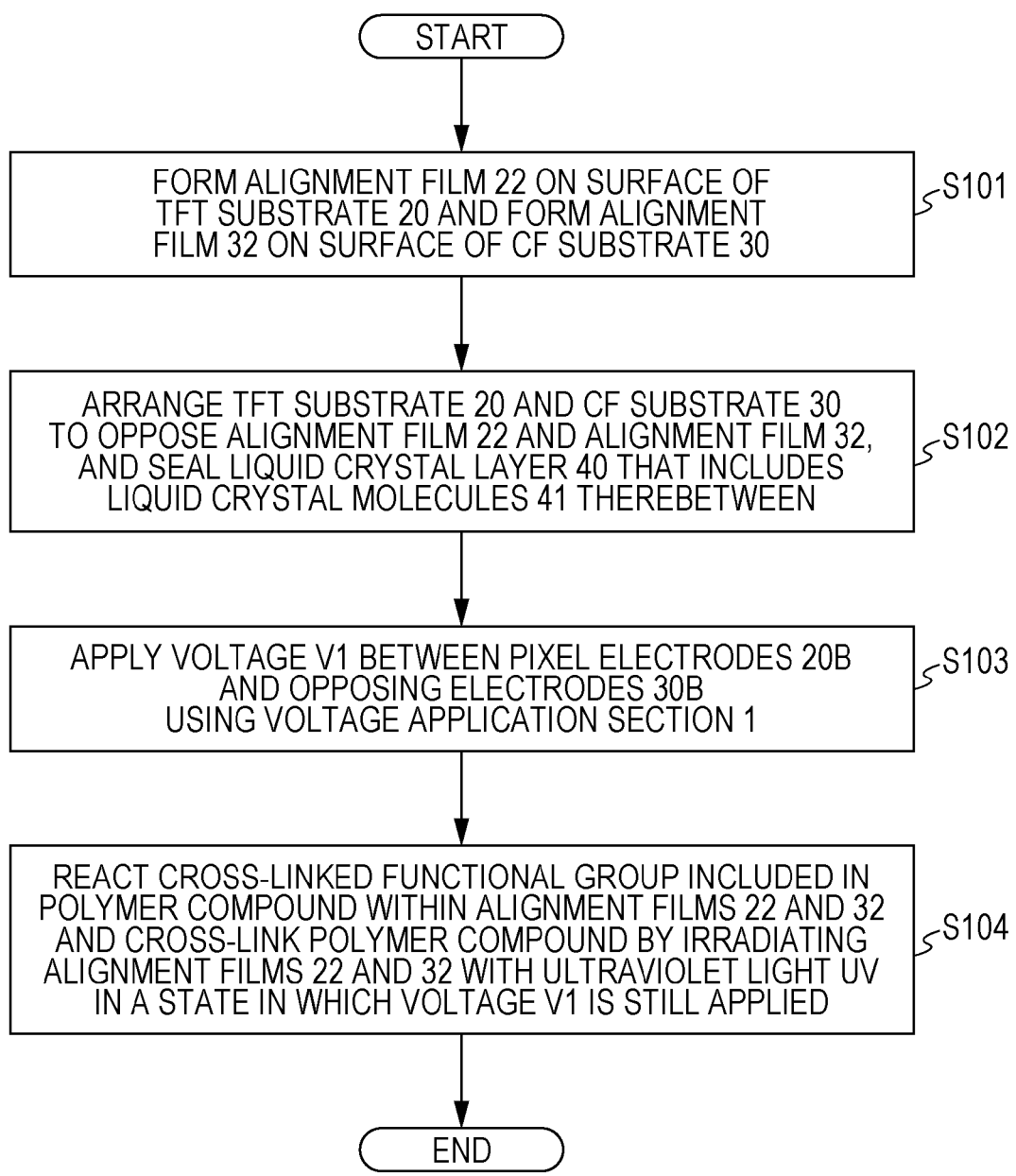
FIG. 5 is a flowchart for describing a manufacturing method of the liquid crystal display device illustrated in FIG. 1.

Next, although a manufacturing method of the liquid crystal display device (liquid crystal display element) described above will be described with reference to the flowchart illustrated in FIG. 5, the schematic diagram for describing the state of the first alignment film 22 illustrated in FIG. 6, and the partial cross-sectional diagrams of the liquid crystal display device and the like illustrated in FIGS. 7 to 9, such a manufacturing method includes forming the first alignment film 22 composed of the first polymer compound including a cross-linked functional group or a polymerized functional group as a side chain on one of the pair of substrates 20 and 30 (specifically, the substrate 20) and forming the second alignment film 32 composed of the second polymer compound on the other of the pair of substrates 20 and 30 (specifically, the substrate 30), arranging the pair of substrates 20 and 30 so that the first alignment film 22 and the second alignment film 32 are opposing and sealing the liquid crystal layer 40 that includes the liquid crystal molecules 41 with negative dielectric constant anisotropy between the first alignment film 22 and the second alignment film 32, and conferring a pretilt on the liquid crystal molecules 41 by the first alignment film 22 by cross-linking or polymerizing the first polymer compound and the second polymer compound and vertically aligning the liquid crystal molecules 41 by the second alignment film 32.

Alternatively, the manufacturing method includes forming the first alignment film 22 composed of the first polymer compound including a cross-linked functional group or a photosensitive functional group as a side chain on one of the pair of substrates 20 and 30 (specifically, the substrate 20) and forming the second alignment film 32 composed of the second polymer compound on the other of the pair of substrates 20 and 30 (specifically, the substrate 30), arranging the pair of substrates 20 and 30 so that the first alignment film 22 and the second alignment film 32 are opposing and sealing the liquid crystal layer 40 that includes the liquid crystal molecules 41 with negative dielectric constant anisotropy between the first alignment film 22 and the second alignment film 32, and conferring a pretilt on the liquid crystal molecules by the first alignment film 22 by irradiating the first polymer compound and the second polymer compound with energy rays and cross-linking, polymerizing, or deforming the first polymer compound and vertically aligning the liquid crystal molecules by the second alignment film 32 by cross-linking or polymerizing the second polymer compound. Here, in FIGS. 7 to 9, for convenience, only one pixel is illustrated.

Specifically, first, the first alignment film 22 is formed on the surface of the first substrate (TFT substrate) 20 and the second alignment film 32 is formed on the surface of the second substrate (CF substrate) 30 (step S101).

More specifically, first, the TFT substrate 20 is produced by providing the pixel electrodes 20B that includes the predetermined first slit portions 21 on the surface of the first substrate 20 in a matrix shape, for example. Further, the CF substrate 30 is produced by providing the opposing electrodes 30B on the color filter of the second substrate 30 on which a color filter is formed.

On the other hand, a liquid first alignment film material is prepared by mixing the first pre-alignment process compound or a polymer compound precursor as the first pre-alignment process compound, a solvent, and a vertical alignment agent as necessary. Further, a liquid second alignment film material is prepared by mixing the second pre-alignment process compound or a polymer compound precursor as the second pre-alignment process compound and a solvent.

In a case when the polymer compound that includes a cross-linked functional group or a polymerized functional group as the side chain, for example, includes the polyimide structure shown in Formula 3 as the polymer compound precursor as the first pre-alignment process compound, polyamic acid that includes a cross-linked functional group or a polymerized functional group is exemplified. The polyamic acid as the polymer compound precursor is synthesized by reacting a diamine compound with a tetracarboxylic dianhydride, for example. At least one of the diamine compound and the tetracarboxylic dianhydride used here includes a cross-linked functional group or a polymerized functional group. As the diamine compound, for example, the compounds including a cross-linked functional group or a polymerized functional group represented in Formulae A-1 to A-21 are exemplified, and as the tetracarboxylic dianhydride, the compounds including a cross-linked functional group or a polymerized functional group represented by Formulae a-1 to a-10 are exemplified. Here, the compounds represented by Formulae A-9 to A-21 are compounds that configure the cross-linked portions of the cross-linked polymer compound and the terminal structure portion according to the 1C configuration of the present disclosure. Alternatively, the compounds represented by Formulae F-1 to F-22 are exemplified as the compound that configures the cross-linked portions of the cross-linked polymer compound and the terminal structure portion according to the 1C configuration of the present disclosure. Here, with regard to the compounds represented by Formulae F-1 to F-18, it is considered that a pretilt is conferred on the liquid crystal molecules along the terminal structure portions of the compounds represented by Formulae F-1 to F-3, Formulae F-7 to F-9, and Formulae F-13 to F-15, and on the other hand, it is considered that a pretilt is conferred on the liquid crystal molecules by being interposed by the terminal structure portions of the compounds represented by Formulae F-4 to F-6, Formulae F-10 to F-12, and Formulae F-16 to F-18. Further, it is presumed that a pretilt is conferred on the liquid crystal molecules along the terminal structure portions of the compounds represented by Formulae F-19 to F-22, or alternatively that a pretilt is conferred on the liquid crystal molecules by being interposed between the terminal structure portions of the compounds represented by Formulae F-19 to F-22.

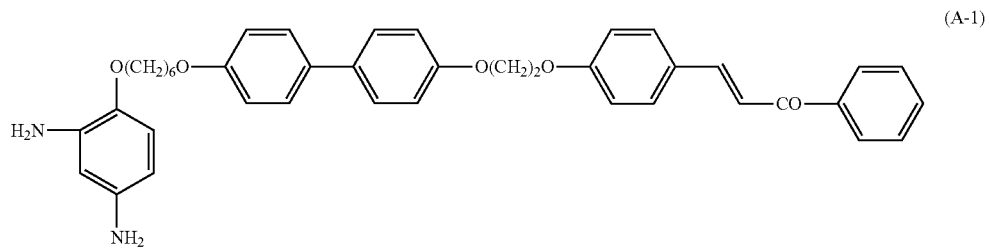

(A-1)

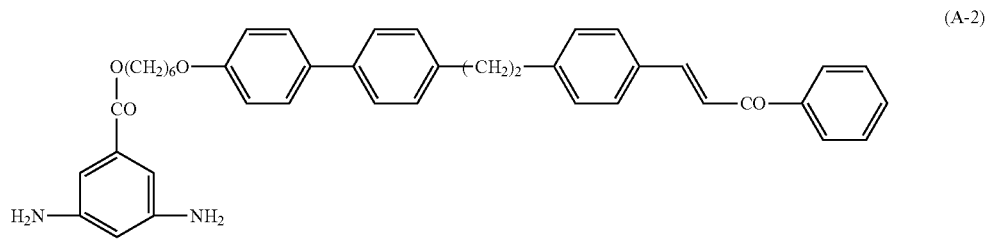

(A-2)

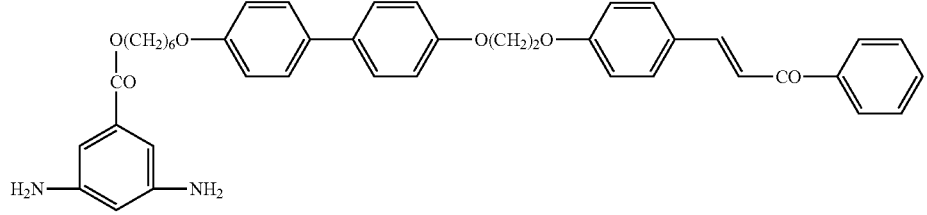
(A-3)
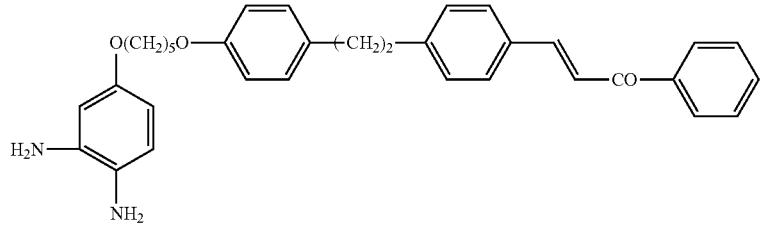
(A-4)
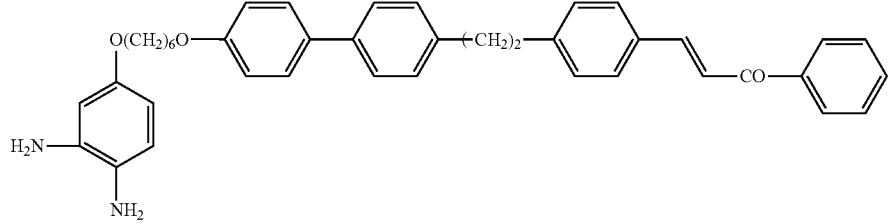
(A-5)
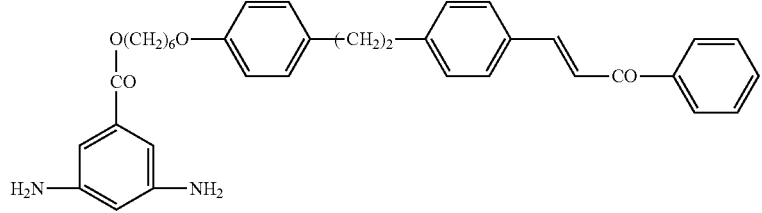
(A-6)
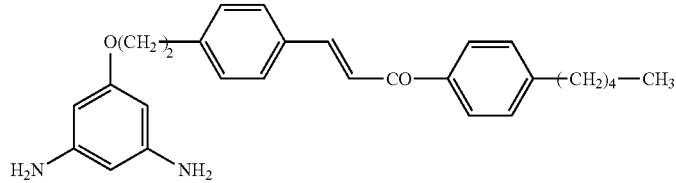
(A-7)
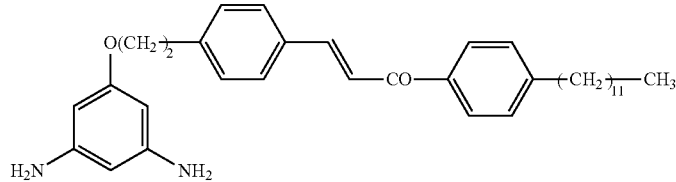
(A-8)

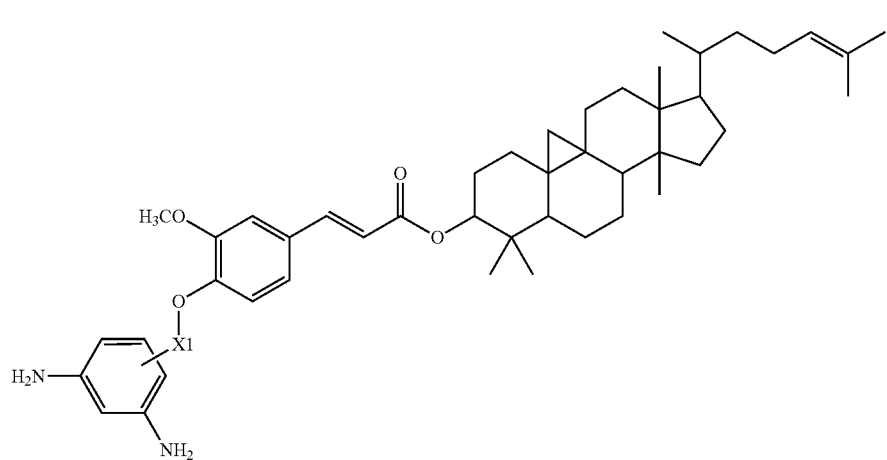
(A-9)
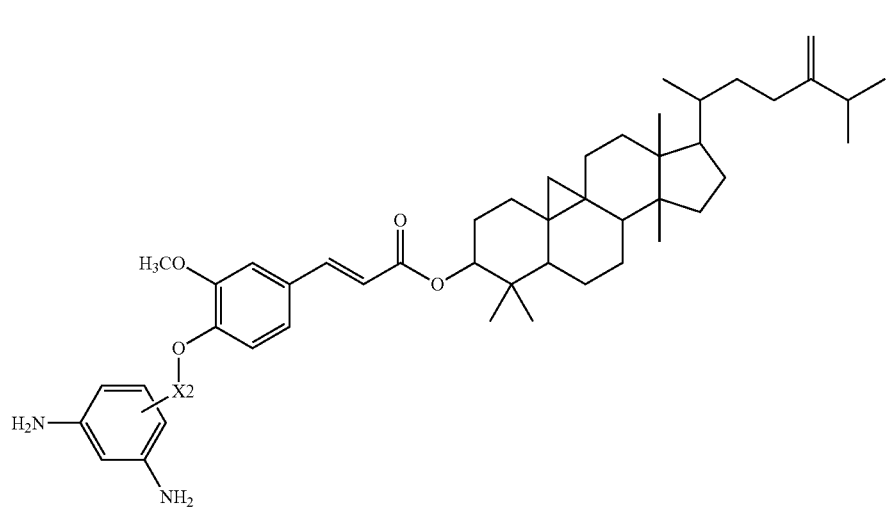
(A-10)
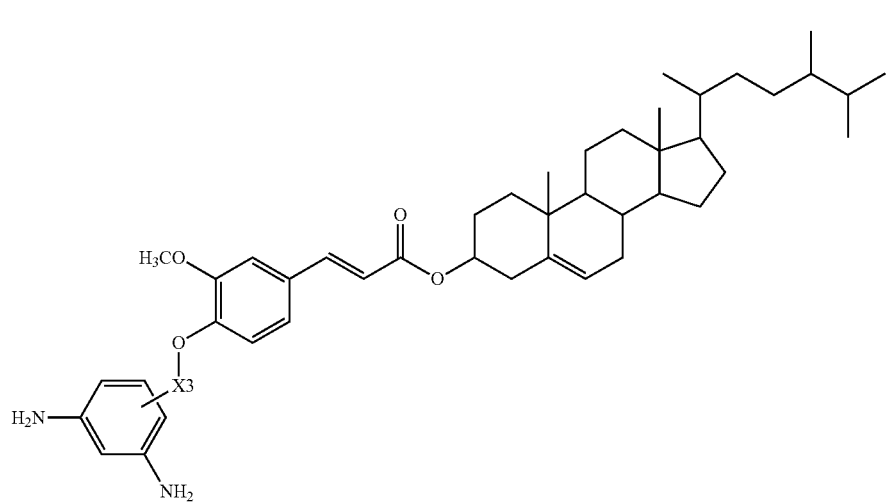
(A-11)

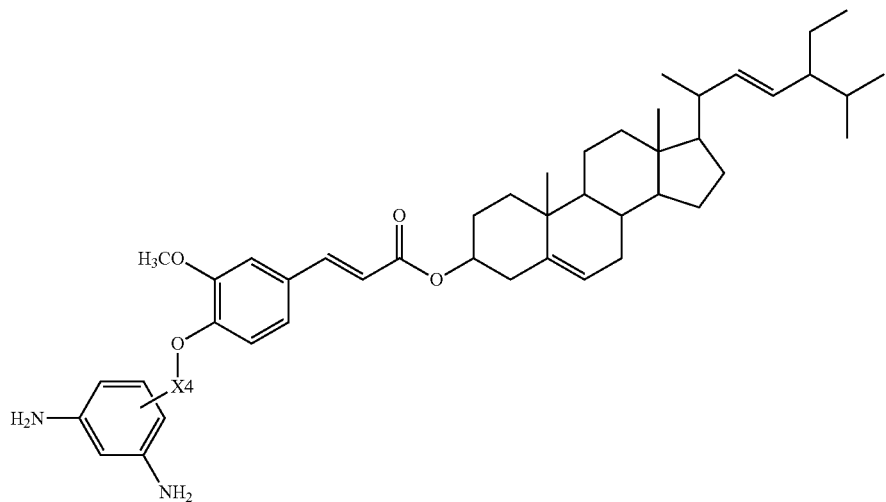
(A-12)
Here, X1 to X4 are single-bond or divalent organic groups.
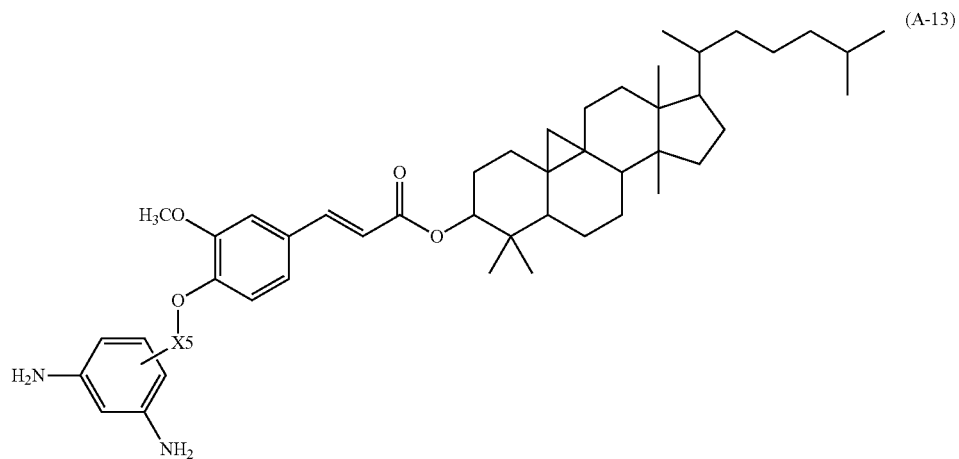
(A-13)
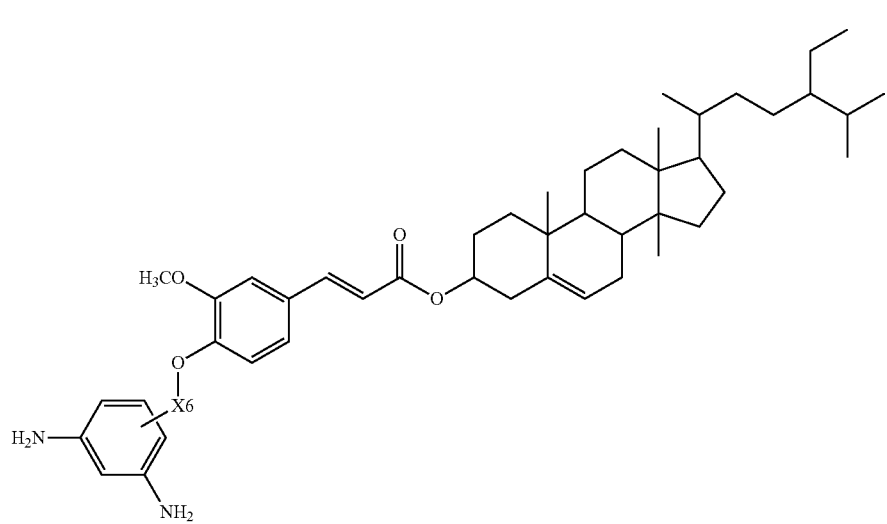
(A-14)

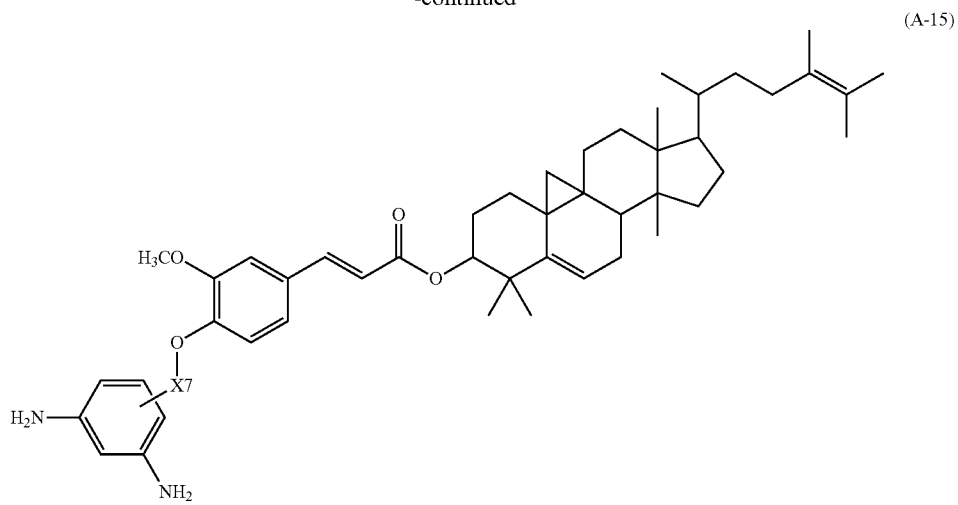
(A-15)
Here, X5 to X7 are single-bond or divalent organic groups.
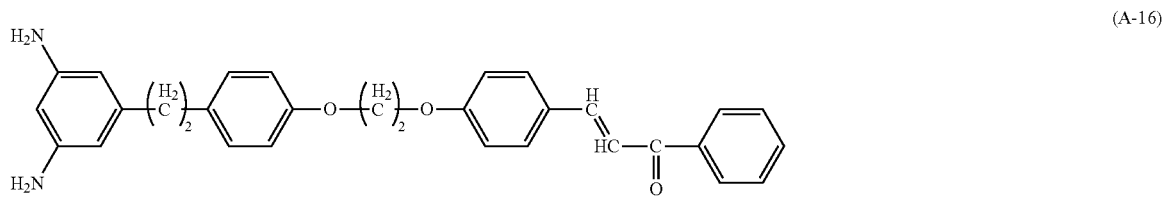
(A-16)
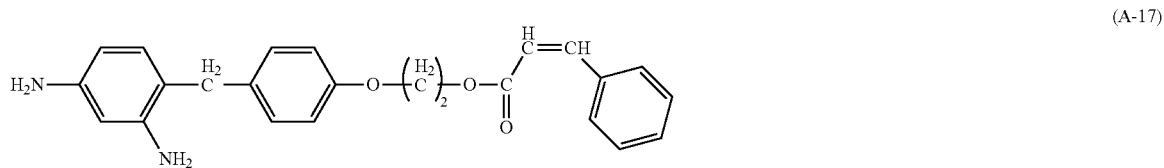
(A-17)
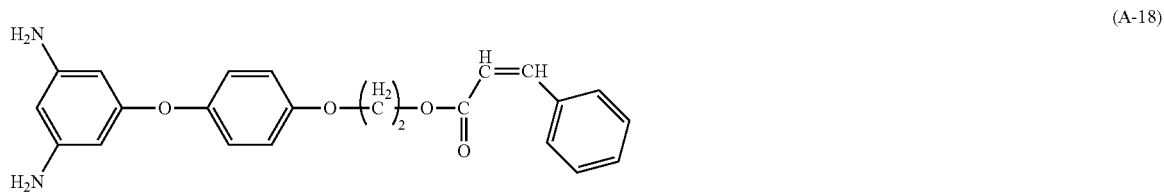
(A-18)
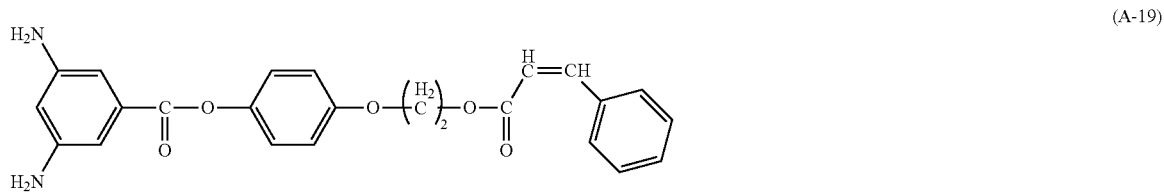
(A-19)
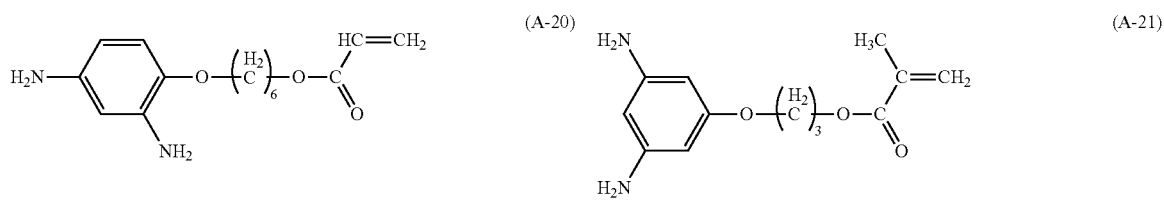
(A-20) (A-21)

-continued
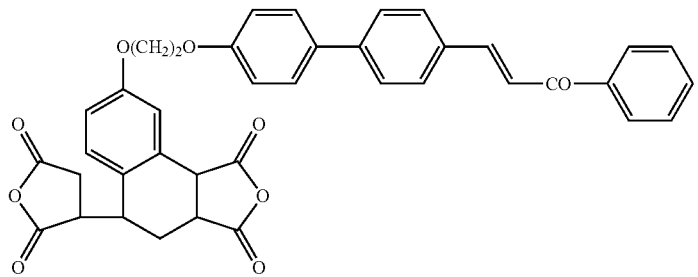
(a-1)
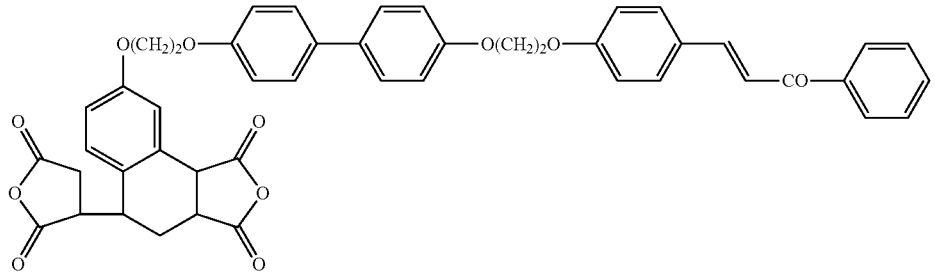
(a-2)
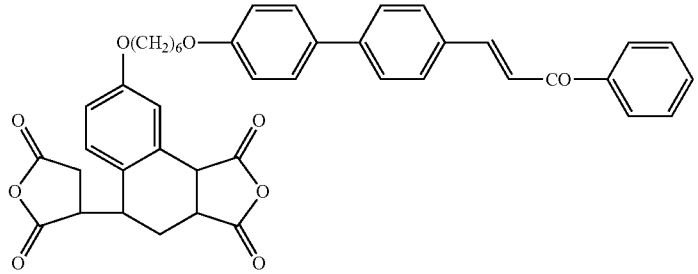
(a-3)
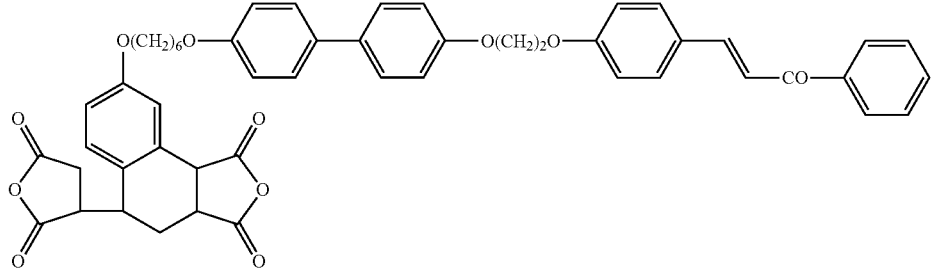
(a-4)
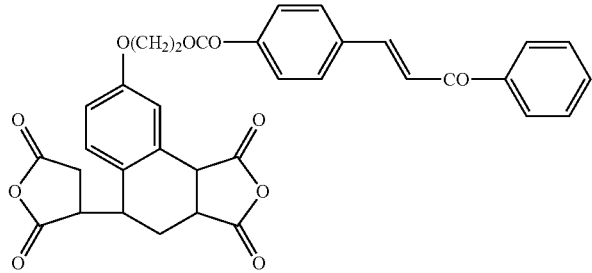
(a-5)

-continued
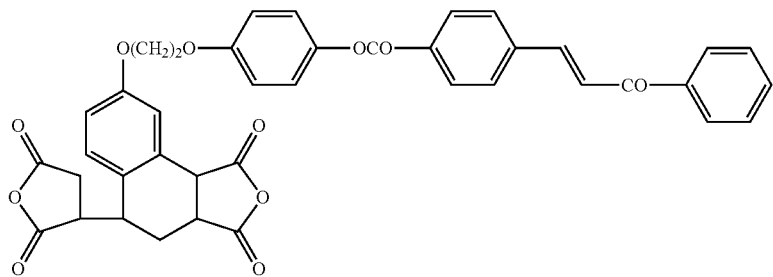
(a-6)
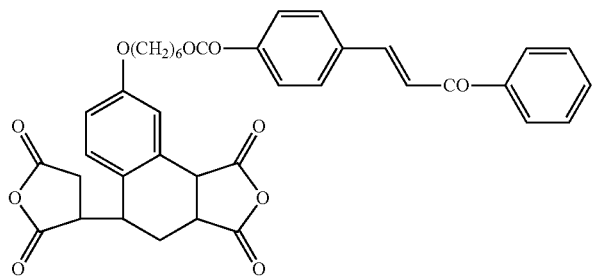
(a-7)
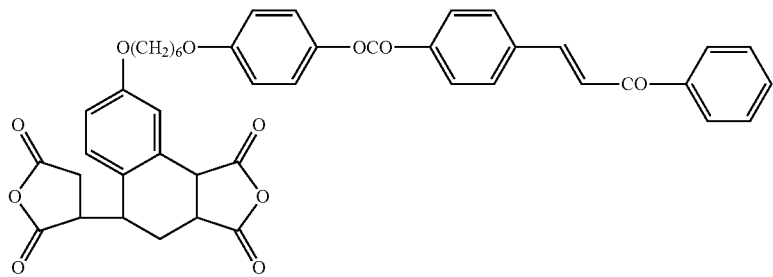
(a-8)
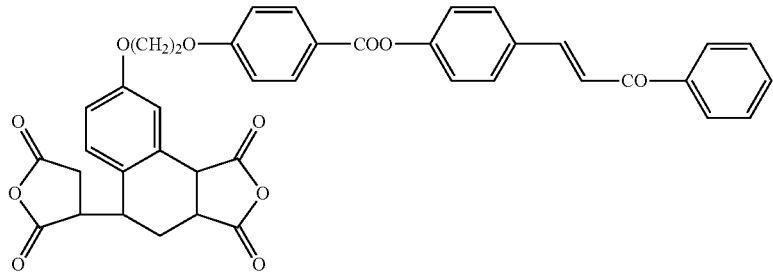
(a-9)
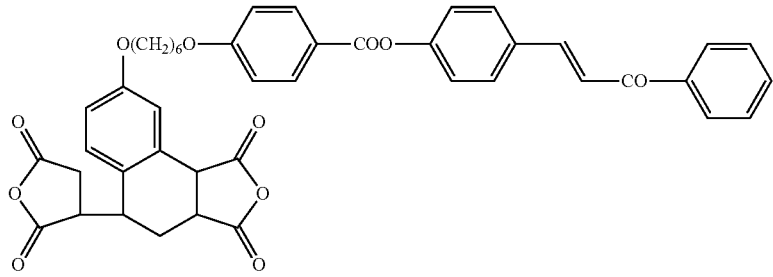
(a-10)

-continued
(a-11)
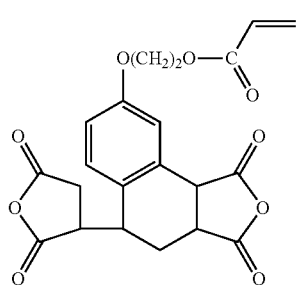
(a-12)
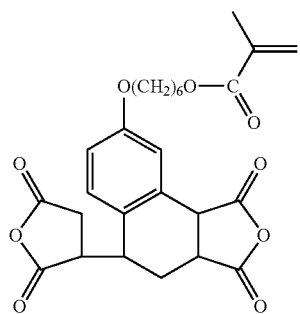
(F-1)
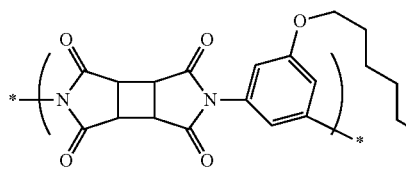
(F-2)
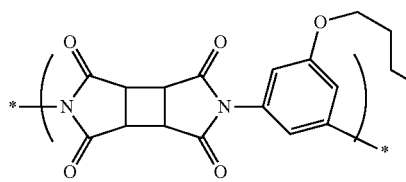
(F-3)
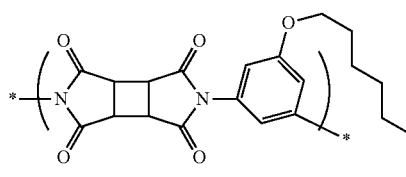
(F-4)
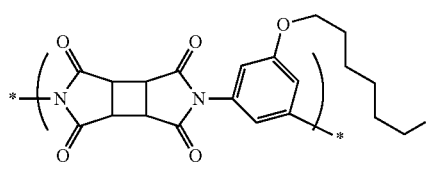
(F-5)
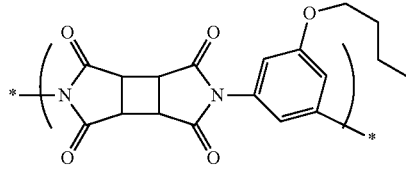
(F-6)
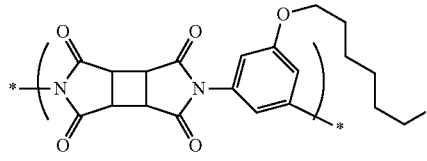

-continued
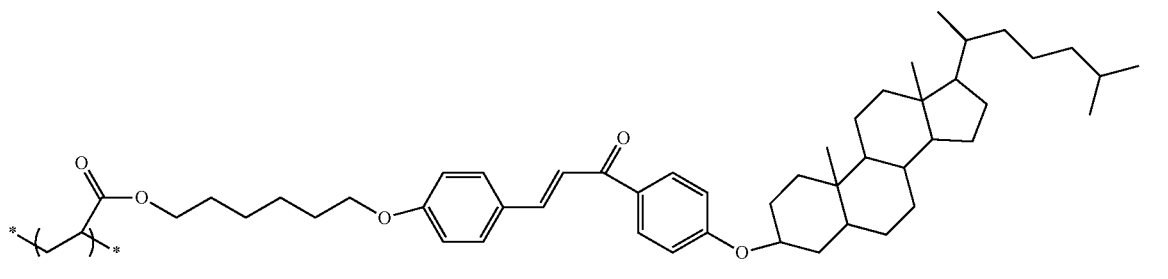
(F-7)
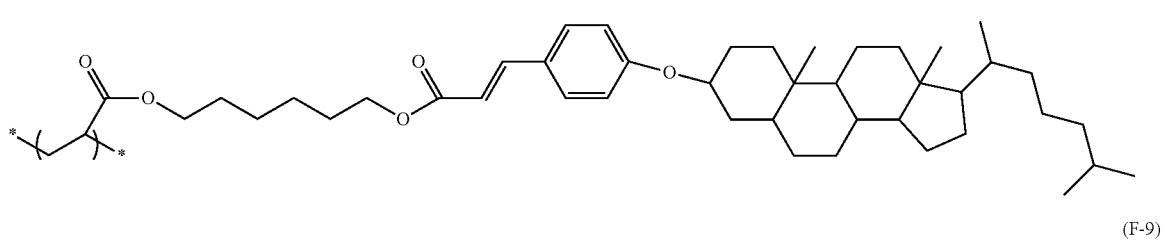
(F-8)
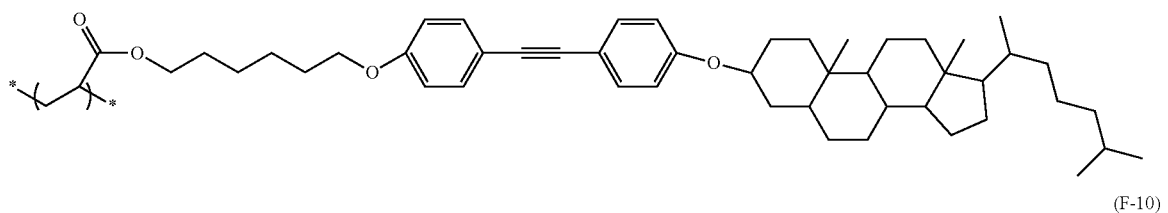
(F-9)
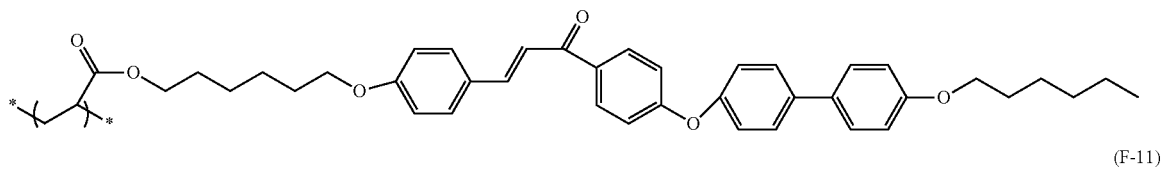
(F-10)
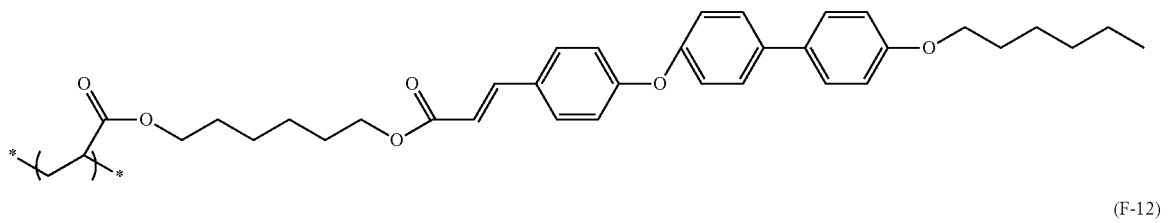
(F-11)
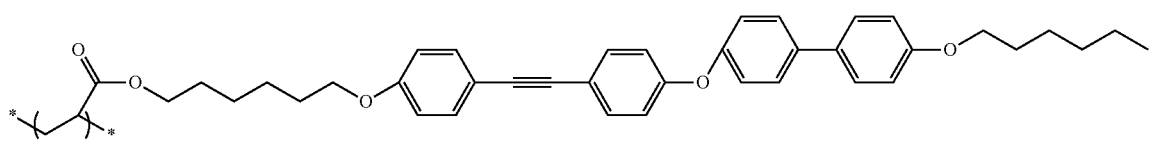
(F-12)
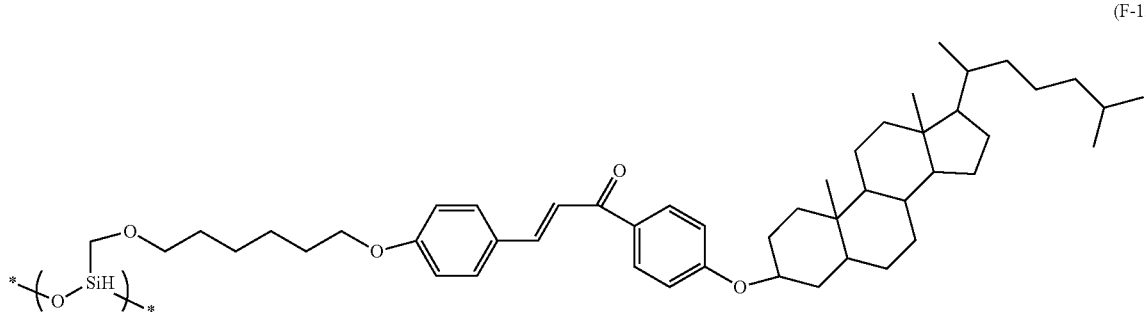
(F-13)

-continued
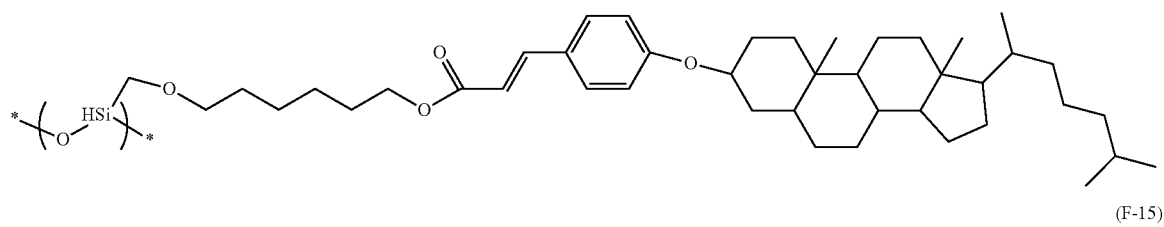
(F-14)
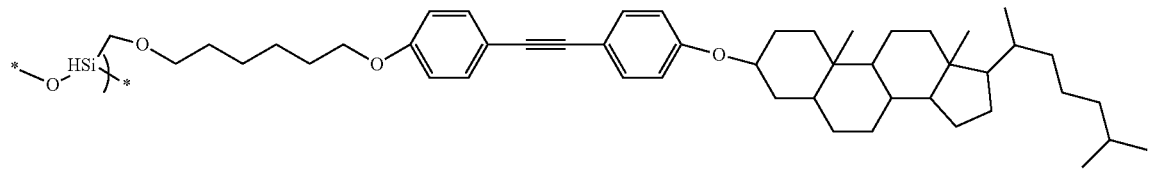
(F-15)
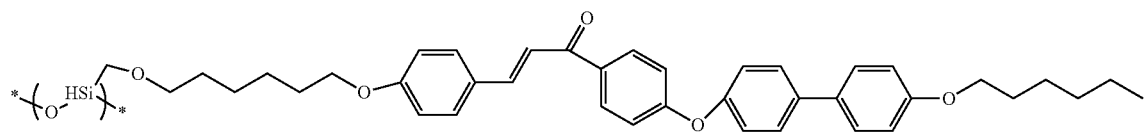
(F-16)
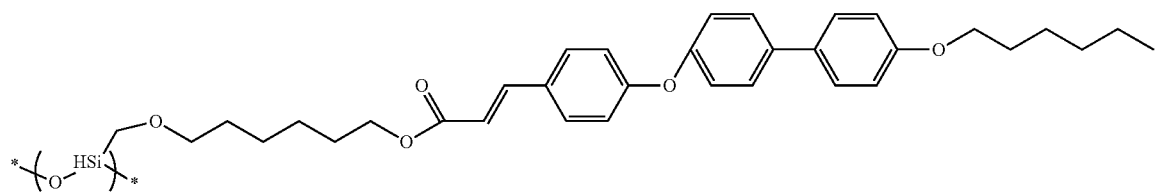
(F-17)
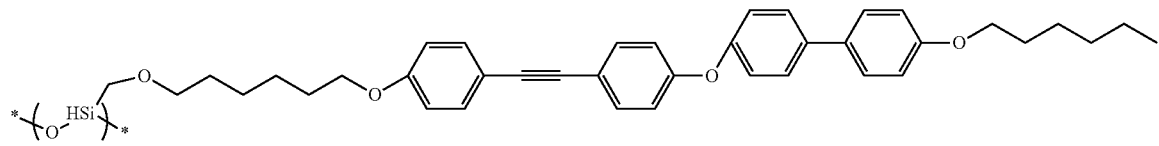
(F-18)
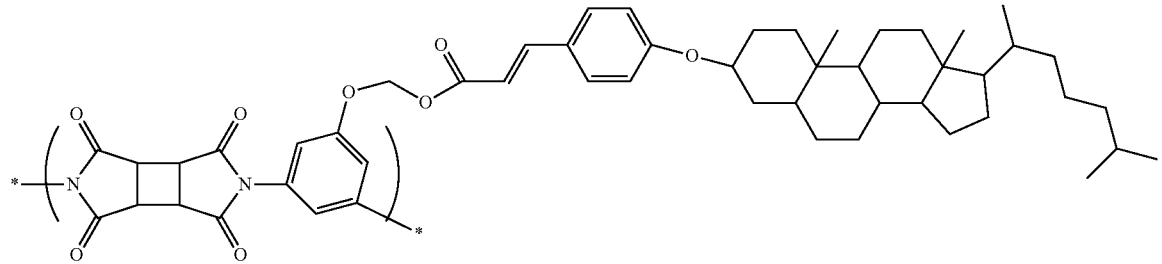
(F-19)

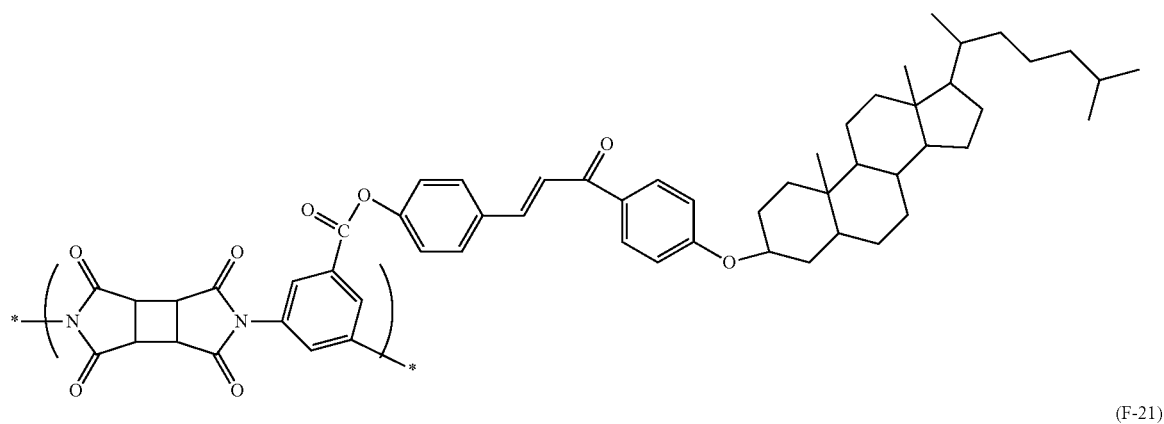
(F-20)

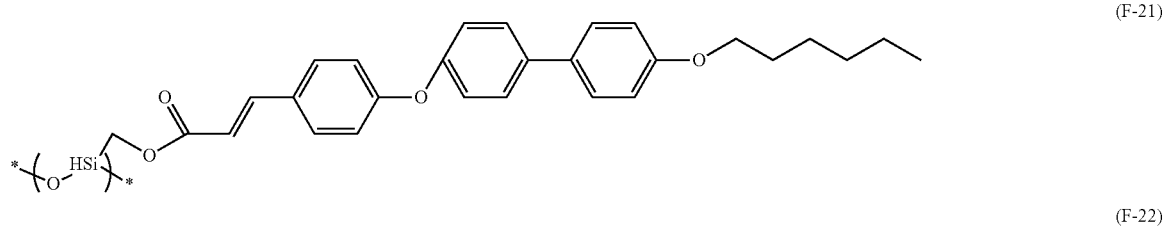
(F-21)

(F-22)

Further, in a case when polyamic acid is synthesized as the polymer compound precursor so that the first pre-alignment process compound includes a vertical alignment inducing structure portion, other than the compound including a cross-linked functional group or a polymerized functional group described above, the compounds including a vertical alignment inducing structure portion represented by Formulae B-1 to B-36 as diamine compounds or the compounds including a vertical alignment inducing structure portion represented by Formulae b-1 to b-3 as a tetracarboxylic dianhydride may be used.

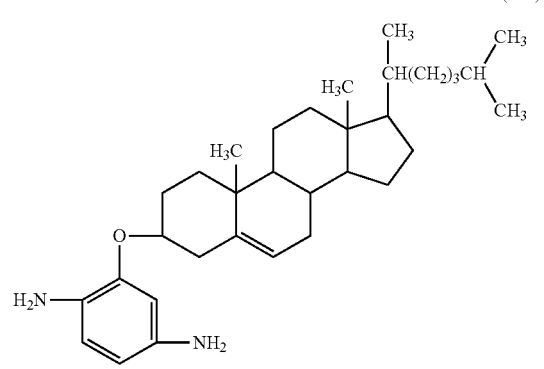
(B-2)

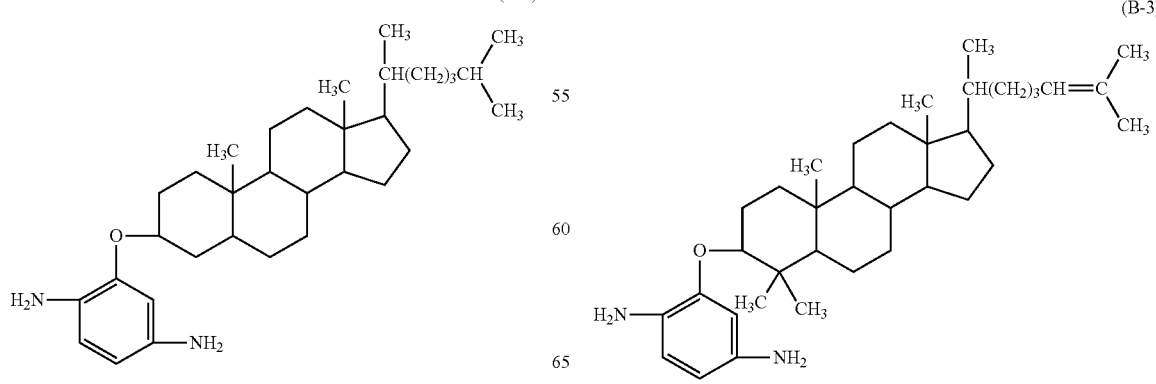
(B-1)                         (B-3)

-continued
(B-4)
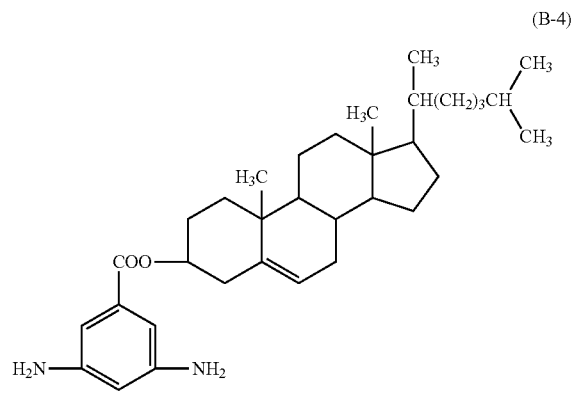
(B-5)
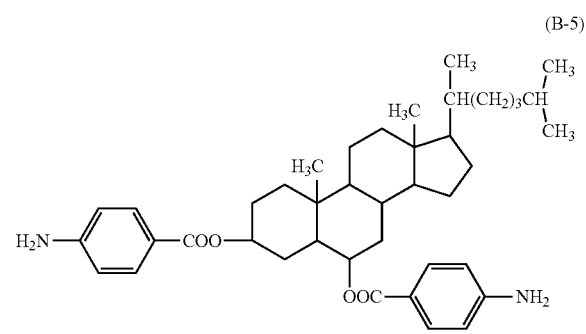
(B-6)
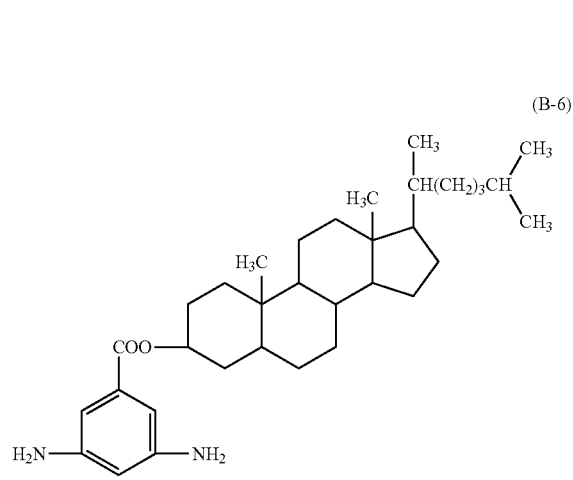
(B-7)
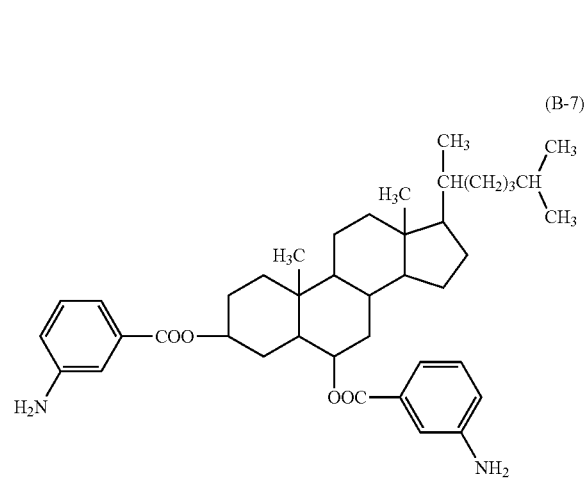
-continued
(B-8)
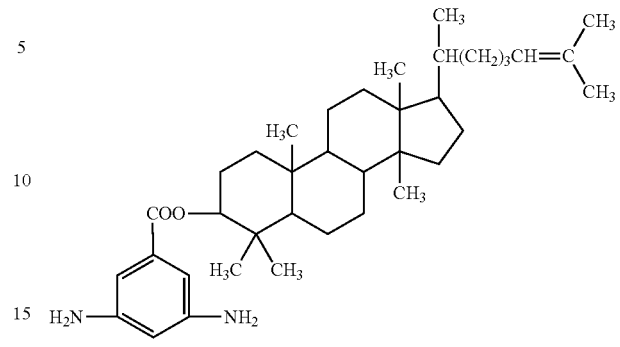
(B-9)
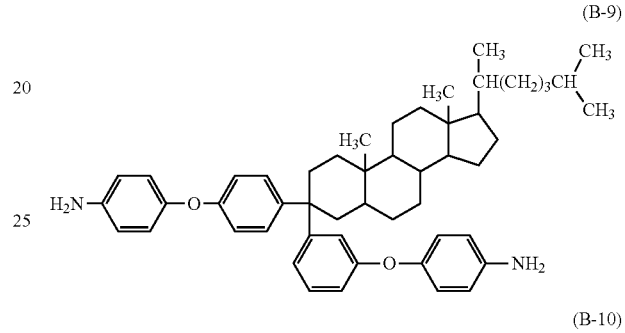
(B-10)
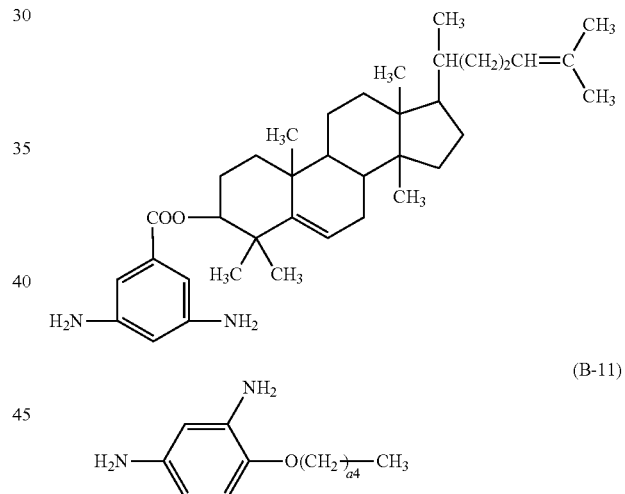
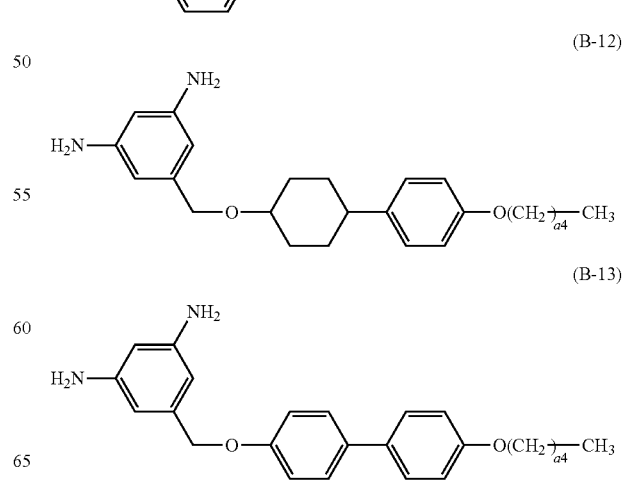

(B-14)
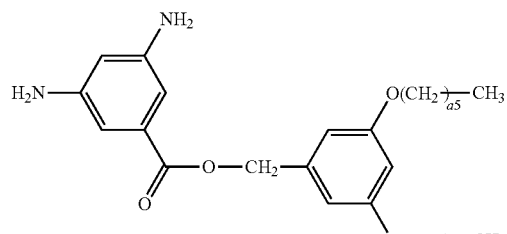
Here, a4 to a6 are integers from 0 to 21.
(B-15)
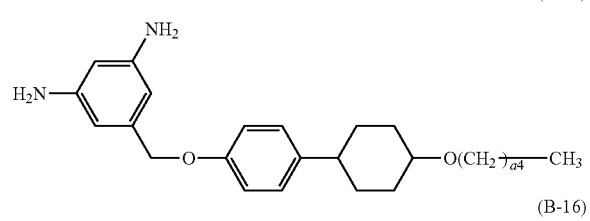
(B-16)
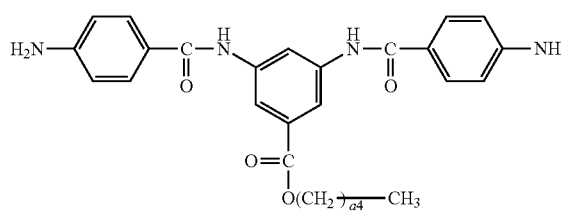
(B-17)
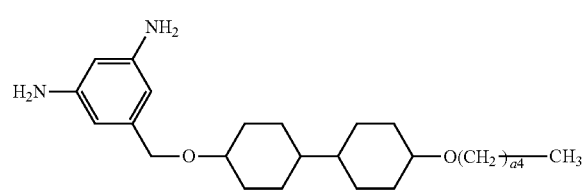
(B-18)
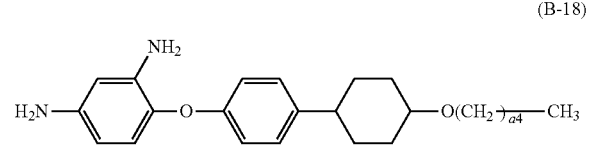
(B-19)
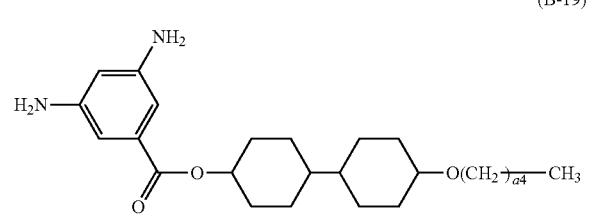
Here, a4 is an integer from 0 to 21.
(B-20)
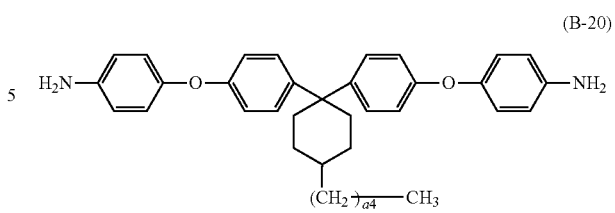
(B-21)
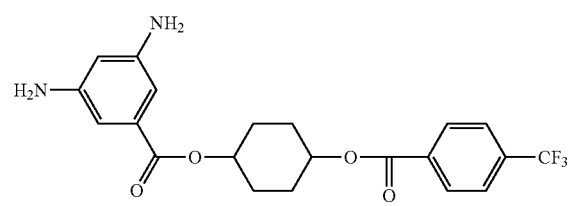
(B-22)
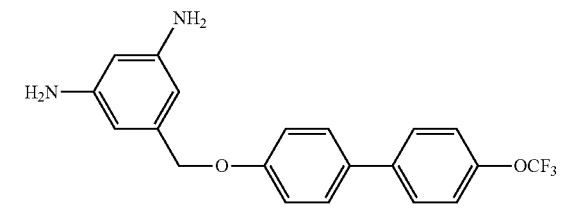
(B-23)
(B-24)
(B-25)
(B-26)
(B-27)

(B-28) 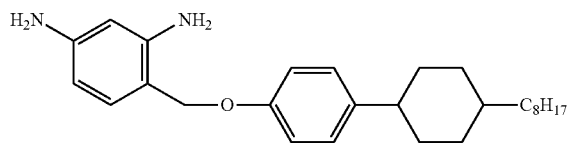
Here, a4 is an integer from 0 to 21.
(B-29) 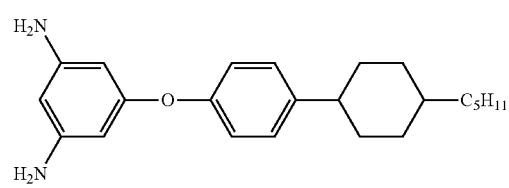
(B-30) 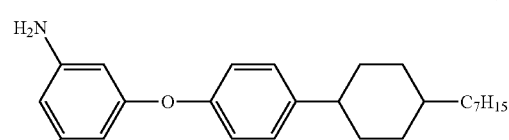
(B-31) 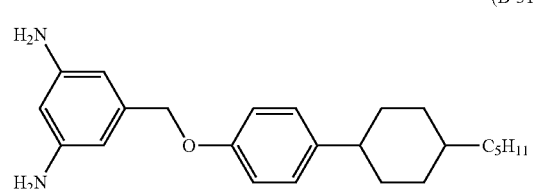
(B-32) 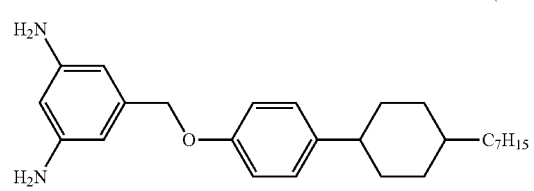
(B-33) 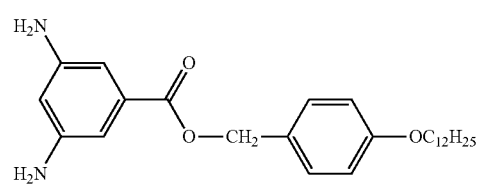
(B-34) 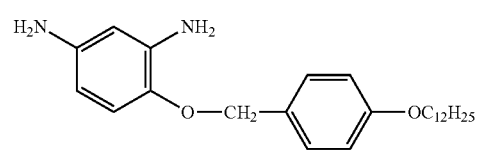
(B-35) 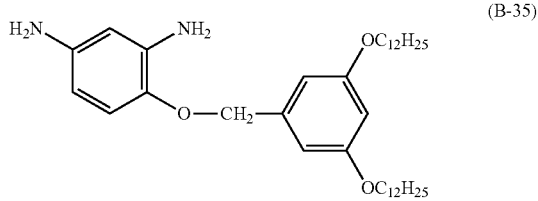
(B-36) 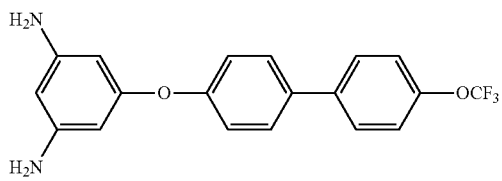
(b-1) 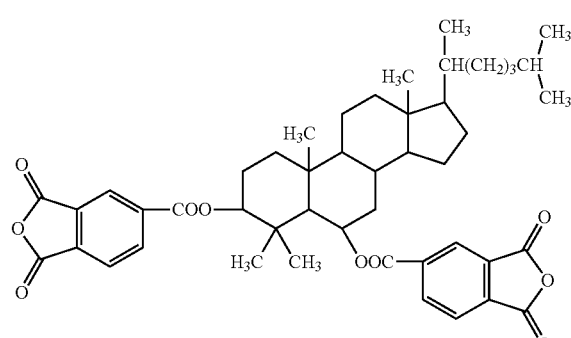
(b-2) 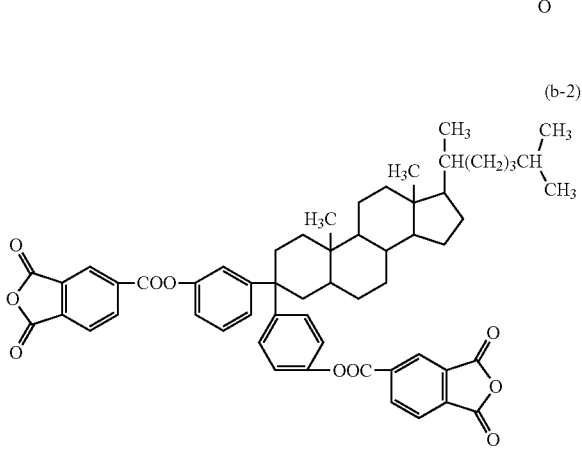
(b-3) 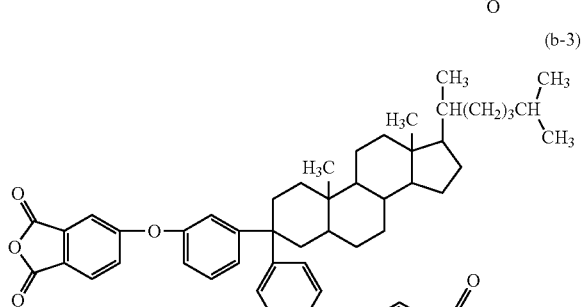
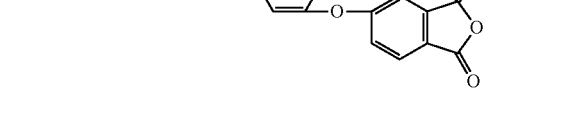

Further, in a case when polyamic acid is synthesized as the polymer compound precursor so that the first pre-alignment process compound includes the group shown in Formula 1 along with a cross-linked functional group or a polymerized functional group, other than the compound including a cross-linked functional group or a polymerized functional group described above, compounds that include groups that are able to be along the liquid crystal molecules 41 represented by Formulae C-1 to C-24 may be used as diamine compounds.

(C-1)
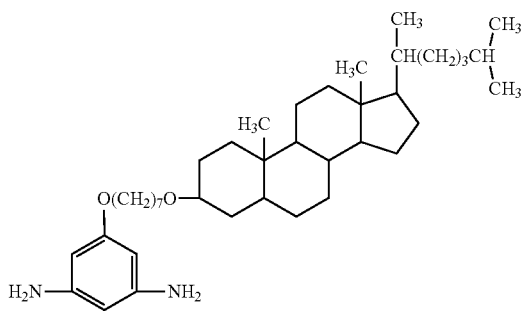

(C-2)
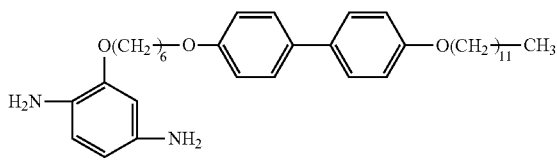

(C-3)
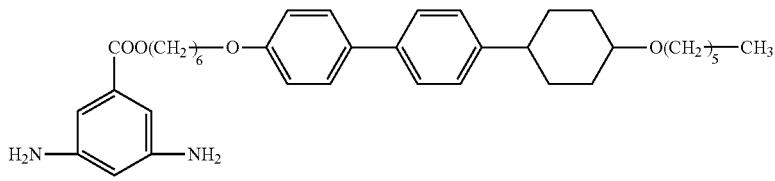

(C-4)
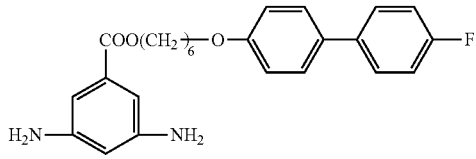

(C-5)
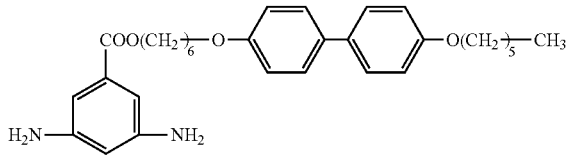

(C-6)
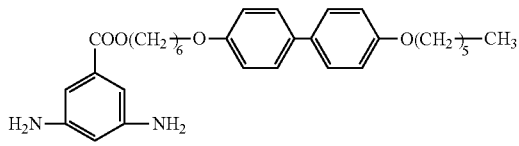

(C-7)
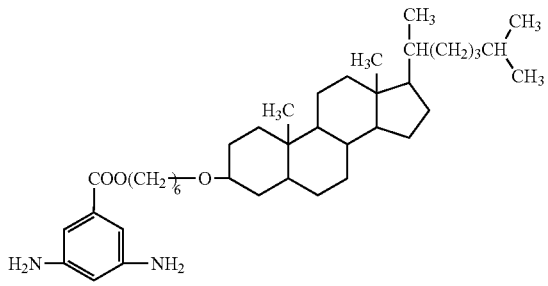

(C-8)
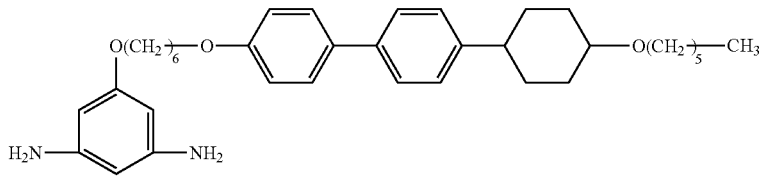

(C-9)
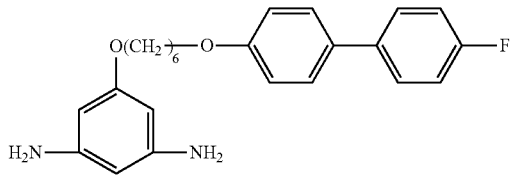

(C-10)
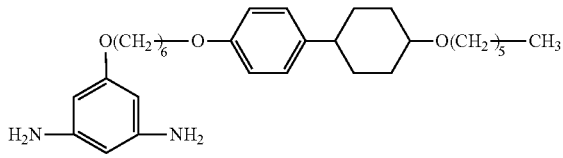

-continued
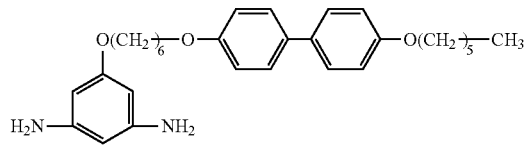
(C-11)
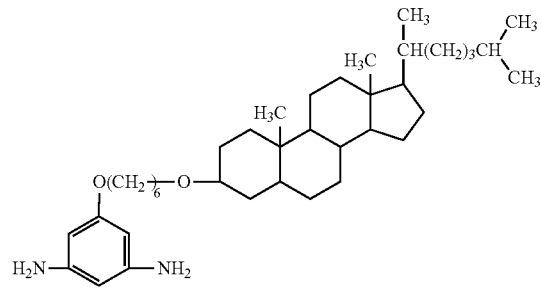
(C-12)
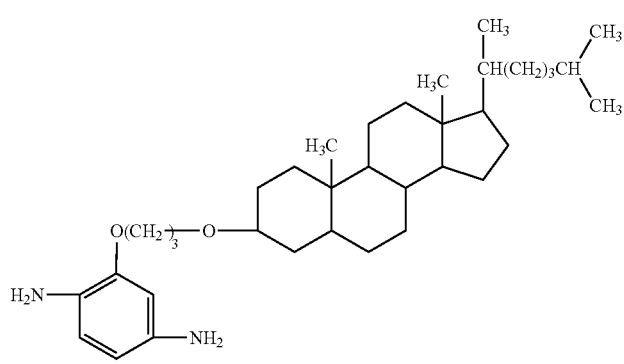
(C-13)
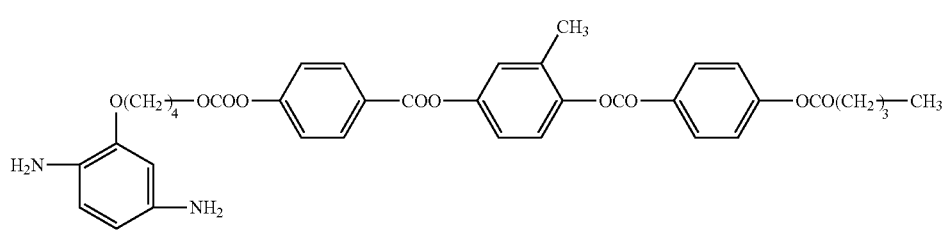
(C-14)
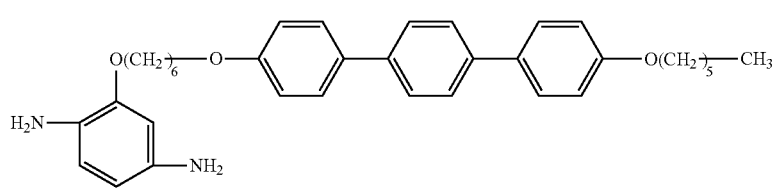
(C-15)
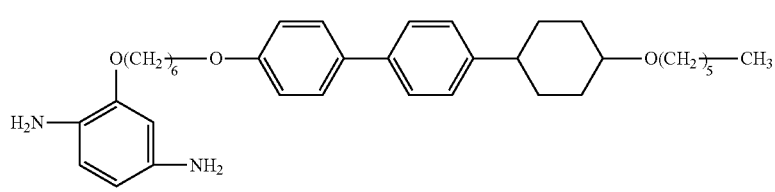
(C-16)
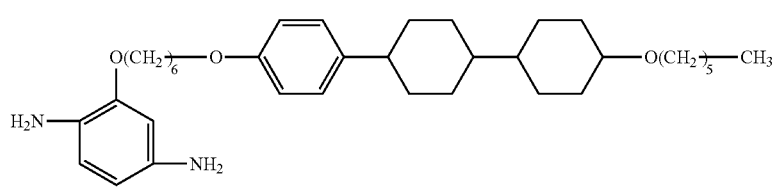
(C-17)
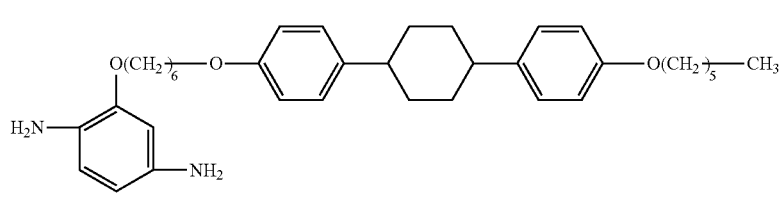
(C-18)

-continued (C-19)
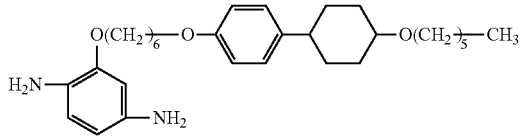

(C-20)
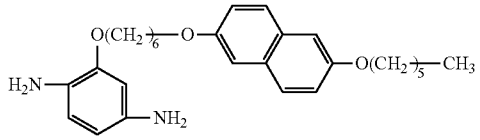

(C-21)
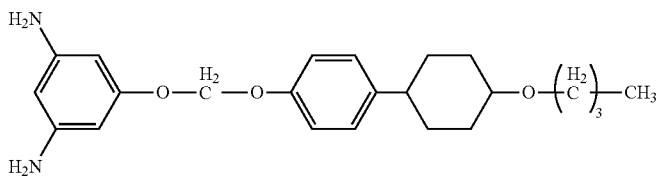

(C-22)
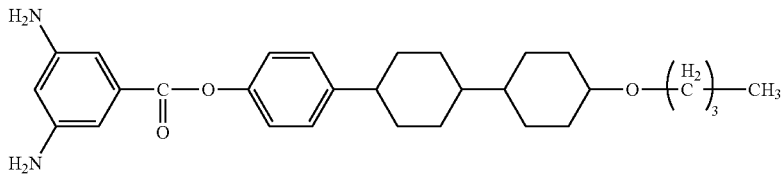

(C-23)
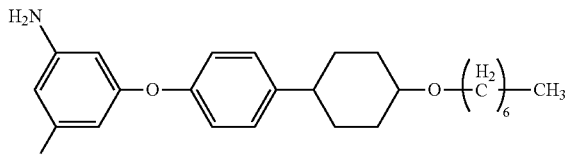

(C-24)
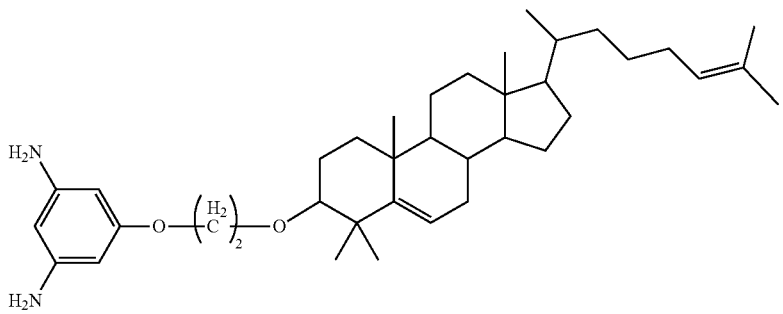

Further, in a case when polyamic acid is synthesized as the polymer compound precursor so that the first pre-alignment process compound includes the group shown in Formula 2, other than the compound including a cross-linked functional group or a polymerized functional group described above, compounds that include groups that are able to be along the liquid crystal molecules 41 represented by Formulae D-1 to D-11 may be used as diamine compounds.

(D-1)
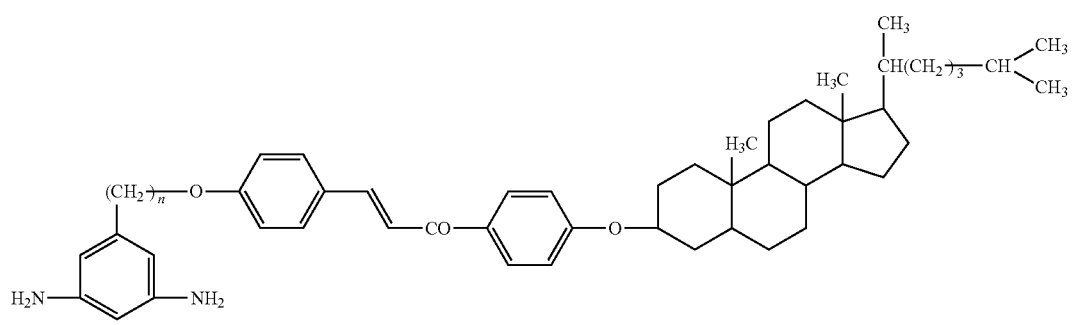

-continued
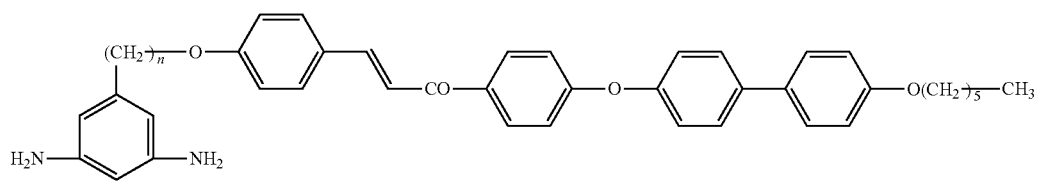
(D-2)
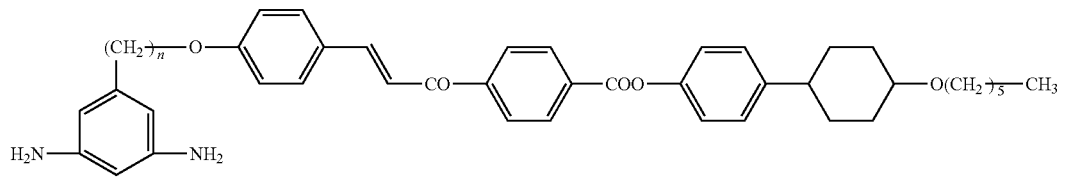
(D-3)
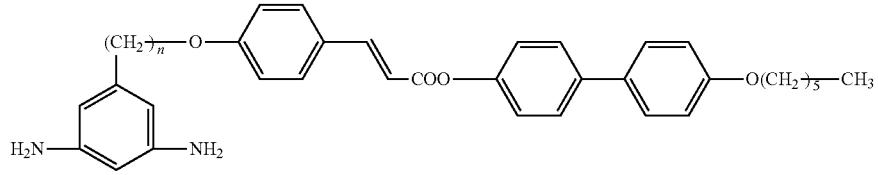
(D-4)
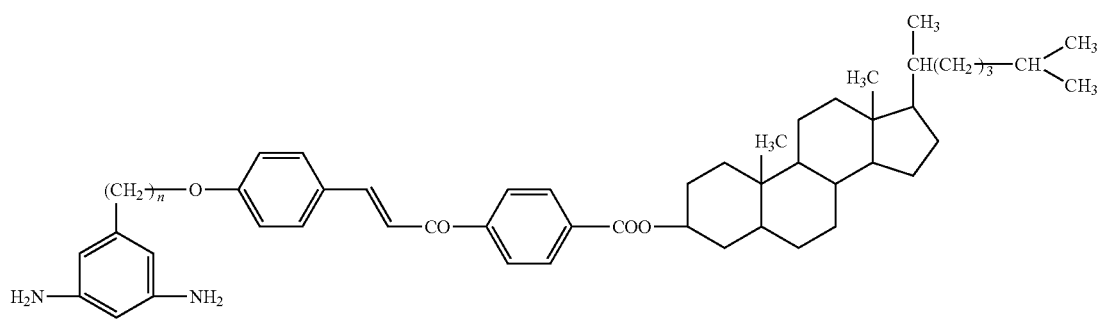
(D-5)
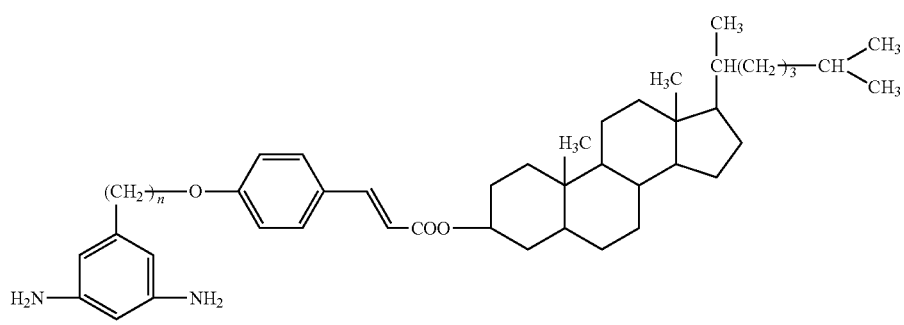
(D-6)
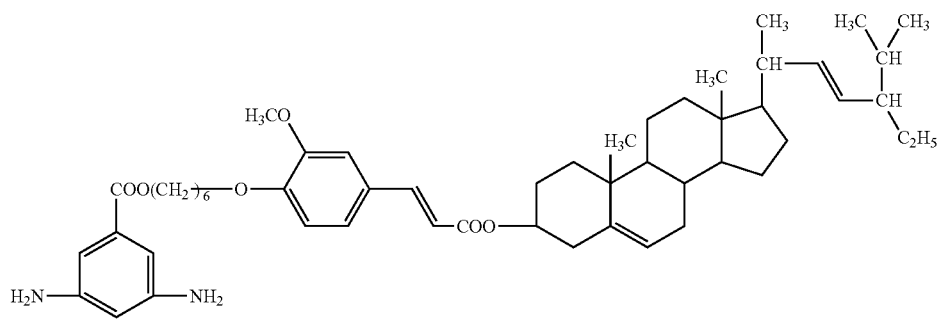
(D-7)
Here, n is an integer from 3 to 20.

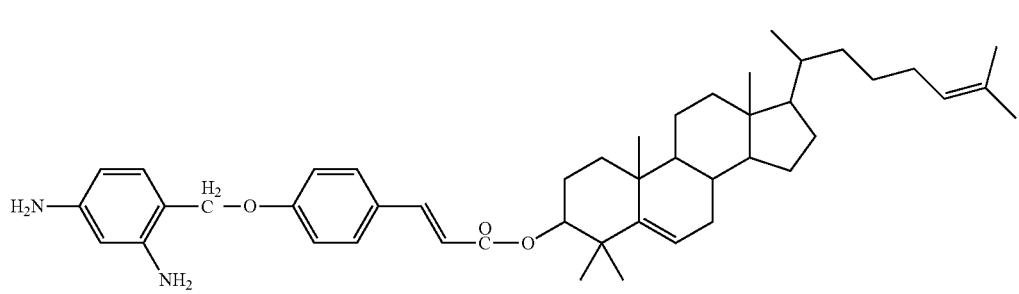
(D-8)

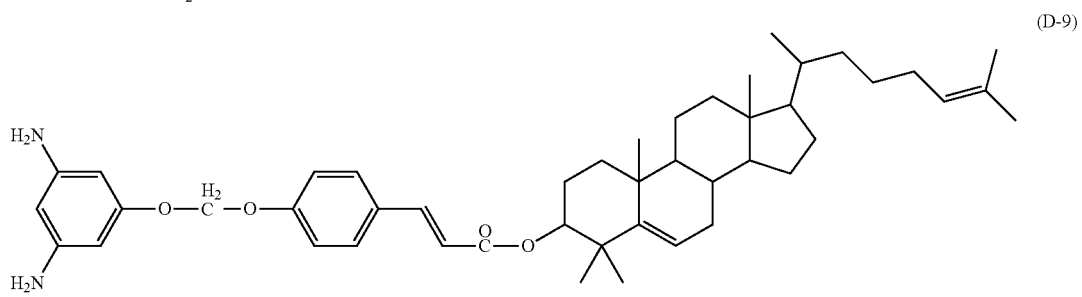
(D-9)

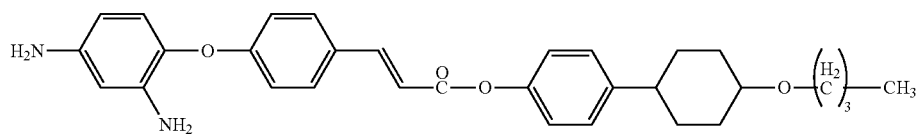
(D-10)

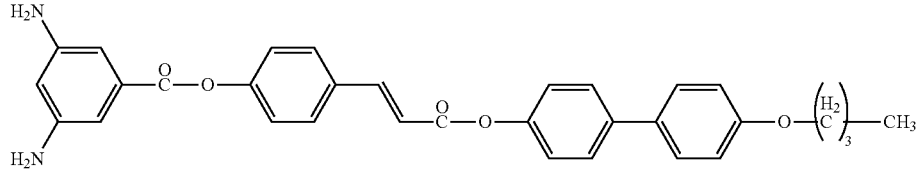
(D-11)

Furthermore, in a case when polyamic acid is synthesized as the polymer compound precursor so that the first pre-alignment process compound includes the two structures of a structure that includes a vertical alignment inducing structure portion as R2 in Formula 3 and a structure that includes a cross-linked functional group or a' polymerized functional group, for example, the diamine compound and the tetracarboxylic dianhydride are selected as follows. That is, at least one of the compounds including a cross-linked functional group or a polymerized functional group shown in Formulae A-1 to A-21, at least one of the compounds including the vertical alignment inducing structure portion shown in Formulae B-1 to B-36 and b-1 to b-3, and at least one of the tetracarboxylic dianhydrides represented by Formulae E-1 to E-28 are used. Here, R1 and R2 in Formula E-23 have the same or different alkyl groups, alkoxy groups, and halogen atoms, and the type of halogen atoms is arbitrary.

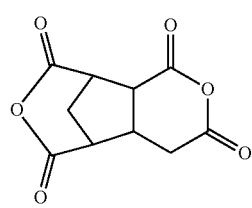
(E-1)

-continued

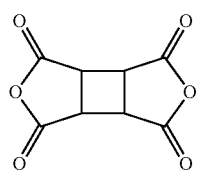
(E-2)

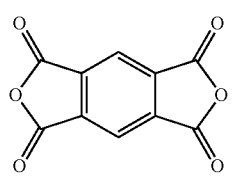
(E-3)

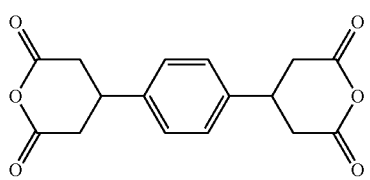
(E-4)

-continued
(E-5)
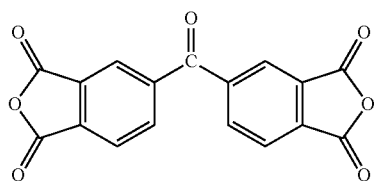
(E-6)
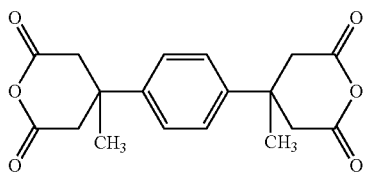
(E-7)
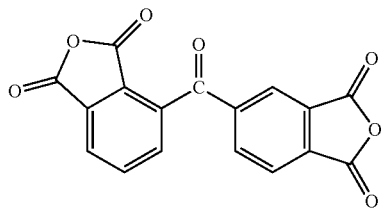
(E-8)
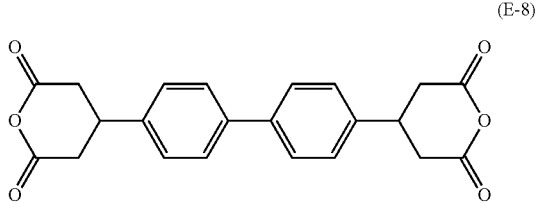
(E-9)
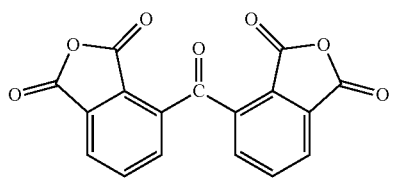
(E-10)
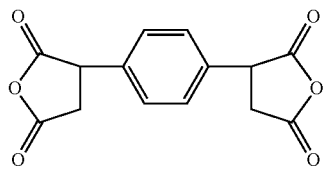
(E-11)
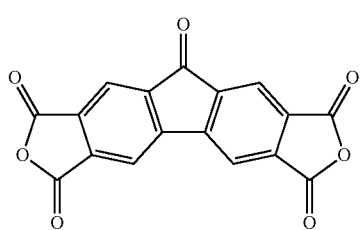
(E-12)
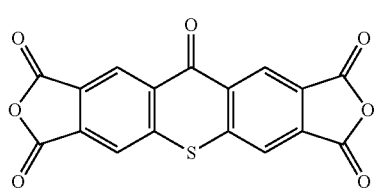
-continued
(E-13)
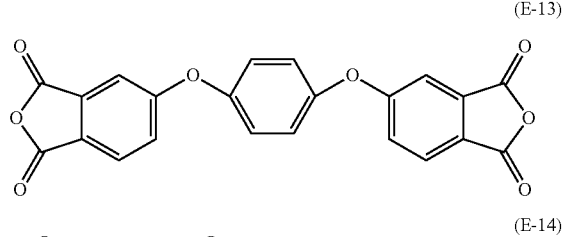
(E-14)
(E-15)
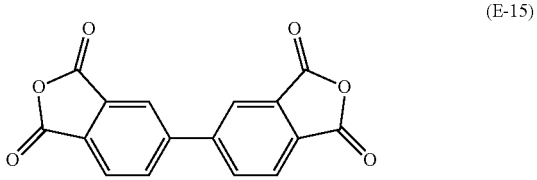
(E-16)
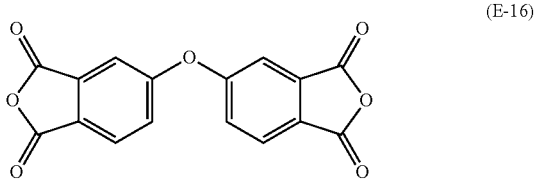
(E-17)
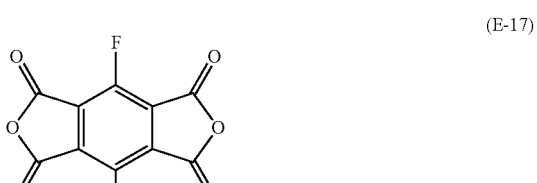
(E-18)
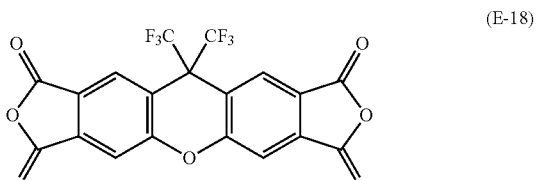
(E-19)
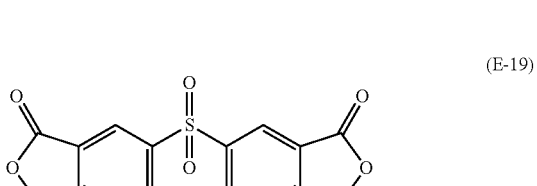
(E-20)
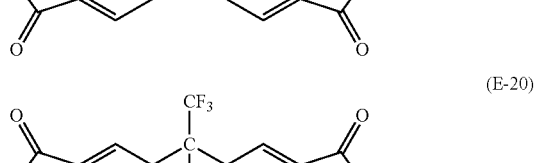

-continued (E-21)
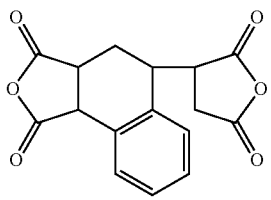

(E-22)
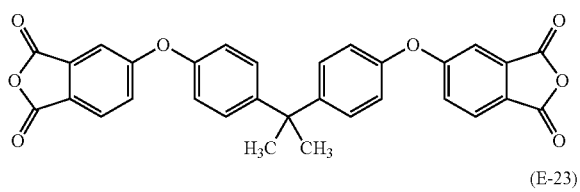

(E-23)
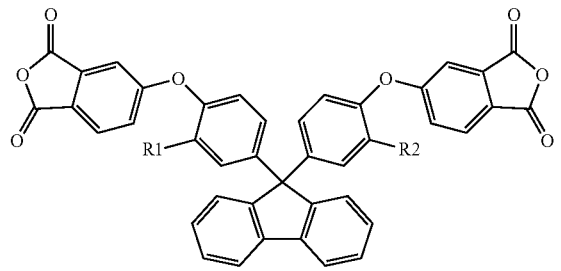

(E-24)
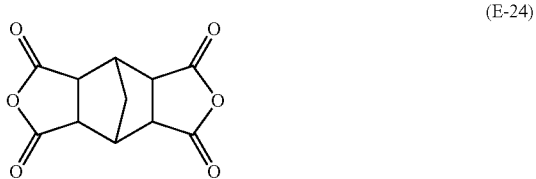

(E-25)
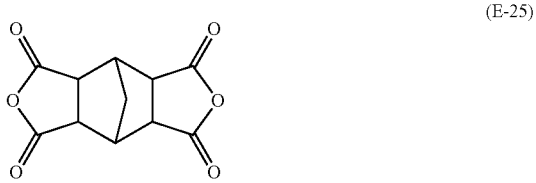

(E-26)
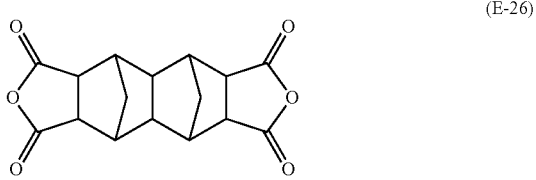

(E-27)
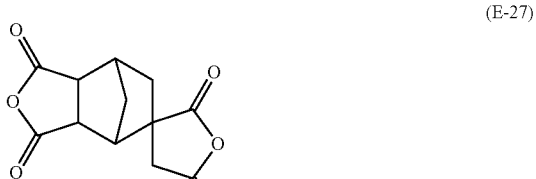

(E-28)
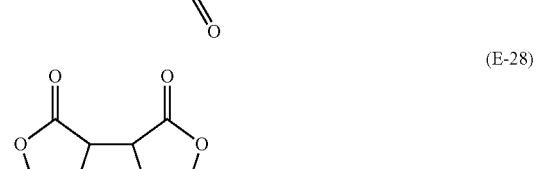

Here, R1 and R2 are alkyl groups, alkoxy groups, or halogen atoms.

Further, in a case when polyamic acid is synthesized as the polymer compound precursor so that the first pre-alignment process compound includes the two structures of a structure that includes the group shown in Formula 1 as R2 in Formula 3 and a structure that includes a cross-linked functional group or a polymerized functional group, for example, the diamine compound and the tetracarboxylic dianhydride are selected as follows. That is, at least one of the compounds including a cross-linked functional group or a polymerized functional group shown in Formulae A-1 to A-21, at least one of the compounds shown in Formulae C-1 to C-24, and at least one of the tetracarboxylic dianhydrides represented by Formulae E-1 to E-28 are used.

Further, in a case when polyamic acid is synthesized as the polymer compound precursor so that the first pre-alignment process compound includes the two structures of a structure that includes the group shown in Formula 2 as R2 in Formula 3 and a structure that includes a cross-linked functional group or a polymerized functional group, for example, the diamine compound and the tetracarboxylic dianhydride are selected as follows. That is, at least one of the compounds including a cross-linked functional group or a polymerized functional group shown in Formulae A-1 to A-21, at least one of the compounds shown in Formulae D-1 to D-11, and at least one of the tetracarboxylic dianhydrides represented by Formulae E-1 to E-28 are used.

The content amount of the first pre-alignment process compound or the first polymer compound precursor as the pre-alignment process compound within the first alignment film material is preferably 1 mass % to 30 mass %, and more preferably 3 mass % to 10 mass %. Further, a photopolymerization initiator or the like may be mixed with the alignment film material as necessary.

Examples of the second polymer compound include an alkyl group with ten or more carbon atoms, an alkyl halide group with ten or more carbon atoms, an alkoxy group with ten or more carbon atoms, an alkoxy halide group with ten or more carbon atoms, an organic group including a ring structure, or the like. Specifically, for example, the structure represented by Formulae 5-1 to 5-6 and the like are exemplified. Alternatively, for example, the groups represented by Formulae 6-1 to 6-23 and the like are exemplified as monovalent organic groups including a ring structure, and the groups represented by Formulae 7-1 to 7-7 and the like are exemplified as divalent organic groups including a ring structure. Alternatively, in a case when polyamic acid is synthesized as the polymer compound precursor, the compounds represented by Formulae B-1 to B-36 may be used as the diamine compound, and the compounds represented by b-1 to b-3 may be used as the tetracarboxylic dianhydride. Alternatively, the compounds represented by Formulae A-1 to A-21 are exemplified as diamine compounds, and the compounds represented by a-1 to a-10 are exemplified as tetracarboxylic dianhydrides. Alternatively, in a case when polyamic acid is synthesized as a precursor, it is possible to use, for example, at least one of the compounds shown in Formulae A-1 to A-21, at least one of the compounds shown in Formulae B-1 to B-36 and Formulae b-1 to b-3, and at least one of the tetracarboxylic dianhydrides represented by Formulae E-1 to E-28.

Furthermore, after respectively applying or printing the prepared alignment film material over the TFT substrate 20 and the CF substrate 30 to cover the pixel electrodes 20B, the first slit portions 21, and the opposing electrodes 30B, a heating process is performed. The temperature of the heating process is preferably equal to or greater than 80° C., and is more preferably equal to or greater than 150° C. and equal to or less than 200° C. Further, the heating temperature of the heating process may be changed in a stepwise manner. In so doing, the solvent included in the applied or printed alignment film material evaporates and the first alignment film 22 that includes the first polymer Compound (first pre-alignment process compound) including a cross-linked functional group or a polymerized functional group as the side chain and the second alignment film 32 that includes the second polymer compound (second pre-alignment process compound) are formed. Processing such as rubbing may then be performed as necessary.

Figure 6:
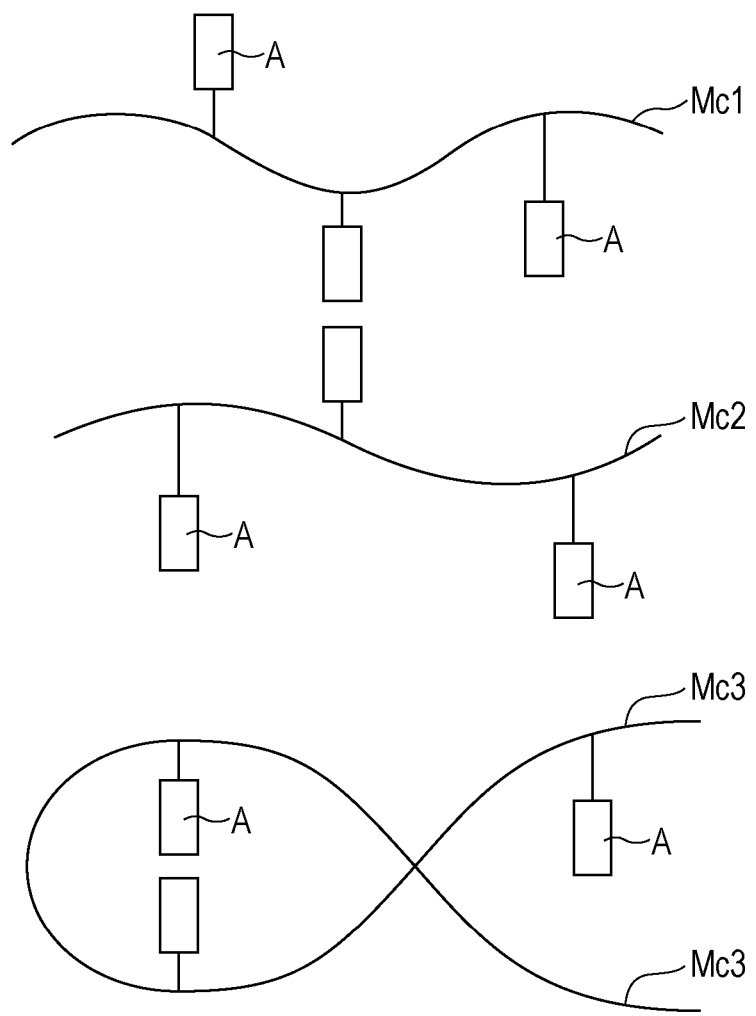
FIG. 6 is a cross-sectional diagram that illustrates the state of a first polymer compound (first pre-alignment process compound) within an alignment film for describing a manufacturing method of the liquid crystal display device illustrated in FIG. 1.
Figure 7:
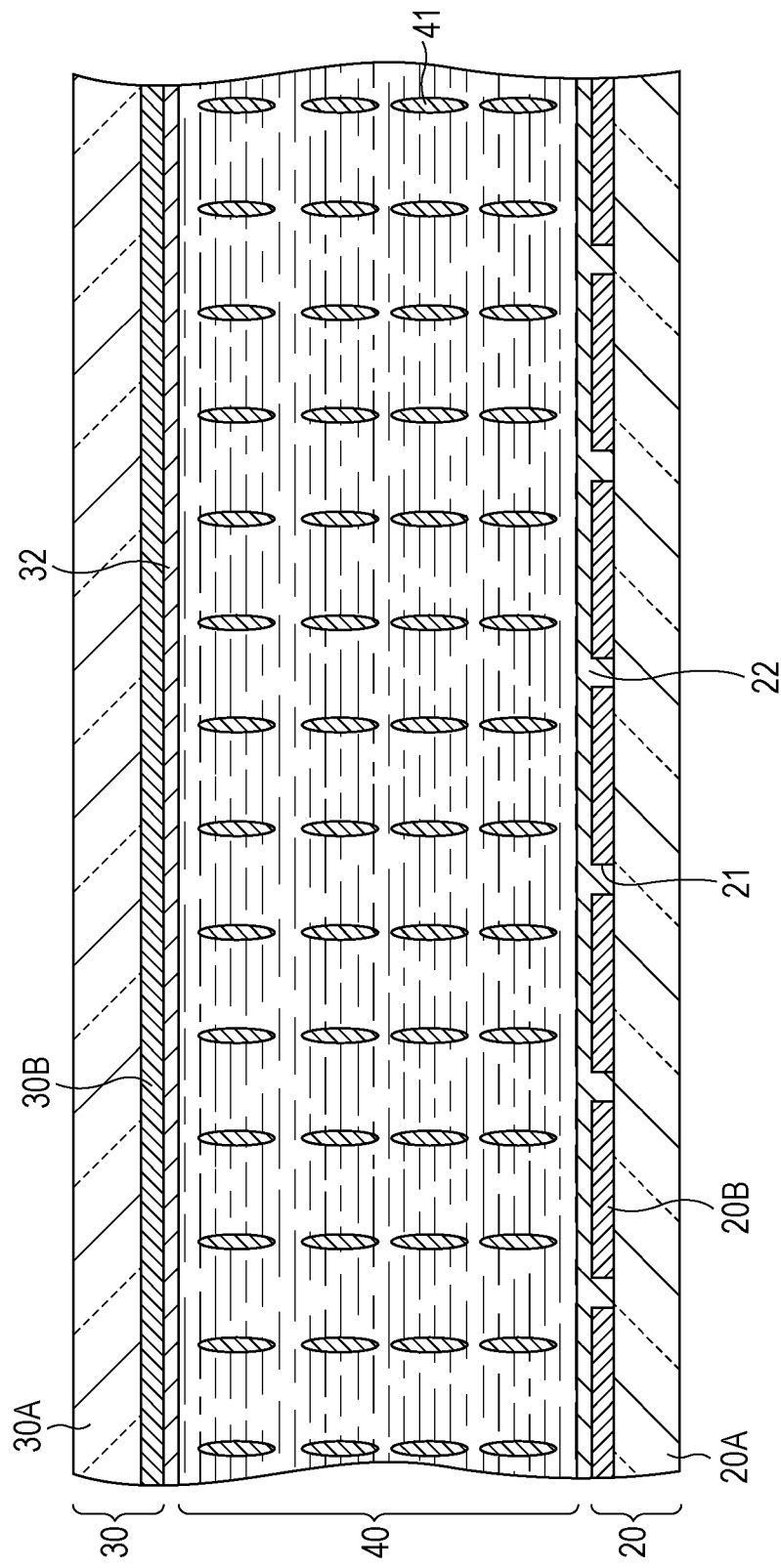
FIG. 7 is a schematic partial cross-sectional diagram of a substrate and the like for describing a manufacturing method of the liquid crystal display device illustrated in FIG. 1.

Here, it is considered that the first pre-alignment process compound within the first alignment film 22 is in the state illustrated in FIG. 6. That is, the first pre-alignment process compound is configured to include main chains Mc (Mc1 to Mc3) and a cross-liked functional group A or a polymerized functional group A that is introduced to the main chains Mc as a side chain, and the main chains Mc1 to Mc3 exist in a coupled state. The cross-linked functional group A and the polymerized functional group A in such a state are orientated in a random direction by thermal agitation.

Next, the TFT substrate 20 and the CF substrate 30 are arranged so that the first alignment film 22 and the second alignment film 32 are opposing, and the liquid crystal layer 40 that includes the liquid crystal molecules 41' is sealed between the first alignment film 22 and the second alignment film 32 (step S102). Specifically, spacer protrusions, for example, plastic beads and the like for securing a cell gap are scattered and a seal portion is printed using an epoxy adhesive or the like by a screen printing method, for example, on a face on which the alignment films 22 and 32 are formed on either the TFT substrate 20 or the CF substrate 30. As illustrated in FIG. 7, the TFT substrate 20 and the CF substrate 30 are adhered together via the spacer protrusions and the seal portion so that the alignment films 22 and 32 are opposing, and the liquid crystal material that includes the liquid crystal molecules 41 is poured therein. Next, by performing curing of the seal portion by heating and the like, and the liquid crystal material is sealed between the TFT substrate 20 and the CF substrate 30. FIG. 7 represents the cross-dimensional configuration of the liquid crystal layer 40 that is sealed between the first alignment film 22 and the second alignment film 32.

Figure 8:
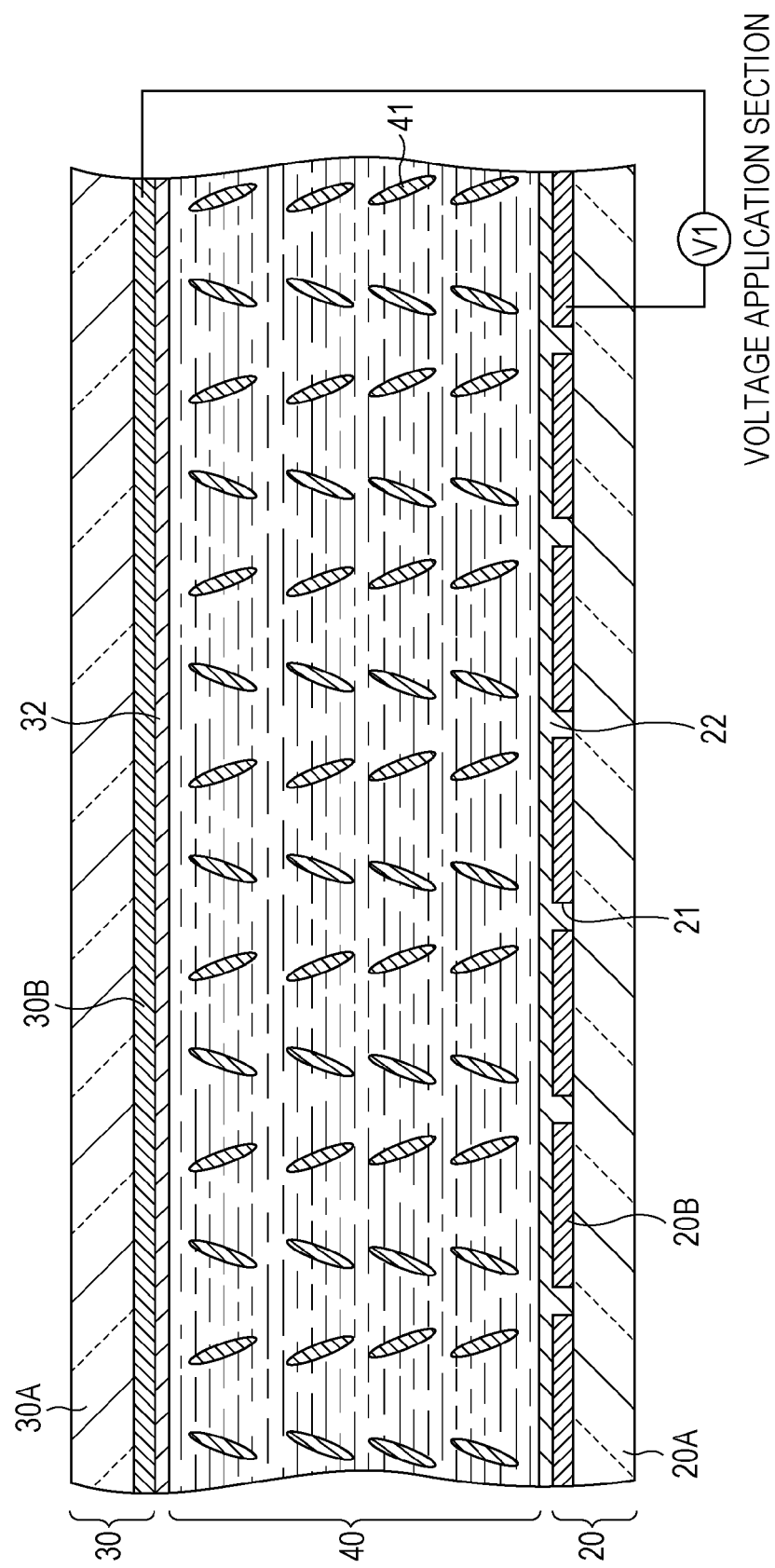
FIG. 8 is a schematic cross-sectional diagram of a substrate and the like for describing processes following FIG. 7.

Next, as illustrated in FIG. 8, a voltage V1 is applied between the pixel electrodes 20B and the opposing electrodes 30B using a voltage applying section (step S103). The voltage V1 is, for example, 3 volts to 30 volts. In so doing, an electric field in a direction with a predetermined angle with respect to the surfaces of the first substrate 20 and the second substrate 30 is generated, and the liquid crystal molecules 41 are aligned with a tilt toward a predetermined direction from the vertical direction of the first substrate 20 and are vertically aligned with respect to the second substrate 30. That is, the azimuth angle (angle of deviation) of the liquid crystal molecules 41 at this time is regulated by the strength and the direction of the electric field and the molecular structure of the alignment film material, and the polar angle (zenith angle) is regulated by the strength of the electric field and the molecular structure of the alignment film material. It is therefore possible to control the value of the pretilt angle $\theta_1$ of the liquid crystal molecules 41A by adjusting the value of the voltage V1 as appropriate.

Figure 9:
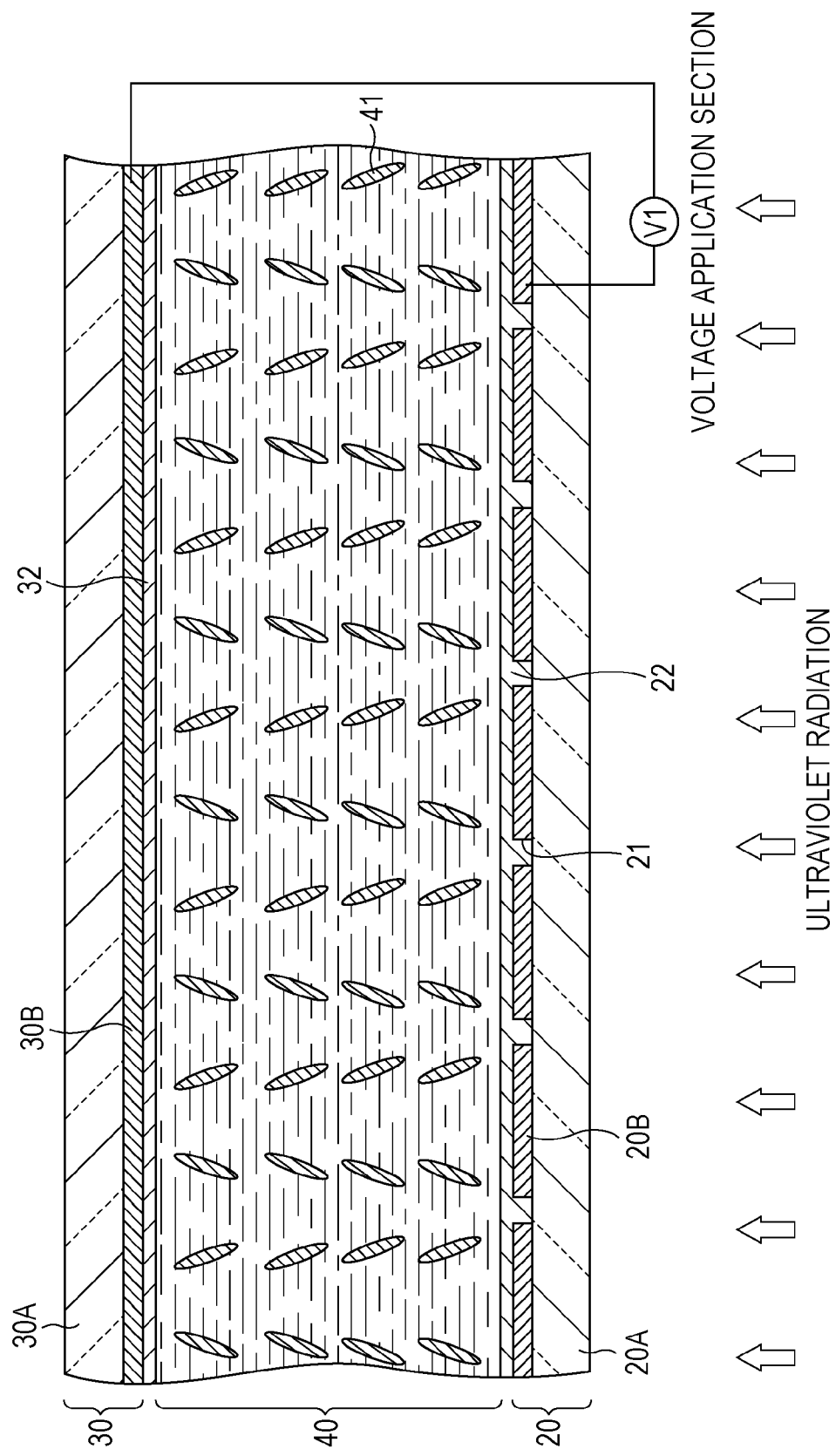
FIG. 9 is a schematic cross-sectional diagram of a substrate and the like for describing processes following FIG. 8.

In addition, as illustrated in FIG. 9, the alignment films 22 and 32 are irradiated with energy rays (specifically, ultraviolet radiation UV) from the outside of the TFT substrate 20, for example, while the voltage V1 is still applied. That is, ultraviolet radiation is irradiated while an electric field or a magnetic field is applied so that the liquid crystal molecules 41 are arranged in a diagonal direction with respect to the surface of the substrate 20. In so doing, the cross-linked functional group or the polymerized functional group of the first pre-alignment process compound and the second pre-alignment process compound within the alignment films 22 and 32 are reacted, and the first pre-alignment process compound and the second pre-alignment process compound are cross-linked (step S104). In such a manner, the direction in which the light crystal molecules 41 are to react is stored by the first post-alignment process compound and the second post-alignment process compound, a pretilt is conferred on the liquid crystal molecules 41A in the vicinity of the first alignment film 22, and the liquid crystal molecules 41B in the vicinity of the second alignment film 32 are vertically aligned. As a result, the first post-alignment process compound and the second post-alignment process compound are formed within the alignment films 22 and 32, the pretilt angle $\theta_1$ is conferred on the liquid crystal molecules 41A positioned in the vicinity of the interface with the first alignment film 22 in the liquid crystal layer 40, and in the liquid crystal layer 40, the liquid crystal molecules 41B positioned in the vicinity of the interface with the second alignment film 32 are vertically aligned. Ultraviolet radiation that includes many optical components with wavelengths of approximately 295 nm to 365 nm is preferable as the ultraviolet radiation UV. The reason is that if ultraviolet radiation including many optical components with shorter wavelengths is used, there is a concern that the liquid crystal molecules 41 may photodegrade and deteriorate. Here, although the ultraviolet radiation UV is irradiated from the outside of the TFT substrate 20, the ultraviolet radiation UV may be irradiated from the outside of the CF substrate 30 and may be irradiated from the outside of both the TFT substrate 20 and the CF substrate 30. In such a case, it is preferable that the ultraviolet radiation UV be irradiated from the side of the substrate with higher transmittance. Further, in a case when the ultraviolet radiation UV is irradiated from the outside of the CF substrate 30, depending on the wavelength of the ultraviolet radiation UV, there is a concern that the ultraviolet radiation UV may be absorbed by the color filter, making cross-linking reaction difficult. It is therefore preferable that the ultraviolet radiation UV be irradiated from the outside of the TFT substrate 20 (side of the substrate with pixel electrodes).

Figure 10:
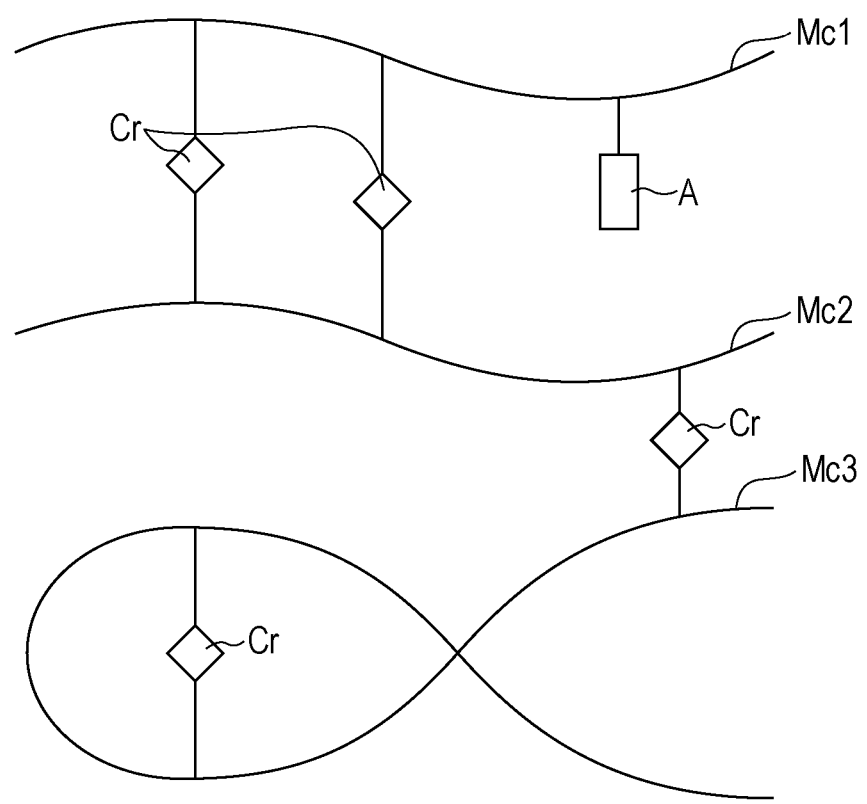
FIG. 10 is a schematic diagram that represents the state of a polymer compound (first post-alignment process compound) within an alignment film.

Here, the first post-alignment process compound within the first alignment film 22 is in the state illustrated in FIG. 10. That is, the orientation of the cross-linked functional group A or the polymerized functional group A introduced to the main chains Mc of the first pre-alignment process compound changes according to the alignment direction of the liquid crystal molecules 41, and a coupled portion Cr is formed by the cross-linked functional group A or the polymerized functional group A that are physically close together reacting with each other. It is considered that the first alignment film 22 confers the first pretilt angle $\theta_1$ on the liquid crystal molecules 41A by the first post-alignment process compound generated in such a manner. Here, the coupled portion Cr may be formed between first pre-alignment process compounds or may be formed within the first pre-alignment process compounds. That is, as illustrated in FIG. 10, the coupled portion Cr may be formed by reaction between the cross-linked functional group A or the polymerized functional group A of a first pre-alignment process compound that includes the main chain Mc1, for example, and the cross-linked functional group A or the polymerized functional group A of a first pre-alignment process compound that includes the main chain Mc2. Further, as with a polymer compound that includes a main chain Mc3, for example, the coupled portion Cr may be formed by the cross-linked functional group A or the polymerized functional group A introduced to the same main chain Mc3 reacting with each other. Here, in the case of a polymerized functional group, a plurality of polymerized functional groups A are coupled.

The liquid crystal display device (liquid crystal display element) illustrated in FIG. 1 is able to be completed by the processes described above.

According to the actions of the liquid crystal display device (liquid crystal display element), if a driving voltage is applied to selected pixels 10, the alignment state of the liquid crystal molecules 41 included in the liquid crystal layer 40 changes according to the potential difference between the pixel electrodes 20B and the opposing electrodes 30B. Specifically, in the liquid crystal layer 40, from the state before the driving voltage is applied illustrated in FIG. 1, the liquid crystal molecules 41A that are positioned in the vicinity of the first alignment film 22 fall in the tilting direction thereof by the driving voltage being applied, and such an action is propagated to the other liquid crystal molecules 41C and 41B. As a result, the liquid crystal molecules 41 react by adopting a posture that is approximately horizontal (parallel) to the TFT substrate 20 and the CF substrate 30. In so doing, an image is displayed by the optical characteristics of the liquid crystal layer 40 changing, the incident light on the liquid crystal display element becoming modulated outgoing light, and the gradation being expressed by such outgoing light.

Here, with a liquid crystal display element in which a pretilt process has not been carried out at all or a liquid crystal display device including such an element, even if alignment regulating portions such as slit portions for regulating the alignment of the liquid crystal molecules are provided, when a driving voltage is applied, with liquid crystal molecules that are aligned in the vertical direction with respect to the substrates, the directors thereof fall with an arbitrary orientation in an in-plane direction of the substrates. With liquid crystal molecules that react to the driving voltage in such a manner, the orientation of the director of each liquid crystal molecule becomes blurred, and the overall alignment becomes disturbed. Accordingly, there is problem that the response speed (startup speed of the image display) becomes slow, the response characteristics deteriorate, and as a result, the display characteristics decline. Further, if the initial driving voltage is set higher than the driving voltage in the display state and driven (overdriving), there are liquid crystal molecules that respond and liquid crystal molecules that hardly respond, and a large difference in the inclinations of the directors emerge therebetween. If the driving voltage of the display state is then applied, the liquid crystal molecules that responded when the initial driving voltage was applied adopt the inclinations of the directors according to the driving voltage of the display state while the actions thereof are hardly propagated to the other liquid crystal display molecules, and such inclinations are propagated to the other liquid crystal molecules. As a result, although the pixels as a whole reach the brightness of the display state when the initial driving voltage is applied, the brightness then decreases before once again reaching the brightness of the display state. That is, with overdriving, although the response speed seemingly becomes faster than in a case when overdriving is not performed, there is a problem that it is difficult to obtain a sufficient display quality. Here, such problems rarely occur with an IPS mode or FFS mode liquid crystal display element, and it is considered that such a problem is unique to VA mode liquid crystal display element.

On the other hand, with the liquid crystal display device (liquid crystal display element) of Embodiment 1 and the manufacturing method thereof, the first alignment film 22 confers the predetermined first pretilt angle $\theta_1$ on the liquid crystal molecules 41A. In so doing, the problem of a case when a pretilt process is not carried out at all does not easily occur, the response speed (startup speed of the image display) to the driving voltage improves greatly, and the display quality from overdriving also improves. Moreover, since the first slit portions 21 are provided as alignment regulating portions for regulating the alignment of the liquid crystal molecules 41 on the TFT substrate 20, display characteristics such as the field of vision characteristics are secured, and the response characteristics improve in a state in which favorable display characteristics are maintained.

On the other hand, since the second alignment film 32 is composed solely of a compound in which the second polymer compound is cross-linked or polymerized, as a result of the second alignment film 32 taking in more or adsorbing more of the liquid crystal molecules 41B positioned in the vicinity thereof, it is possible to be vertically aligned to the second substrate more quickly when the application of a voltage is interrupted. It is therefore possible to improve the termination speed of the image display. Moreover, since the liquid crystal molecules 41B are vertically aligned with respect to the second substrate 30, it is possible to reduce the amount of light transmission during black display, and it is possible to further improve the contrast.

Further, with the manufacturing method of the liquid crystal display device of the related art (light alignment technique), alignment films are formed to irradiate linearly polarized light and light in a diagonal direction with respect to the substrate faces (hereinafter referred to as "diagonal light") with respect to precursors including a predetermined polymer material provided on the substrate faces, carrying out a pretilt process therewith. There is therefore a problem that an extensive light irradiation device that irradiates linearly polarized parallel light is demanded. Further, with the formation of pixels with multi-domain for realizing a wider viewing angle, there is a problem that a mask is demanded, and moreover, the manufacturing process becomes complex. In particular, in a case when forming alignment films using diagonal light, if there are structures such as spacers and unevenness on the substrates, regions where the light does not reach in the shadows of the structures and the like appear, and the desirable alignment regulation of the liquid crystal molecules in such regions becomes difficult. In such a case, for example, in order to irradiate diagonal light using a photomask for providing a multi-domain within the pixels, a pixel setting taking the diffraction of light into consideration becomes important. That is, in a case when forming alignment films using diagonal light, there is also a problem that the formation of high definition pixels is difficult.

Furthermore, out of the light alignment techniques of the related art, in a case when a cross-linked polymer compound is used as the polymer material, since the cross-linked functional group or the polymerized functional group included in the cross-linked functional group within the precursor film has a random orientation (direction) by thermal agitation, the probability of the physical distances between the cross-linked functional groups and the polymerized functional groups decreasing becomes low. Moreover, in a case when random light (unpolarized light) is irradiated, although the cross-linked functional groups or the polymerized functional groups react by the physical distances therebetween decreasing, it is important for the polarizing direction and the direction of the reacting portions of the cross-linked functional groups or the polarized functional groups that react by irradiating linearly polarized light match a predetermined direction. Further, with diagonal light, compared to vertical light, the greater the irradiation area becomes, the more the irradiation amount per unit area decreases. That is, the proportion of the cross-linked functional group or the polarized functional group that react to linearly polarized light or diagonal light decreases compared to a case when the substrate faces are irradiated by random light (unpolarized light) from the vertical direction. Accordingly, the cross-linking density (degree of cross-linking) within the alignment films that are formed tends to decrease.

On the other hand, in Embodiment 1, the liquid crystal layer 40 is sealed between the first alignment film 22 and the second alignment film 32 after the first alignment film 22 and the second alignment film 32 that include the first pre-alignment process compound and the second pre-alignment process compound are formed. Next, while the liquid crystal molecules 41 adopt a predetermined alignment by a voltage being applied on the liquid crystal layer 40, the first pre-alignment process compound and the second pre-alignment process compound within the alignment films 22 and 32 are cross-linked or polymerized while the directions of the terminal structure portions of the side chains with respect to the substrates or the electrodes are regulated by the liquid crystal molecules 41. In so doing, it is possible to form the first alignment film 22 that confers the pretilt angle $\theta_1$ on the liquid crystal molecules 41A and the second alignment film 32 that confers the second pretilt angle $\theta_2$ on the liquid crystal molecules 41B. That is, according to the liquid crystal display device (liquid crystal display element) and the manufacturing method thereof of Embodiment 1, the response characteristics are easily able to be improved without using an extensive device. Moreover, since it is possible to confer the first pretilt angle $\theta_1$ on the liquid crystal molecules 41 without being dependent on the irradiation direction of the ultraviolet radiation when the first pre-alignment process compound is cross-linked or polymerized, it is possible to form high definition pixels. Furthermore, since the first post-alignment process compound is generated in a state in which the orientations of the terminal structure portions of the side chains are ordered in the first pre-alignment process compound, it is considered that the degree of cross-linking in the first post-alignment process compound is greater than with the alignment films of the manufacturing method of the related art described above. Therefore, since cross-linked structures tend not to be newly created during driving even after driving for an extended period of time and the pretilt angle $\theta_1$ of the liquid crystal molecules 41A is maintained at the same state as at the time of manufacture, reliability is also able to be improved.

In such a case, in Embodiment 1, since the first pre-alignment process compound and the second pre-alignment process compound within the alignment films 22 and 32 are cross-linked or polymerized after the liquid crystal layer 40 is sealed between the alignment films 22 and 32, the transmittance when the liquid crystal display element is driven is able to be changed to continuously increase.

Figure 12:
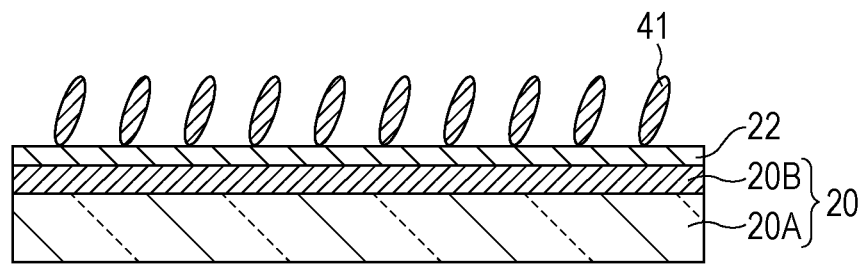
FIG. 12 is a schematic cross-sectional diagram for describing order parameters.

In Embodiment 1 where a pretilt process is carried out by the cross-linking reaction of the first pre-alignment process compound after the liquid crystal layer 40 is sealed, a pretilt is conferred according to the alignment direction of the liquid crystal molecules 41 during driving by the first slit portions 21 for regulating the alignment of the liquid crystal molecules 41 in the vicinity of the first alignment film 22. Therefore, as illustrated in FIG. 12, since the direction of the pretilt of the liquid crystal molecules 41 is easily coordinated, the order parameter increases (becomes closer to 1). Accordingly, since the liquid crystal molecules 41 exhibit even behavior when the liquid crystal display element is driven, the transmittance increases continuously.

In such a case, in particular, if the first pre-alignment process compound includes the group shown in Formula 1 along with a cross-linked functional group or a polymerized functional group or the first pre-alignment process compound includes the group shown in Formula 2 as a cross-linked functional group or a polymerized functional group, it becomes easier to confer the pretilt angle $\theta_1$ on the first alignment film 22. It is therefore possible to further increase the response speed (startup speed of the image display).

With Embodiment 1, although a case when the first alignment film 22 that includes a first pre-alignment process compound that includes a main chain including a polyimide structure is used has been mainly described, the main chain that the first pre-alignment process compound includes is not limited to those including a polyimide structure. For example, the main chain may include a polysiloxane structure, a polyacrylate structure, a polymethacrylate structure, a maleimide polymer structure, a styrene polymer structure, a styrene/maleimide polymer structure, a polysaccharide structure, a polyvinyl alcohol structure, and the like, of which a first pre-alignment process compound that includes a main chain including a polysiloxane structure is preferable. The reason is that effects similar to a polymer compound that includes a polysiloxane structure are then obtained. A polymer compound that includes the polysiloxane structure represented by FIG. 9, for example, is exemplified as a first pre-alignment process compound that includes a main chain including a polysiloxane structure. Although R10 and R11 in Formula 9 are arbitrary as long as R10 and R11 are monovalent and configured to include carbon atoms, it is preferable that a cross-linked functional group or a polymerized functional group as a side chain and a side chain composed of Formula 1 be included in either R10 or R11. The reason is that it is then easy to obtain sufficient alignment regulating capabilities with the first post-alignment process compound. The group shown in Formula 41 above and the like are exemplified as the cross-linked functional group or the polymerized functional group in such a case.

(9)

Here, R10 and R11 are monovalent organic groups, and m1 is an integer equal to or greater than 1.

Furthermore, although the viewing angle characteristics were to be improved by proving the first slit portions 21 in Embodiment 1, improving the viewing angle characteristics is not limited thereto. For example, protrusions as alignment regulating portions may be provided over the pixel electrodes 20B instead of the first slit portions 21. By providing protrusions in such a manner, the same effects as in a case when the first slit portions 21 are provided are obtained.

Figure 2:
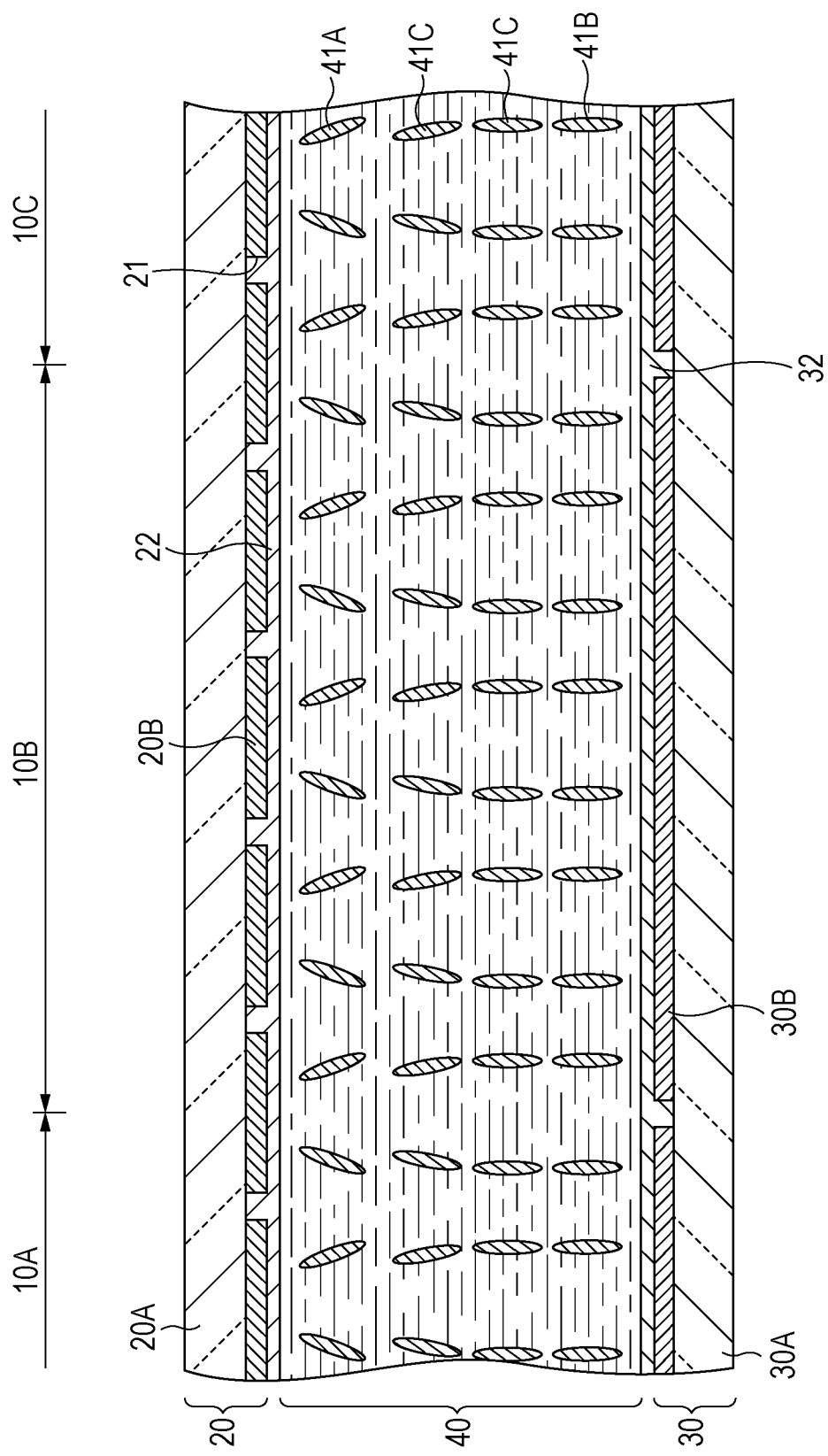
FIG. 2 is a schematic partial cross-sectional diagram of a modification of a liquid crystal display device according to an embodiment of the present disclosure.

Here, in the example illustrated in FIG. 1, although the first alignment film 22 that covers the TFT substrate that is the first substrate 20 has a configuration of including the first post-alignment process compound and conferring the first pretilt angle $\theta_1$ on the liquid crystal molecules 41A that are positioned on the side of the first substrate (TFT substrate) 20 out of the liquid crystal layer 40, the configuration is not limited thereto. That is, as illustrated in FIG. 2, it is also possible for the first substrate 20 to be the CF substrate and for the second substrate 30 to be the TFT substrate, and even in such a case, it is possible to obtain the same effects as the liquid crystal display device illustrated in FIG. 1. However, with the TFT substrate, since various transverse electric fields are generated when driving, it is desirable that the modification of the liquid crystal display device of FIG. 2 in which the second substrate 30 is the TFT substrate be adopted. In so doing, it is possible to effectively reduce alignment disturbance of the liquid crystal molecules 41 by transverse electric fields.

Next, although other embodiments will be described, description for constituent elements that are in common with Embodiment 1 will be omitted by using the same reference symbols. Further, the same actions and effects as Embodiment 1 will also be omitted as appropriate. Furthermore, the various technical items described above according to Embodiment 1 are also applied to the embodiments below as appropriate.

Embodiment 2

Embodiment 2 relates to the liquid crystal display device according to the second embodiment of the present disclosure and the manufacturing methods of the liquid crystal display device according to the second and third embodiments of the present disclosure.

In Embodiment 1, the first post-alignment process compound is obtained by the cross-linked functional group or the polymerized functional group in a first pre-alignment process compound that includes a cross-linked functional group or a polymerized functional group as a side chain being cross-linked or polymerized. On the other hand, in Embodiment 2, the first post-alignment process compound is obtained based on a first post-alignment process compound including a photosensitive functional group that is deformed by the irradiation of energy rays as the side chain.

Figure 14:
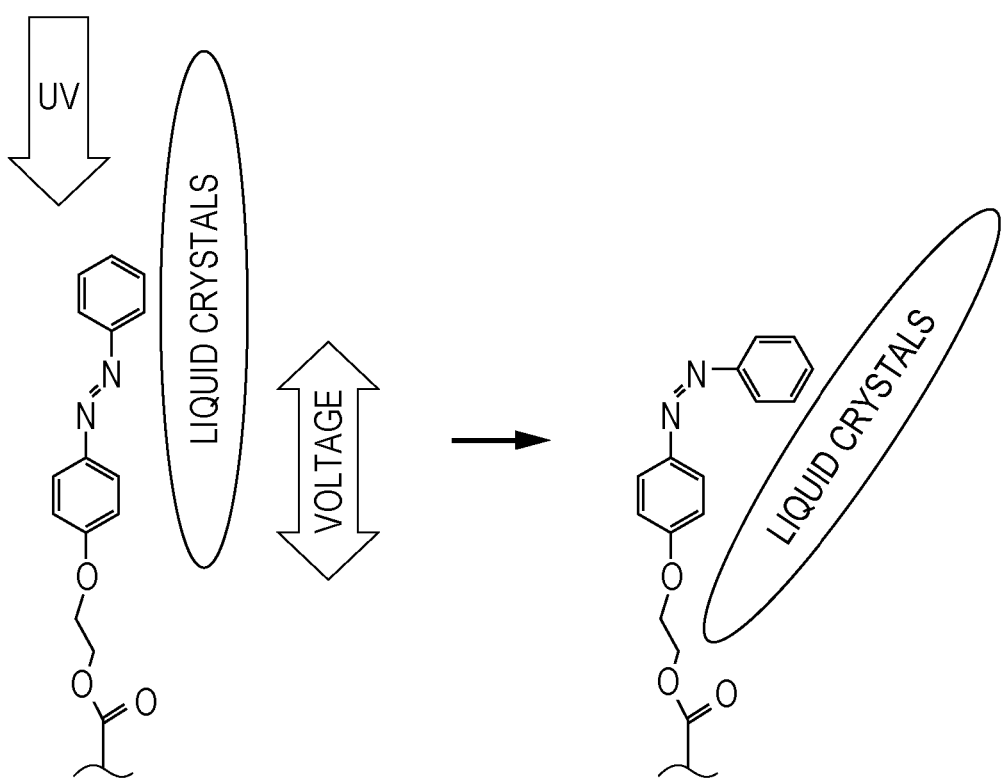
FIG. 14 is an outline diagram for describing the relationship between a deformed polymer compound and the liquid crystal molecules.

Here, in Embodiment 2, the first alignment film 22 is also configured to include one or two or more types of a polymer compound (first post-alignment process compound) that includes a cross-linked structure in the side chain or to respectively include one or two or more types of a side chain including a terminal group along the liquid crystals shown in Formula 1 along with a cross-linked functional group or a polymerized functional group. Furthermore, a pretilt is conferred on the liquid crystal molecules by a deformed compound. Here, after forming the first alignment film 22 in a state of including one or two or more types of a first polymer compound (first pre-alignment process compound) including a main chain and a side chain, the first post-alignment process compound is generated by providing the liquid crystal layer 40 and deforming the polymer compound or alternatively irradiating the polymer compound with energy rays, more specifically, by deforming the photosensitive functional group included in the side chain while applying an electric field or a magnetic field. Here, such a state is illustrated in the outline diagram of FIG. 14. Here, in FIG. 14, the direction of the arrow with "UV" and the direction of the arrow with "voltage" do not indicate the direction in which the ultraviolet radiation is irradiated and the direction of the electric field that is applied. Furthermore, the first post-alignment process compound includes a structure of arranging the liquid crystal molecules in a predetermined direction (specifically, a diagonal direction) with respect to one of the pair of substrates (the TFT substrate 20 or the CF substrate 30). In such a manner, since by the first post-alignment process compound being included within the first alignment film 22 by deforming the polymer compound or irradiating the polymer compound with energy rays, a pretilt is able to be conferred on the liquid crystal molecules 41 in the vicinity of the first alignment film 22, the response speed (startup speed of the image display) becomes faster and the display characteristics are improved.

An azobenzene compound including an azo group, a compound that includes imine and aldimine as the skeleton (for convenience, referred to as "aldimine benzene"), and a compound that includes a styrene skeleton (for convenience, referred to as "stilbene") are exemplified as the photosensitive functional group. Such compounds confer a pretilt on the liquid crystal molecules as a result of reacting to energy rays (for example, ultraviolet radiation) and deforming, that is, as a result of transitioning from a trans state to a cis state.

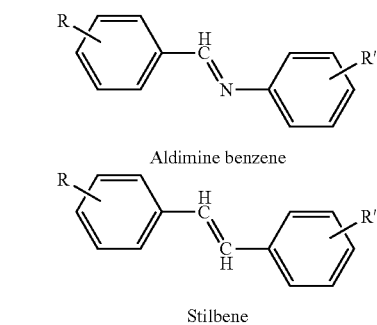

Aldimine benzene

Stilbene

Formulae AZ-1 to AZ-9 below are specific examples of "X" in the azobenzene compound represented by Formula AZ-0.

(AZ-0)

(AZ-1)

(AZ-2)

(AZ-3)

(AZ-4)

-continued

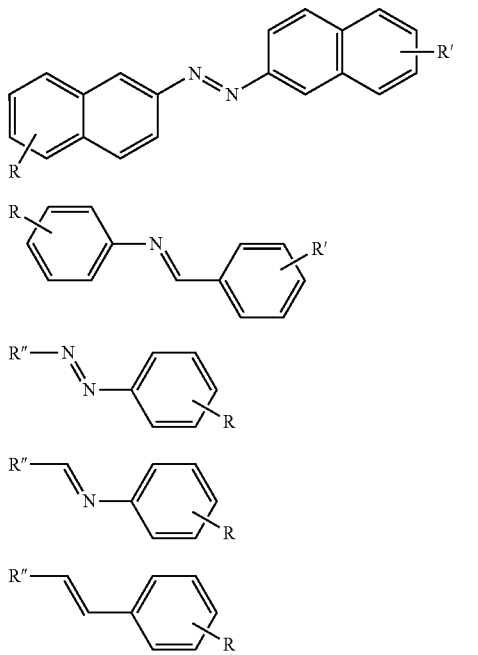

(AZ-5)

(AZ-6)

(AZ-7)

(AZ-8)

(AZ-9)

Here, either one of R and R" is bonded to a benzene ring that includes diamine directly or via an ether, an ester, or the like, the other becomes a terminal group, R, R', and R" are monovalent group including a hydrogen atom, halogen atom, an alkyl group, an alkoxy group, and a carbonate group or are derivatives thereof, and the terminal group may include R2 of Formula 1 and R13 of Formula 2 therebetween. In so doing, a tilt is more easily able to be conferred. R" is bonded to a benzene group that includes diamine directly or via an ether, an ester, or the like.

Since the second alignment film 32 is the same as Embodiment 1, detailed description will be omitted. Further, since the liquid crystal display device and the manufacturing method thereof of Embodiment 2 is in essence the same as the liquid crystal display device and the manufacturing method thereof described in Embodiment 1 with the exception that a first pre-alignment process compound including a photosensitive functional group that is deformed by the irradiation of energy rays (specifically, ultraviolet radiation) is used, detailed description will be omitted.

Example 1

Example 1 relates to the liquid crystal display device (liquid crystal display element) according to the first embodiment of the present disclosure and the manufacturing method thereof and the liquid crystal display device (liquid crystal display element) according to the third embodiment of the present disclosure and the manufacturing method thereof. In Example 1, the liquid crystal display device (liquid crystal display element) illustrated in FIG. 1 was produced by the following procedure.

First, the TFT substrate 20 and the CF substrate 30 were prepared. A substrate on which the pixel electrodes 20B composed of ITO that includes a slit pattern (the width and the pitch of the first slit portions 21 are respectively 5 µm and 65 µm, the widths of the portions of the first electrodes 20B on which the first slit portions 21 are formed are 60 µm, and the gap between a first electrode 20B and another first electrode 20B is 5 µm) on one face side of a glass substrate 20A with a thickness of 0.7 mm was used as the TFT substrate 20. Further, a substrate on which the opposing electrodes 30B composed of ITO on the color filter of a glass substrate 30A with a thickness of 0.7 mm on which a color filter is formed was used as the CF substrate 30. A diagonal electric field is applied between the TFT substrate 20 and the CF substrate 30 by slit patterns formed on the pixel electrodes 20B and the opposing electrodes 30B. Next, 3.5 µm spacer protrusions were formed over the TFT substrate 20. Here, the slit patterns illustrated in FIG. 3B were used as the slit patterns.

On the other hand, the alignment film materials for the first and second alignment films were prepared. In such a case, for example, first, the compound including the cross-linked functional group shown in Formula A-6, the compound including the vertical alignment inducing structure portion shown in Formula B-4, the tetracarboxylic dianhydride shown in Formula E-2, and the compound represented by Formula G-1 were dissolved in N-methyl-2-pyrolidone (NMP). Next, after reacting the solvent for six hours at 60° C., the reaction products were deposited by pouring in a large excess of pure water. Subsequently, after separating and washing the deposited solids with pure water, the solids were dried over fifteen hours at 40° C. at reduced pressure, and in so doing, the polyamic acid that is the polymer compound precursor as the first pre-alignment process compound and the second pre-alignment process compound was synthesized. Finally, by dissolving 3.0 g of the obtained polyamic acid in the NMP to produce a solution with a solid content concentration of 3 mass %, the solution was filtrated through a 0.2 µm filter. The first polymer compound for forming the first alignment film 22 and a second polymer compound 1A and a second polymer compound 1B for forming the second alignment film 32 were obtained.

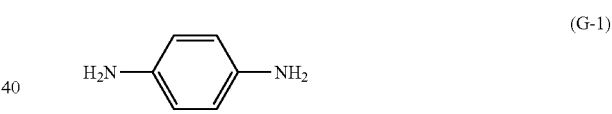

(G-1)

Next, after respectively applying the prepared first polymer compound, the second polymer compound 1A, and the second polymer compound 1B (refer to Table 1) on the TFT substrate 20 and the CF substrate 30 using a spin coater, the applied films were dried for 80 seconds on an 80° C. hotplate. The TFT substrate 20 and the CF substrate 30 were then heated for one hour in a 200° C. oven in an atmosphere of nitrogen gas. In so doing, the first alignment films 22 and 32 with thicknesses of 90 nm on the pixel electrodes 20B and the opposing electrodes 30B were formed.

Next, a seal portion was formed on the periphery of the pixel portions on the CF substrate 30 by applying an ultraviolet curable resin including silica particles with a particle diameter of 3.5 µm, and a liquid crystal material composed of MLC-7029 (manufactured by Merck & Co., Inc.) that is a negative type liquid crystal was poured dropwise into the portion surrounded by the seal portion. The TFT substrate 20 and the CF substrate 30 were then adhered together so that the center of the line portion of the pixel electrodes 20B and the second slit portions 31 of the opposing electrodes 30B were opposing, and the seal portion was cured. Next, the seal portion was completely cured by heating in an oven for one hour at 120° C. In so doing, a liquid crystal display device including liquid crystal cells in which the liquid crystal layer 40 is sealed was completed.

The first pre-alignment process compound within the first alignment film 22 and the second pre-alignment process compound within the second alignment film 32 was reacted by irradiating ultraviolet radiation of 500 mJ (measured at a wavelength of 365 nm) evenly on the liquid crystal cells produced in such a manner in a state in which a square wave AC electric field (60 Hz) with effective voltage values of 10 volts, 15 volts, and 20 volts was applied. In so doing, the alignment films 22 and 32 that include the first post-alignment process compound and the second post-alignment process compound were formed on the TFT substrate 20 and the CF substrate 30. The liquid crystal display device (liquid crystal display element) illustrated in FIG. 1 in which the liquid crystal molecules 41A and the liquid crystal molecules 41B on the TFT substrate 20 and CF substrate 30 sides have a pretilt or are vertically aligned was completed. Finally, a pair of polarization plates was adhered on the outside of the liquid crystal display device so that the absorption axes were orthogonal.

As shown in Table 1, with the exception that the material used were different, the alignment film materials were prepared similarly to the alignment film material 1B, and the liquid crystal display device was produced similarly as described above.

Further, as a comparative example, a liquid crystal display device was created similarly as described above by preparing the alignment film materials 1A and 1B. The alignment film materials 1A and 1B are polymer compounds with no cross-linking or polymerization.

|  | Cross-linked material (diamine compound) | | Compound for vertical alignment | | Tetracarboxylic dianhydride | | Main spacer | |
|---|---|---|---|---|---|---|---|---|
|  | Material | Molar ratio | Material | Molar ratio | Material | Molar ratio | Material | Molar ratio |
| [Example 1] | | | | | | | | |
| First polymer Compound | A-6 | 25 | B-4 | 5 | E-2 | 50 | G-1 | 20 |
| Second polymer compound 1A | A-6 | 5 | B-4 | 60 | E-2 | 10 | G-1 | 25 |
| Second polymer compound 1B | A-6 | 5 | B-4 | 80 | E-2 | 10 | G-1 | 5 |
| [Comparative Example 1] | | | | | | | | |
| Alignment film material 1A | | | B-4 | 60 | E-2 | 10 | G-1 | 30 |
| Alignment film material 1B | | | B-4 | 80 | E-2 | 10 | G-1 | 10 |

With regard to the liquid crystal display device (liquid crystal display element) using such alignment film materials, the response time (startup time $T_{on}$ and terminal time $T_{off}$ of the image display) and the pretilt angle $\theta_1$ and the vertical alignment angle $\theta_2$ were measured. The results are illustrated in Table 2 and FIGS. 21A and 21B.

When measuring the response time, the time taken from a brightness of 10% to reach a brightness of 90% of the gradation according to the driving voltage (startup time $T_{on}$ of the image display) and the time taken from a brightness of 90% to reach a brightness of 10% of the gradation according to the driving voltage (termination time $T_{off}$ of the image display) were measured by applying a driving voltage (7.5 volts) between the pixel electrodes 20B and the opposing electrodes 30B using LCD5200 (manufactured by Otsuka Electronics Co., Ltd.) as the measurement device. Further, when investigating the pretilt angle $\theta_1$ of the liquid crystal molecules 41, measurement was performed by a crystal rotation method using a He—Ne laser light complying with a common method (method described in T. J. Scheffer et al., J. Appl. Phys. vol. 19, p. 2013, 1980). Here, as described above and illustrated in FIG. 4, the pretilt angle $\theta_1$ is the inclination angle of the directors D of the liquid crystal molecules 41 (41A) when the driving voltage is in an OFF state in a case when the vertical direction to the surface of the glass substrate 20A (normal vector direction) is Z.

TABLE 2

| Effective voltage value | Volts | 10 | 15 | 20 |
|---|---|---|---|---|
| [Example 1] | | | | |
| First polymer compound and second polymer compound 1A | | | | |
| $T_{on}$ | ms | 5.90 | 5.84 | 5.69 |
| $T_{off}$ | ms | 3.17 | 3.18 | 3.22 |
| $\theta_1$ | degrees | 0 | 0 | 0 |
| $\theta_2$ | degrees | 1.0 | 1.5 | 2.0 |
| First polymer compound and second polymer compound 1B | | | | |
| $T_{on}$ | ms | 5.62 | 5.06 | 5.03 |
| $T_{off}$ | ms | 3.18 | 3.22 | 3.27 |
| $\theta_1$ | degrees | 0 | 0 | 0 |
| $\theta_2$ | degrees | 1.0 | 1.5 | 2.0 |
| [Comparative Example 1] | | | | |
| First polymer compound and alignment film material 1A | | | | |
| $T_{on}$ | ms | 6.22 | 6.13 | 5.78 |
| $T_{off}$ | ms | 3.25 | 3.31 | 3.36 |
| $\theta_1$ | degrees | 0 | 0 | 0 |
| $\theta_2$ | degrees | 1.0 | 1.5 | 2.0 |

TABLE 2-continued

| Effective voltage value | Volts | 10 | 15 | 20 |
|---|---|---|---|---|
| First polymer compound and alignment film material 1B | | | | |
| $T_{on}$ | ms | 5.88 | 5.49 | 5.27 |
| $T_{off}$ | ms | 3.26 | 3.30 | 3.33 |
| $\theta_1$ | degrees | 0 | 0 | 0 |
| $\theta_2$ | degrees | 1.0 | 1.5 | 2.0 |

Figure 21A:
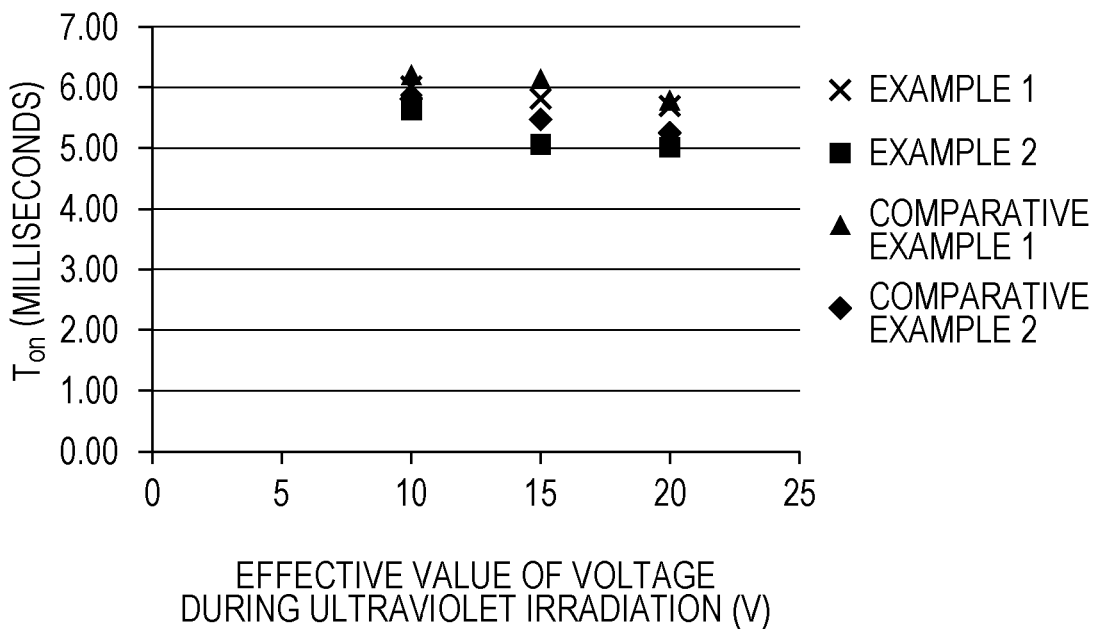
FIGS. 21A and 21B are graphs that illustrate the results of measuring the response time (startup time $T_{on}$ and termination speed $T_{off}$ of image display) in liquid crystal display devices of Example 1 and Comparative Example 1.
Figure 21B:
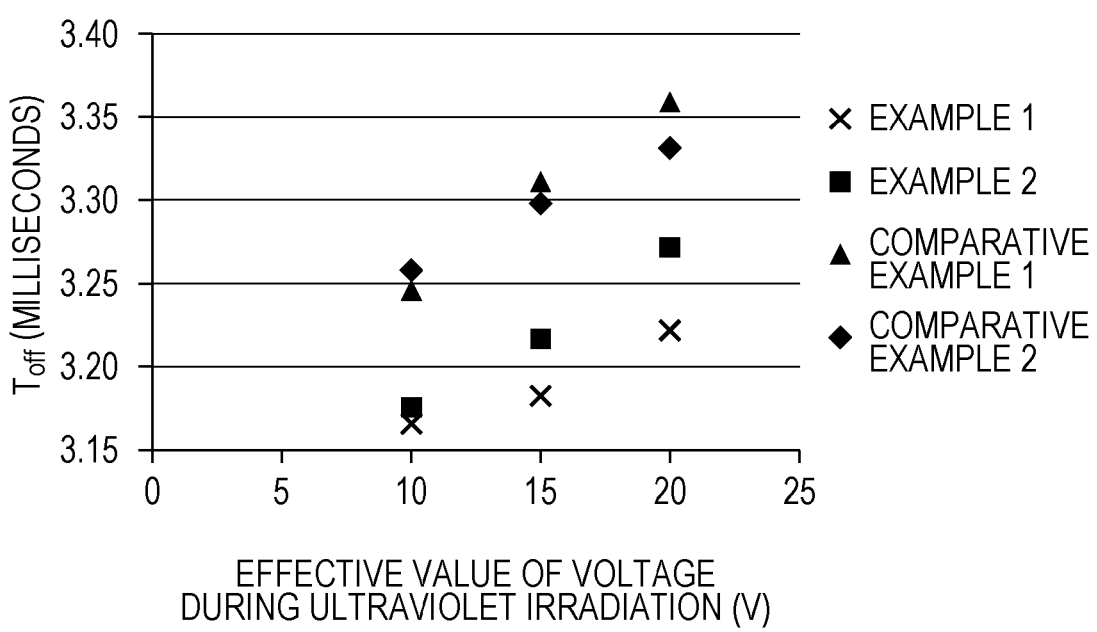

It is seen from Table 2 and FIGS. 21A and 21B that if Example 1 and Comparative Example 1 are compared, since the pretilt angle $\theta_1$ is conferred for both liquid crystal display devices, there is no great difference in the startup time $T_{on}$ of the image display. However, compared to the liquid crystal display device of Comparative Example 1 produced from the alignment film materials 1A and 1B configured from a polymer compound with no cross-linking or polymerization, the liquid crystal display device of Example 1 which includes the second alignment film that is cross-linked or polymerized is able to shorten the termination time $T_{off}$.

As described above, in Example 1 or Example 2 described later, the first pre-alignment process compound or the second pre-alignment process compound within the alignment films 22 and 32 are cross-linked or polymerized so that the first alignment film 22 confers the first pretilt angle $\theta_1$ on the liquid crystal molecules 41A in the vicinity thereof and the second alignment film 32 vertically aligns the liquid crystal molecules 41B in the vicinity thereof in a state in which the liquid crystal layer 40 is provided. In so doing, it is possible to greatly improve the response speed (startup speed and termination speed of the image display).

Example 2

Example 2 relates to the liquid crystal display device (liquid crystal display element) according to the second embodiment of the present disclosure and the manufacturing method thereof and the liquid crystal display device (liquid crystal display element) according to the third embodiment of the present disclosure and the manufacturing method thereof. In Example 2, a pretilt is conferred on the liquid crystal molecules by deforming the first polymer compound (first pre-alignment process compound) after sealing the liquid crystal layer. Specifically, the side chain of the first polymer compound (first pre-alignment process compound) is deformed by irradiating ultraviolet radiation while aligning the liquid crystal molecules by applying a predetermined electric field on the liquid crystal layer. In Example 2, a first pre-alignment process compound and a first post-alignment process compound including a photosensitive functional group were used. Specifically, a liquid crystal display device with the same configuration and structure as that described in Example 1 and illustrated in FIG. 1 was produced using the azobenzene compound and the compound including a styrene skeleton shown in Formulae H-1 and H-2 as the first pre-alignment process compound that includes a photosensitive functional group, and the response characteristics were investigated. Here, the second polymer compound 1A was used as the second polymer compound.

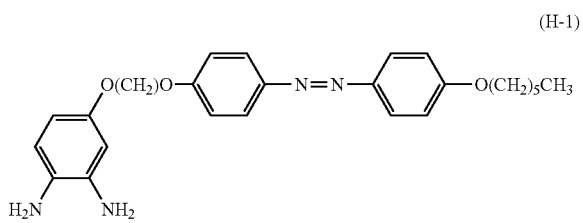

(H-1)

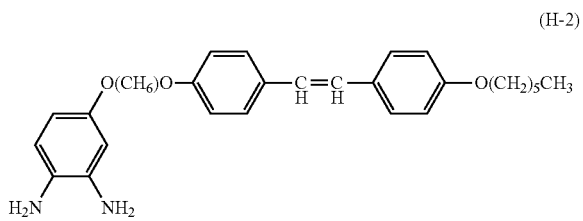

(H-2)

In Example 2, the alignment film materials 2A to 2D shown in Table 3 were obtained in essence similarly to Example 1. Furthermore, similarly to Example 1, the alignment films 22 and 32 with thicknesses of 90 nm on the pixel electrodes 20B and the opposing electrodes 30B were formed. Next, similarly to Example 1, a seal portion was formed on the periphery of the pixel portions on the CF substrate 30 by applying an ultraviolet curable resin including silica particles with a particle diameter of 3.5 μm, and a liquid crystal material composed of MLC-7029 (manufactured by Merck & Co., Inc.) that is a negative type liquid crystal was poured dropwise into the portion surrounded by the seal portion. Next, the TFT substrate 20 and the CF substrate 30 were adhered together so that the center of the line portion of the pixel electrodes 20B and the second slit portions 31 of the opposing electrodes 30B were opposing, and the seal portion was cured. Next, the seal portion was completely cured by heating in an oven for one hour at 120° C. In so doing, the liquid crystal layer 40 was sealed, and the liquid crystal cells were completed.

| First polymer compound | Diamine compound | | Compound including vertical alignment inducing structure portion | | Compound including group able to be along liquid crystal molecules | | Tetracarboxylic dianhydride | | Main chain spacer | | Compound including photosensitive functional group that is deformed | |
|---|---|---|---|---|---|---|---|---|---|---|---|---|
| | Material | Molar Ratio | Material | Molar ratio | Material | Molar ratio | Material | Molar ratio | Material | Molar ratio | Material | Molar ratio |
| Alignment film material 2A | A-6 | 15 | B-4 | 5 | | | E-2 | 50 | G-1 | 20 | H-1 | 10 |
| Alignment film material 2B | A-6 | 15 | B-4 | 5 | | | E-2 | 50 | G-1 | 20 | H-2 | 10 |
| Alignment film material 2C | A-6 | 10 | | | C-1 | 10 | E-2 | 50 | G-1 | 20 | H-1 | 10 |
| Alignment film material 2D | | | B-4 | 5 | | | E-1 | 50 | G-1 | 20 | H-1 | 25 |

The first pre-alignment process compound within the first alignment film 22 was deformed by irradiating ultraviolet radiation of 500 mJ (measured at a wavelength of 365 nm) evenly on the liquid crystal cells produced in such a manner in a state in which a square wave AC electric field (60 Hz) with an effective voltage value of 20 volts was applied. In so doing, the first alignment film 22 that includes the first post-alignment process compound was formed on the TFT substrate 20. The liquid crystal display device (liquid crystal display element) illustrated in FIG. 1 in which the liquid crystal molecules 41A of the TFT substrates 20 have a pretilt was thus completed. Finally, a pair of polarization plates was adhered on the outside of the liquid crystal display device so that the absorption axes were orthogonal.

When the response times were measured for liquid crystal display devices (liquid crystal display elements) using such alignment film materials 2A to 2D, the same results as Example 1 were obtained.

Although the present disclosure has been described above exemplifying preferable embodiments and examples, the present disclosure is not limited to such embodiments, and various modifications are possible. For example, although a VA mode liquid crystal display device (liquid crystal display element) has been described in the embodiments and examples, the present disclosure is not necessary limited thereto, and is applicable to other display modes such as ECB mode (mode with positive liquid crystals with horizontal alignment; no twists), IPS (In Plane Switching) mode, FFS (Fringe Field Switching) mode, OCB (Optically Compensated Bend) mode, and the like. The same effects are also obtained in such a case. However, with the embodiments of the present disclosure, compared to not carrying out a pretilt process, with VA mode, it is possible to exhibit particularly greatly improved effects in the response characteristics than the IPS mode or the FFS mode.

Further, although only a transmission type liquid crystal display device (liquid crystal display element) has been described in the embodiments and the examples, the present disclosure is not necessarily limited to the transmission type, and for example, may be a reflection type. In the case of a reflective type, the pixel electrodes are configured by an electrode material with light reflectivity such as aluminum.

Although alignment regulating portions were provided only on the first substrate side in the liquid crystal display device described above, first alignment regulating portions (first slit portions) may be provided on the first substrate and second alignment regulating portions (second slit portions) may be provided on the second substrate. The liquid crystal display device described below is able to be exemplified as an example of such a liquid crystal display device. That is, a liquid crystal display device is composed of a plurality of pixels being arranged, the liquid crystal display device including: a first substrate and a second substrate; first electrodes formed on the opposing face of the first substrate that opposes the second substrate; first alignment regulating portions provided on the first electrodes; a first alignment film that covers the first electrodes, the first alignment regulating portions, and the opposing face of the first substrate; second electrodes formed on the opposing face of the second substrate that opposes the first substrate; a second alignment film that covers the second electrodes, the second alignment regulating portions, and the opposing face of the second substrate; and a liquid crystal layer that is provided between the first alignment film and the second alignment film and that includes liquid crystal molecules, wherein in each pixel, the long axes of liquid crystal molecule groups in the liquid crystal layer are approximately positioned within the same virtual plane in a central region of an overlap region in which a projection image of a region surrounded by the margin portions of the first electrodes and the first alignment regulating portions and a projection image of a region surrounded by the margin portions of the second electrodes and the second alignment regulating portions overlap, wherein a pretilt is conferred on the liquid crystal molecules by the first alignment film. Here, when the central region of the overlap region is viewed from the normal vector direction of the second substrate, the long axes of the liquid crystal molecule groups that occupy the central region of the overlap region along the normal vector direction of the second substrate (more specifically, liquid crystal molecule groups that occupy the tiny pillar-like region from the first substrate to the second substrate) are approximately positioned within the same virtual vertical plane.

Here, the second alignment regulating portions are composed of the second slit portions that are formed on the second electrodes, the width of the second slit portions is equal to or greater than 2 μm and less than 10 μm, the pitch of the second slit portions is from 10 μm to 180 μm, preferably 30 μm to 180 μm, and more preferably 60 μm to 180 μm.

Here, "the central region of the overlap region" refers to a region that a center that matches the center of the overlap region, has a similar shape to the overlap region, and has an area that is 25% of the area of the overlap region. Further, "the long axes of the liquid crystal molecule groups of the liquid crystal layer are approximately positioned within the same virtual plane" refers to the angle between the virtual plane and the long axes of the liquid crystal molecule groups being within ±5 degrees. In other words, the variation in the azimuth angles (angles of deviation) of the liquid crystal molecules groups is within ±5 degrees. Furthermore, in a case when a pixel is configured by a plurality of subpixels, a pixel may be read as subpixels. Further, a total reflection damped oscillation method (also known as total reflection attenuation method) or a phase difference measurement method is exemplified as a measurement method of the angle between the virtual plane and the long axes of the liquid crystal molecule groups or the variation in the azimuth angles (angles of deviation) of the liquid crystal molecule groups. Here, the total reflection damped oscillation method is a method of measuring the absorption spectrum of a sample surface, and by adhering the sample to a high refractive index medium (prism), measures the total reflection of the slight amount of light that seeps out from the prism and that is reflected. Furthermore, the total reflection damped oscillation method is a method of ascertaining information (alignment direction) relating to the absorption of molecules around 100 nm (liquid crystals and alignment films) by rotating the orientation of the sample. Further, the phase difference measurement method is a method of calculating the pretilt by measuring the phase difference when the liquid crystal cells are in an inclined state by a desired angle using RETS100 (manufactured by Otsuka Electronics Co., Ltd.), calculating the phase difference in the ideal alignment state in a state in which a pretilt is conferred in advance, and applying fitting. Further, by rotating the sample within the sample plane, the azimuth angle at which a pretilt is conferred is able to be ascertained.

Figure 15:
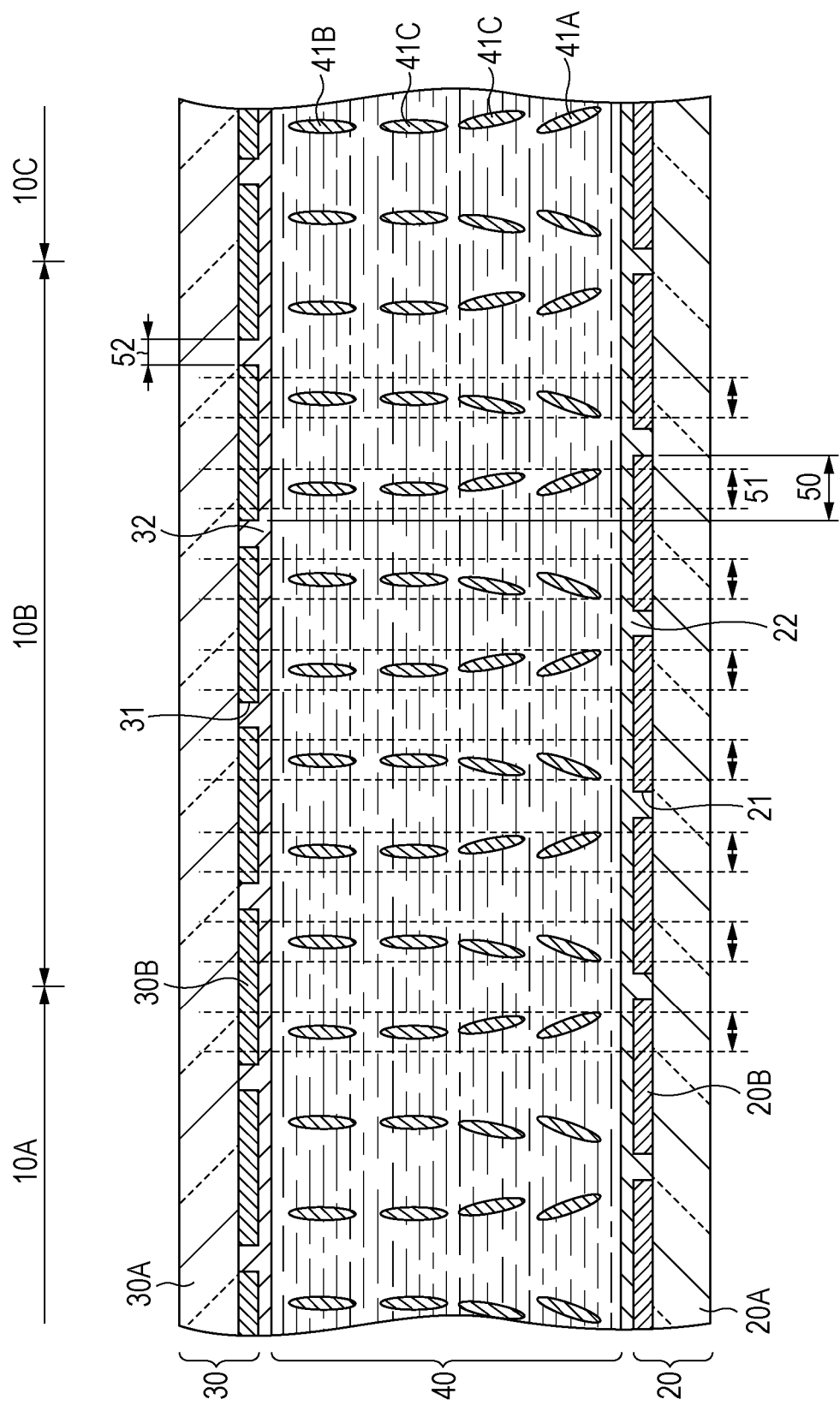
FIG. 15 is a schematic partial cross-sectional diagram of a modification of the liquid crystal display device according to an embodiment of the present disclosure illustrated in FIG. 1.
Figure 16:
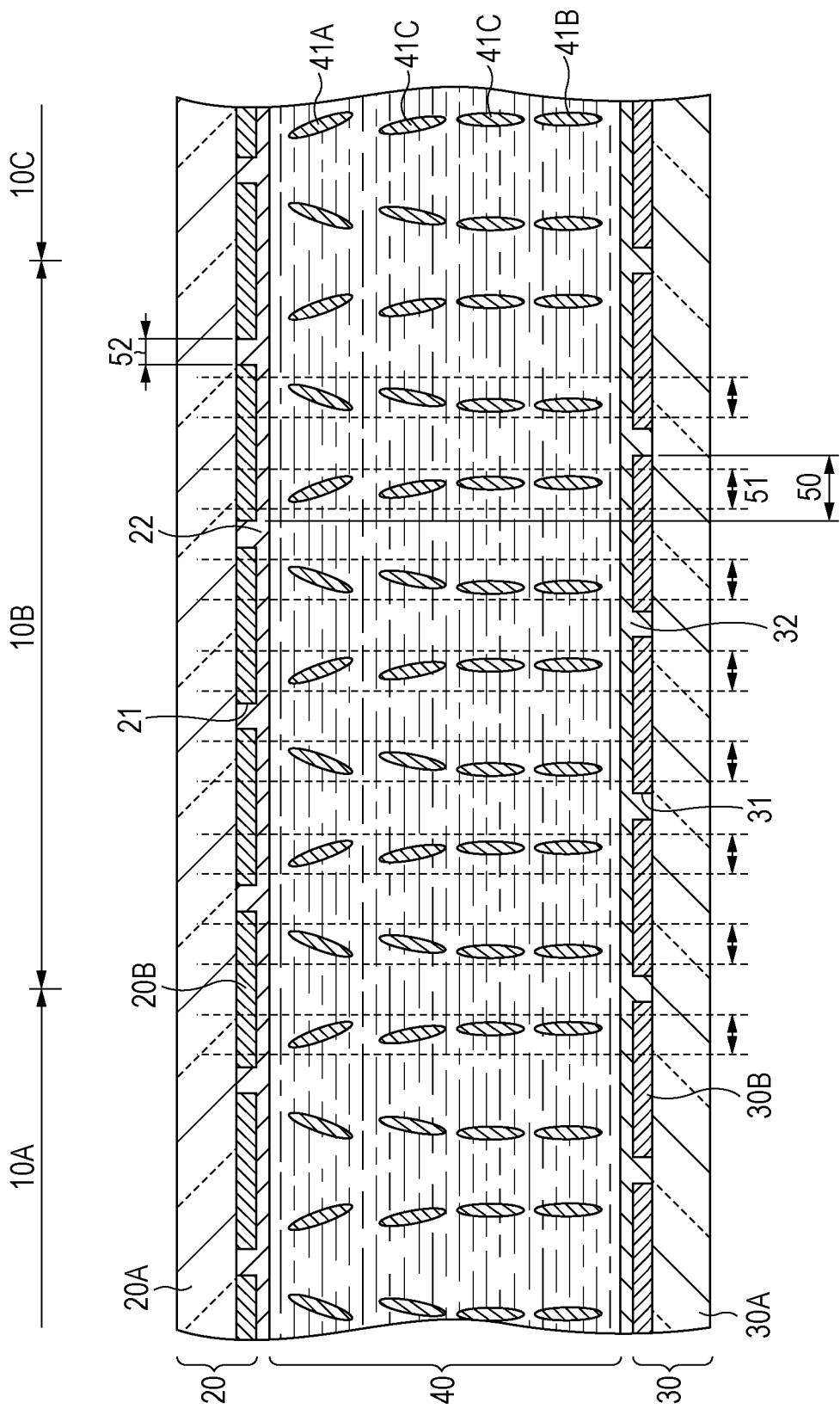
FIG. 16 is a schematic partial cross-sectional diagram of a modification of the liquid crystal display device according to an embodiment of the present disclosure illustrated in FIG. 2.

Schematic partial cross-sectional diagrams of a liquid crystal display device with such a structure are illustrated in FIGS. 15 and 16. The liquid crystal display device illustrated in FIGS. 15 and 16 is a modification of the liquid crystal display device illustrated in FIGS. 1 and 2.

A plurality of pixel electrodes 20B are arranged in a matrix shape, for example, on the surface of the side that opposes the CF substrate 30 composed of a glass substrate on the TFT substrate 20 composed of a glass substrate. Furthermore, TFT switching elements provided with gates, sources, drains, and the like that respectively drive the plurality of pixel electrodes 20B, gate lines and source lines that are connected to such TFT elements, and the like (not shown) are provided. A pixel electrode 20B is provided for every pixel that is electrically separated by a pixel separation portion 52, and for example, is configured by a material with transparency such as ITO (indium tin oxide). First slit portions 21 (portion on which an electrode is not formed) with a striped or V-shaped pattern, for example, are provided within each pixel of the pixel electrodes 20B. In so doing, when a driving voltage is applied, since an electric field that is diagonal with respect to the long axis direction of the liquid crystal molecules 41 is conferred and regions with different alignment directions are formed within the pixels (alignment demarcation), the viewing angle characteristics are improved. That is, the first slit portions 21 are the first alignment regulating portions for regulating the entirety of the liquid crystal molecules 41 within the liquid crystal layer 40 for securing favorable display characteristics, and here, the alignment direction of the liquid crystal molecules 41 when a driving voltage is applied is regulated by the first slit portions 21. As described above, in essence, the azimuth angle of the liquid crystal molecules when a pretilt is conferred is regulated by the strength and direction of the electric field and the molecular structure of the alignment film material, and the direction of the electric field is determined by the alignment regulating portions.

On the CF substrate 30, color filters (not shown) that are configured, for example, by red (R), green (G), and blue (B) striped filters and the opposing electrodes 30B are arranged on approximately the entirety of the effective display region on the opposing face with the TFT substrate 20. Similarly to the pixel electrodes 20B, the opposing electrodes 30B are configured by a material with transparency such as, for example, ITO. Similarly to the pixel electrodes 20B, second slit portions 31 (portion on which an electrode is not formed) with a striped or V-shaped pattern, for example, are provided within each pixel of the opposing electrodes 30B. In so doing, when a driving voltage is applied, since an electric field that is diagonal with respect to the long axis direction of the liquid crystal molecules 41 is conferred and regions with different alignment directions are formed within the pixels (alignment demarcation), the viewing angle characteristics are improved. That is, the second slit portions 31 are the second alignment regulating portions for regulating the entirety of the liquid crystal molecules 41 within the liquid crystal layer 40 for securing favorable display characteristics, and here, the alignment direction of the liquid crystal molecules 41 when a driving voltage is applied is regulated by the second slit portions 31. As described above, in essence, the azimuth angle of the liquid crystal molecules when a pretilt is conferred is regulated by the strength and direction of the electric field and the molecular structure of the alignment film material, and the direction of the electric field is determined by the alignment regulating portions.

Figure 17A:
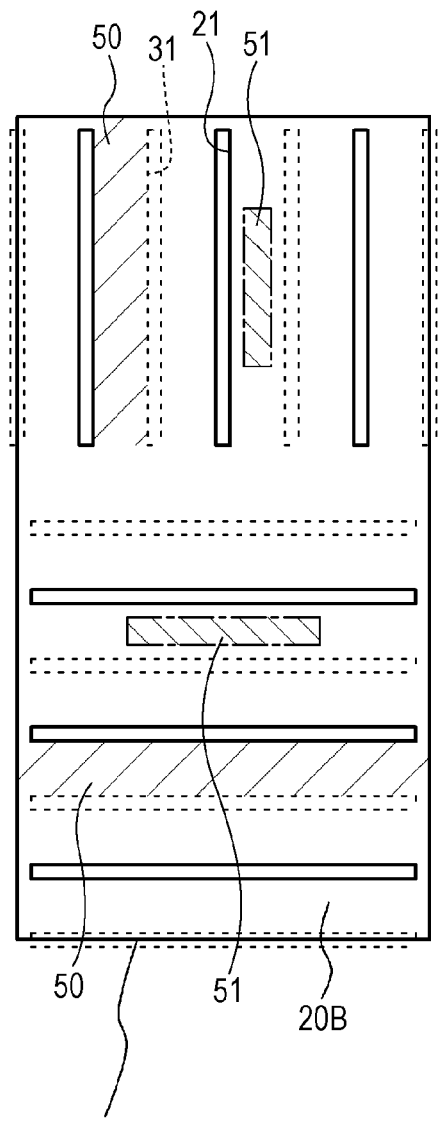
FIG. 17A is a schematic diagram of the first electrodes and the first slit portions and second electrodes and second slit portions when a pixel is viewed from above.
Figure 17B:
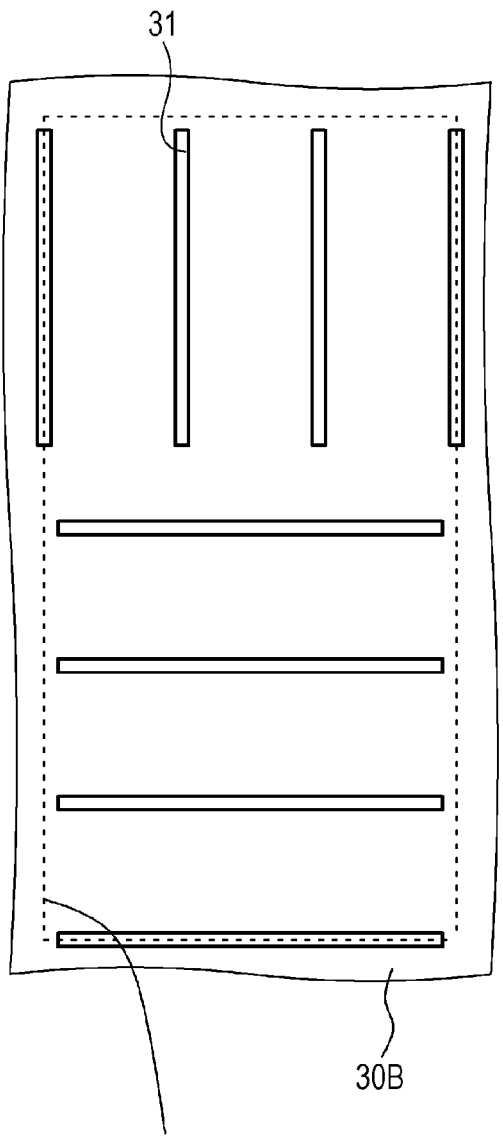
FIG. 17B is a schematic diagram of the second electrodes and the second slit portions when a pixel is viewed from above.
Figure 18A:
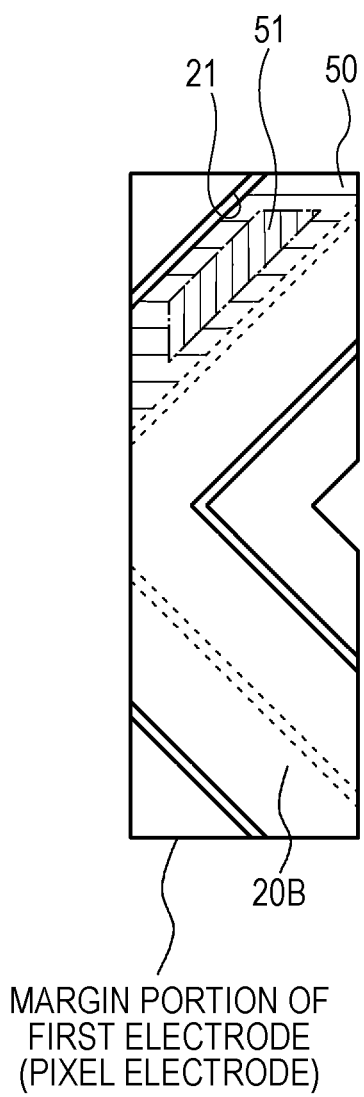
FIG. 18A is a schematic diagram of a modification of the first electrodes and the first slit portions and the second electrodes and the second slit portions when one pixel is viewed from above.
Figure 18B:
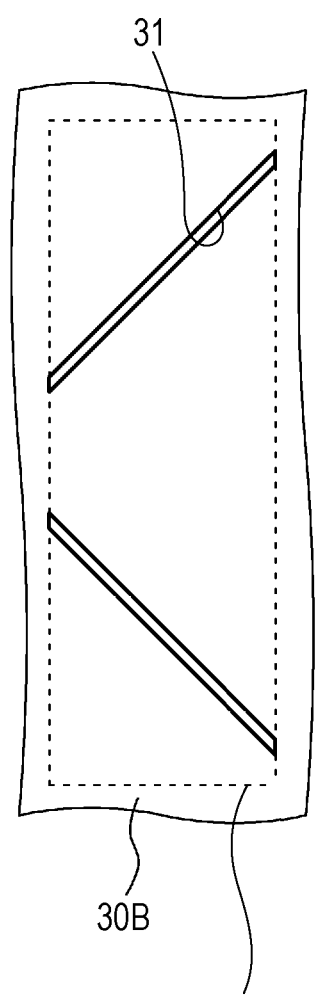
FIG. 18B is a schematic diagram of the second electrodes and the second slit portions when one pixel is viewed from above.
Figure 19A:
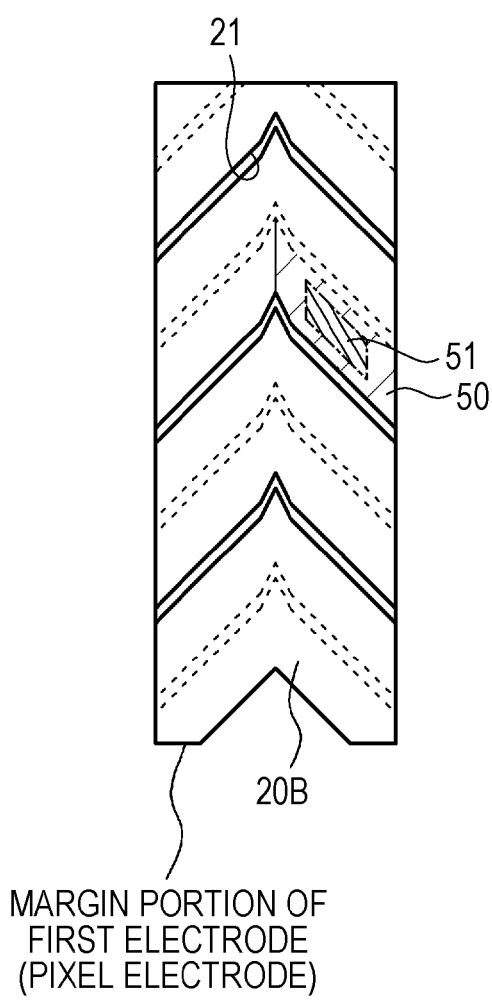
FIG. 19A is a schematic diagram of a different modification of the first electrodes and the first slit portions and the second electrodes and the second slit portions when one pixel is viewed from above.
Figure 19B:
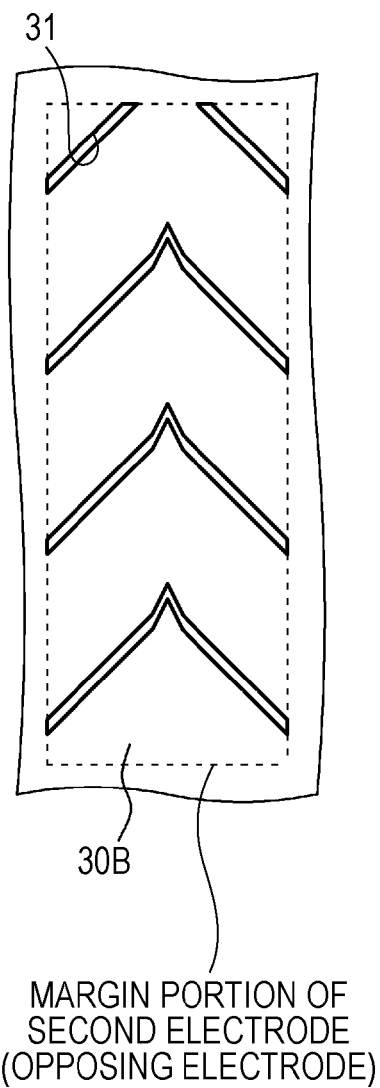
FIG. 19B is a schematic diagram of a different modification of the second electrodes and the second slit portions when a pixel is viewed from above.

The second slit portions 31 are arranged so as to not oppose the first slit portions 21 between the substrates. More specifically, a plurality of first slit portions 21 are provided to be parallel to one another, and a plurality of second slit portions 31 are also provided to be parallel to one another. Further, a plurality of first slit portions 21 extend in two directions that are orthogonal to each other within a pixel, and similarly, a plurality of second slit portions 31 extend in two directions that are orthogonal to each other. Furthermore, the first slit portions 21 are provided to be parallel to the second slit portions 31 that oppose the first slit portions 21, and the projection image of a first slit portion 21 is positioned over the projection image on a line of symmetry of two second slit portions 31, and the projection image of a second slit portion 31 is positioned over the projection image on a line of symmetry of two first slit portions 21. An arrangement diagram of the first electrodes (pixel electrodes) 20B and the first slit portions 21, and the second electrodes (opposing electrodes) 30B and the second slit portions 31 is illustrated in FIG. 17A, and an arrangement diagram of the second electrodes (opposing electrodes) 30B and the second slit portions 31 is illustrated in FIG. 17B. Further, a modification of the outer shapes of the first slit portions 21 and the second slit portions 31 is illustrated in FIGS. 18A and 18B and FIGS. 19A and 19B. Here, in FIGS. 17A, 18A, and 19A, the margin portions of the first electrode (pixel electrode) 20B and the first alignment regulating portions (first slit portions 21) are illustrated by solid lines, and the second alignment regulating portions (second slit portions 31) positioned thereabove are illustrated by dotted lines. Further, diagonal shading is given to the overlap region 50 in which the projection image of the region surrounded by the margin portion of the first electrode (pixel electrode) 20B and the first alignment regulating portions (first slit portions 21) and the projection image of the region surrounded by the margin portion of the second electrode (opposing electrode) 30B and the second alignment regulating portions (second slit portions 31) overlap, and furthermore, the central region 51 is surrounded by a broken chain line with diagonal shading. For convenience, only one overlap region 50 and central region 51 is shown. Further, in FIGS. 17B, 18B, and 19B, the margin portions of the second electrode (opposing electrode) 30B and the second alignment regulating portions (second slit portions 31) are illustrated by solid lines. Here, the shape of the first alignment regulating portions (first slit portions 21) may be substituted by the shape of the second alignment regulating portions (second slit portions 31), and the shape of the second alignment regulating portions (second slit portions 31) and the shape of the first alignment regulating portions (first slit portions 21) may be substituted.

Furthermore, in each pixel (subpixel), in the central region 51 of the overlap region 50 in which the projection image of the region surrounded by the margin portions of the first electrodes (pixel electrodes) 20B and the first alignment regulating portions (first slit portions 21) and the projection image of the region surrounded by the margin portions of the second electrodes (opposing electrodes) 30B and the second alignment regulating portions (second slit portions 31) overlap, the long axes of the liquid crystal molecule groups in the liquid crystal layer 40 are positioned approximately within the same virtual plane. That is, the variation in the azimuth angles (angles of deviation) of the liquid crystal molecule groups in the liquid crystal layer 40 is within ±5 degrees.

Figure 20A:
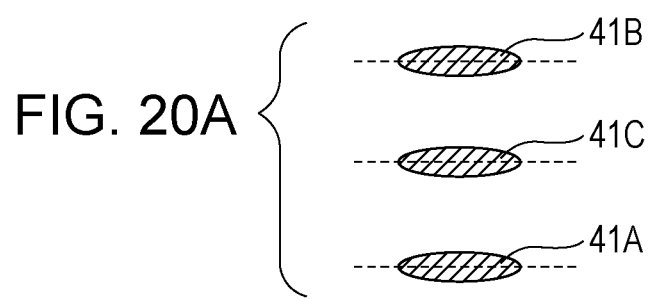
FIGS. 20A and 20B are diagrams that schematically illustrate the state of the twist of the long axis of a liquid crystal molecule group.
Figure 20B:
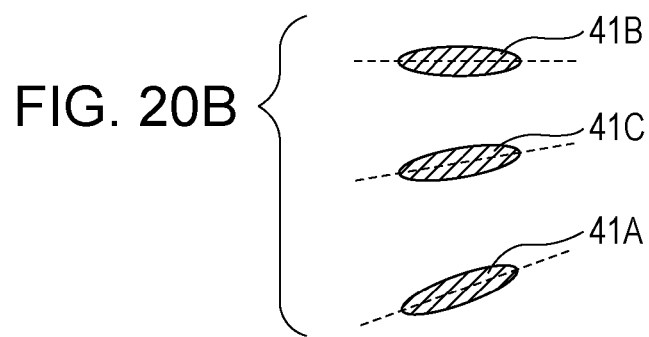

With such a liquid crystal display device, since the first slit portions 21 and the second slit portions 31 are provided on the TFT substrate 20 and the CF substrate 30 as alignment regulating portions for regulating the alignment of the liquid crystal molecules 41 and display characteristics such as the viewing angle characteristics are secured, the response characteristics are improved in a state in which favorable display characteristics are maintained. Moreover, in the central region 51 of the overlap region 50, the liquid crystal molecules groups in the liquid crystal layer 40 are not in a twisted state. There is therefore no time taken in untwisting the twists in the long axes of the liquid crystal molecule groups when a voltage is applied to a pair of electrodes 20B and 30B, further improving the response characteristics. Here, the state of the twists in the long axes of the liquid crystal molecule groups is schematically illustrated in FIGS. 20A and 20B. Here, the liquid crystal molecules 41B illustrated at the top of FIGS. 20A and 20B indicates liquid crystal molecules that are positioned in the vicinity of the first substrate, the liquid crystal molecules 41A illustrated at the bottom of FIGS. 20A and 20B indicates liquid crystal molecules that are positioned in the vicinity of the first substrate, and the liquid crystal molecules 41C illustrated in the middle of FIGS. 20A and 20B illustrate liquid crystal molecules that are positioned between the first substrate and the second substrate. Further, the dotted lines that cross the liquid crystal molecules illustrate the long axes of the liquid crystal molecules. In the state illustrated in FIG. 20A, the liquid crystal molecule groups in the liquid crystal layer 40 are not in a twisted state. On the other hand, in the state illustrated in FIG. 20B, the liquid crystal molecule groups in the liquid crystal layer 40 are in a twisted state.

In a central region of an overlap region in which the projection image of the region surrounded by the margin portions of the first electrodes 20B and the first alignment regulating portions and the projection image of the region surrounded by the margin portions of the second electrodes 30B and the second alignment regulating portions overlap, the long axes of the liquid crystal molecule groups in the liquid crystal layer are positioned approximately within the same virtual plane. In other words, the variation in the azimuth angles (angles of deviation) of the liquid crystal molecule groups in the liquid crystal layer is within ±5 degrees. In such a manner, in the central region of the overlap region, the liquid crystal molecule groups in the liquid crystal layer do not have the long axes of the liquid crystal molecule groups in a twisted state from one electrode side toward the other electrode side. Since there is therefore no time taken in untwisting the twists in the long axes of the liquid crystal molecule groups when a voltage is applied to a pair of electrodes and a response is possible within the same plane, the response characteristics are able to be improved further.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a liquid crystal display element including
a first alignment film and a second alignment film that are provided on opposing face sides of a pair of substrates; and
a liquid crystal layer provided between the first alignment film and the second alignment film and that includes liquid crystal molecules with negative dielectric constant anisotropy,
wherein the first alignment film includes a compound in which a first polymer compound that includes a cross-linked functional group or a polymerized functional group as a side chain is cross-linked or polymerized,
the second alignment film includes a compound in which a second polymer compound is cross-linked or polymerized, and
a pretilt is conferred, by the first alignment film, on the liquid crystal molecules, at least in a vicinity of the first alignment film, by cross-linking or polymerizing the first polymer compound and the liquid crystal molecules, at least in a vicinity of the second alignment film, are vertically aligned by the second alignment film.

2. A liquid crystal display device comprising:
a liquid crystal display element including
a first alignment film and a second alignment film that are provided on opposing face sides of a pair of substrates; and
a liquid crystal layer provided between the first alignment film and the second alignment film and that includes liquid crystal molecules with negative dielectric constant anisotropy,
wherein the first alignment film includes a compound in which a first polymer compound that includes a photosensitive group as a side chain is deformed,
the second alignment film includes a compound in which a second polymer compound is cross-linked or polymerized, and
a pretilt is conferred, by the first alignment film, on the liquid crystal molecules, at least in a vicinity of the first alignment film, by cross-linking or polymerizing the first polymer compound and the liquid crystal molecules, at least in a vicinity of the second alignment film, are vertically aligned by the second alignment film.

3. A manufacturing method of a liquid crystal display device comprising:
forming a first alignment film composed of a first polymer compound including a cross-linked functional group or a polymerized functional group as a side chain on one of a pair of substrates and forming a second alignment film composed of a second polymer compound on the other of the pair of substrates;
arranging the pair of substrates so that the first alignment film and the second alignment film are opposing and sealing a liquid crystal layer that includes liquid crystal molecules with negative dielectric constant anisotropy between the first alignment film and the second alignment film; and
conferring, by the first alignment film, a pretilt on the liquid crystal molecules, at least in a vicinity of the first alignment film, by cross-linking or polymerizing the first polymer compound and the second polymer compound and vertically aligning the liquid crystal molecules, at least in a vicinity of the second alignment film, by the second alignment film.

4. The manufacturing method of the liquid crystal display device according to claim 3,
wherein the side chain of the first polymer compound is cross-linked or polymerized by irradiating energy rays while aligning the liquid crystal molecules by applying a predetermined electric field on the liquid crystal layer.

5. A manufacturing method of a liquid crystal display device comprising:
forming a first alignment film composed of a first polymer compound including a photosensitive functional group as a side chain on one of a pair of substrates and forming a second alignment film composed of a second polymer compound on the other of the pair of substrates;
arranging the pair of substrates so that the first alignment film and the second alignment film are opposing and sealing a liquid crystal layer that includes liquid crystal molecules with negative dielectric constant anisotropy between the first alignment film and the second alignment film; and
conferring, by the first alignment film, a pretilt on the liquid crystal molecules, at least in a vicinity of the first alignment film, by deforming the first polymer compound and cross-linking or polymerizing the second polymer compound and vertically aligning the liquid crystal molecules, at least in a vicinity of the second alignment film, by the second alignment film.

6. The manufacturing method of the liquid crystal display device according to claim 5,
wherein the side chain of the first polymer compound is transformed by irradiating energy rays while aligning the liquid crystal molecules by applying a predetermined electric field on the liquid crystal layer.

7. A manufacturing method of a liquid crystal display device comprising:
forming a first alignment film composed of a first polymer compound including a cross-linked functional group or a photosensitive functional group as a side chain on one of a pair of substrates and forming a second alignment film composed of a second polymer compound on the other of the pair of substrates;
arranging the pair of substrates so that the first alignment film and the second alignment film are opposing and sealing a liquid crystal layer that includes liquid crystal molecules with negative dielectric constant anisotropy between the first alignment film and the second alignment film; and
conferring, by the first alignment film, a pretilt on the liquid crystal molecules, at least in a vicinity of the first alignment film, by irradiating the first polymer compound and the second polymer compound by cross-linking, polymerizing, or deforming the first polymer compound and vertically aligning, by the second alignment film, the liquid crystal molecules, at least in a vicinity of the second alignment film, by cross-linking or polymerizing the second polymer compound.

8. The manufacturing method of the liquid crystal display device according to claim 7,
wherein the first polymer compound and the second polymer compound are irradiated by ultraviolet radiation as the energy rays while aligning the liquid crystal molecules by applying a predetermined electric field on the liquid crystal layer.

* * * * *